(12) United States Patent
Brown et al.

(10) Patent No.: US 12,247,861 B2
(45) Date of Patent: Mar. 11, 2025

(54) WIRELESS FIRE HOSE FLOW RATE APPARATUS AND MEASURING FLOW RATE IN A FIRE HOSE

(71) Applicant: Government of the United States of America, as represented by the Secretary of Commerce, Gaithersburg, MD (US)

(72) Inventors: Christopher Uriah Brown, Frederick, MD (US); Gregory William Vogl, Gaithersburg, MD (US); Wai Cheong Tam, Germantown, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 10 days.

(21) Appl. No.: 17/406,187

(22) Filed: Aug. 19, 2021

(65) Prior Publication Data
US 2022/0065675 A1    Mar. 3, 2022

Related U.S. Application Data

(60) Provisional application No. 63/071,394, filed on Aug. 28, 2020.

(51) Int. Cl.
*G01F 1/84* (2006.01)
*A62C 31/28* (2006.01)

(52) U.S. Cl.
CPC ............ *G01F 1/8468* (2013.01); *A62C 31/28* (2013.01)

(58) Field of Classification Search
CPC .................................................... G01F 1/8468

USPC ...................................................... 73/861.77
See application file for complete search history.

(56) References Cited

U.S. PATENT DOCUMENTS

2017/0275986 A1    9/2017   Nunes et al.
2021/0046345 A1*   2/2021   Laskaris ................ A62C 37/00

OTHER PUBLICATIONS

Petrillo, A.M., "Hoses: Large and Small, from LDH to Forestry Lines", Fireapparatus.com, 2019, accessed: Jun. 24, 2021, DOI: https://digital.fireapparatusmagazine.com/fireapparatus/june_2019/MobilePagedReplica.action?pm=2&folio=16#pg16.
Clinch, J.M., "Measurements of the Wall Pressure Field at the Surface of a Smooth-Walled Pipe Containing Turbulent Water Flow", J. Sound Vibe., 1969, p. 398-419, vol. 9 No.3.
Kim, Y-K., et al., "A three accelerometer method for the measurement of flow rate in pipe", The Journal of the Acoustical Society of America, 1996, p. 717-726, vol. 100 No.2.

(Continued)

*Primary Examiner* — Alexander A Mercado
*Assistant Examiner* — Rodney T Frank
(74) *Attorney, Agent, or Firm* — Office of Chief Counsel for National Institute of Standards and Technology

(57) ABSTRACT

A wireless flow rate apparatus measures flow rate in a fluid-conductive conduit and includes: the fluid conductive conduit comprising a non-rigid wall; a wireless sensor network including a flow sensor that detects vibrations of the fluid-conductive conduit, produces a sensor signal; and a wireless node that receives the sensor signal and wirelessly communicates the sensor signal; a base station that wirelessly receives the sensor signal; and a flow rate analyzer that receives the sensor signal from the base station and determines the flow rate of fluid in the fluid-conductive conduit from the sensor signal.

21 Claims, 60 Drawing Sheets

(56) References Cited

OTHER PUBLICATIONS

Park, G., et al., "Feasibility of using impedance-based damage assessment for pipeline structures", Earthquake Engineering and Structural Dynamics, 2001, p. 1463-1474, vol. 30.
Evans, R.P., et al., "Flow Rate Measurements Using Flow-Induced Pipe Vibration", Transactions of the ASME, 2004, p. 280-285, vol. 126, DOI: 10.1115/1.1667882.
Pittard, M.T., et al., "Experimental and numerical investigation of turbulent flow induced pipe vibration in fully developed flow", Review of Scientific Instruments, 2004, p. 2393-2401, vol. 75 No.7.
Thompson, A.S., et al., "Internal turbulent flow induced pipe vibrations with and without baffle plates", Proceedings of the ASME 2010 3rd Joint US-European Fluids Engineering Summer Meeting and 8th International Conference on Nanochannels, Microchannels, and Minichannels, 2010, p. 1-11.
Urthaler, Y., et al., "A Methodology for Assessment of Internal Flow-Induced Vibration (FIV) in Subsea Piping Systems", Proceedings of the ASME 2011 30th International Conference on Ocean, Offshore and Arctic Engineering, 2011, p. 1-11.
Dinardo, G., et al., "Fluid Flow Rate Estimation using Acceleration Sensors", 2013 Seventh International Conference on Sensing Technology, IEEE Xplore, 2013, p. 221-225.
Campagna, M.M., et al., "Fluid flow measurements by means of vibration monitoring", Measurement Science and Technology, 2015, p. 115306, vol. 26.
Medeiros, K.A.R., et al., "Flow Measurement by Piezoelectric Accelerometers: Application in the Oil Industry", Petroleum Science and Technology, 2015, p. 1402-1409, vol. 33.
Medeiros, K.A.R., et al., "Optimization of flow rate measurement using piezoelectric accelerometers: Application in water industry", Measurement, 2016, p. 576-581, vol. 91.
Yazdekhasti, S., et al., "Novel vibration-based technique for detecting water pipeline leakage", Structure and Infrastructure Engineering, 2016, p. 1-12.
Lannes, D.P., et al., "Measurement of flow rate using straight pipes and pipe bends with integrated piezoelectric sensors", Flow Measurement and Instrumentation, 2018, p. 208-216, vol. 60.
Mistretta, L., et al., "Embedding Monitoring Systems for Cured-In-Place Pipes", Applications in Electronics Pervading Industry, Environment and Society, Lecture Notes in Electrical Engineering 429, 2018, p. 12-17, DOI: 10.1007/978-3-319-55071-8_2.
Kim, Y., et al., "NAWMS: Nonintrusive Autonomous Water Monitoring System", Conference Papers: SenSys'08, 2008, p .309-321.
Froehlich, J., et al., "HydroSense: Infrastructure-Mediated Single-Point Sensing of Whole-Home Water Activity", UbiComp 2009, 2009, p. 235-244.
Gerald, N., et al., "Design and Implementation of Pipeline Monitoring System Using Acceleration-Based Wireless Sensor Network", The International Journal Of Engineering And Science (IJES), 2014, p. 49-58, vol. 3.
Saseendran, S., et al., "Automated Water Usage Monitoring System", International Conference on Communication and Signal Processing, 2016, p. 99-103.
Task Force Tips Fire Fighting Equipment Products website, about the Sho-Flow Bluetooth series flow meter, Accessed Jun. 2021, DOI: https://www.tft.com/Product-Series/SHO-FLOW-Series.
Blevins, R.D., "Vibrations of a pipe containing a fluid flow", Flow-Induced Vibration, 1977, p. 287-311, Van Nostrand Reinhold Company, New York.
Owojaiye, G., et al., "Focal design issues affecting the deployment of wireless sensor networks for pipeline monitoring", Ad Hoc Networks, 2013, p. 1237-1253, vol. 11.
Australian/New Zealand Standard™, "Fire hose reels", AS/NZS 1221:1997 (Incorporating Amendment No. 1), 2003, p. 1-45.
Standards Australia/Standards New Zealand, "Fire hose reels, Amendment No. 1 to AS/NZS 1221:1997", 2003, p. 1-3.
Fire Hose Specifications, "White 1 ¾"×50' Double Jacket Fire Hose (Alum 1 ½" NH Couplings)", Accessed Aug. 18, 2021, DOI: https://www.firehosedirect.com/white-1-75-x-50-double-jacket-hose-alum-1-5-nh-couplings?feed=Froogle&gclid=EAIaIQobChMInqnUu73H8glVi4jICh1UugPoEAQYASABEgLdZvD_BWE.
G2 Flow Meter Data Sheet, "G2 Series", Accessed Aug. 18, 2021, DOI: https://s3-us-west-2.amazonaws.com/catsy.467/g2-data-sheet-approved.pdf.
Greyline Instruments, Inc., "Transit Time Flow Meter with Clamp-on Ultrasonic Transducers", Accessed Aug. 18, 2021, DOI: https://ekotechnika.cz/sites/default/files/pdf/ttfm_1.0_brochure.pdf.
Grant, C., et al., "Research Roadmap for Smart Fire Fighting", NIST Special Publication 1191, 2015, DOI: http://dx.doi.org/10.6028/NIST.SP.1191.
Fire Research Corporation, Portable Flowtester Flow and Pressure Test Set Models: FTA500 GPM/PSI FTA510 LPM/kPa, FTA520 LPM/Bar, Accessed Aug. 18, 2021, DOI: https://www.fireresearch.com/pdfs/fta500.pdf.
National Instruments, "LabVEW 2017 for Windows", Accessed Aug. 17, 2021, DOI: https://www.ni.com/pdf/manuals/374715g.html.
Lake Monitors, "Lake Monitors Basic In-line Liquid Flow Rate Monitors For ¼" - 2" Pipe Sizes", 2006, Accessed Aug. 18, 2021, DOI: https://www.comoso.com/uploads/products/downloads/Lake_Monitors_Comoso_inline.pdf.
LORD Sensing, "LORD Quick Start Guide, SensorConnect™ Sensing Systems Data Acquisition Utility", 2019, Accessed Aug. 16, 2021, DOI: https://www.microstrain.com/sites/default/files/sensorconnect_qsg_8501-0063_rev_d.pdf.
LORD Sensing, "LORD Datasheet, IEPE-Link™-LXRS® Wireless IEPE Sensor Node", 2016, Accessed Aug. 16, 2021, DOI: https://www.microstrain.com/sites/default/files/iepe-link_datasheet_8400-0062_rev_g.pdf.
LORD Sensing, "LORD Datasheet, WSDA®-200-USB Wireless USB Gateway", 2018, Accessed Aug. 18, 2021, DOI: https://metromatics.com.au/wp-content/uploads/2019/06/wsda-200-usb_datasheet_8400-0103.pdf.
National Fire Protection Association, "NFPA® 1710, Standard for the Organization and Deployment of Fire Suppression Operations, Emergency Medical Operations, and Special Operations to the Public by Career Fire Departments", 2015.
Brown, C.U., et al., "NIST Technical Note 2074, Measuring Water Flow Rate for a Fire Hose Using a Wireless Sensor Network for Smart Fire Fighting", 2019, DOI: https://doi.org/10.6028/NIST.TN.2074.
Brown, C.U et al., "NIST Technical Note 2075, Measuring Water Flow Rate for a Fire Hose Using Wired Accelerometers for Smart Fire Fighting", 2019, DOI: https://doi.org/10.6028/NIST.TN.2075.
PCB Piezotronics Vibration Division, "ICP Accelerometer, Model 352C33", Accessed Aug. 16, 2021, DOI: https://www.pcb.com/contentStore/docs/pcb_corporate/vibration/products/specsheets/352c33_h.pdf.
PCB Piezotronics, "Coaxial Cable 72527", Accessed Aug. 18, 2021, DOI: http://www.pcb.com/contentStore/docs/pcb_corporate/electronics/products/manuals/003a03.pdf.
Brown, C.U., et al., "Measuring Water Flow Rate in a Flexible Fire Hose using an Accelerometer", Accessed Aug. 18, 2021, DOI: https://tsapps.nist.gov/publication/get_pdf.cfm?pub_id=928528.
Seametrics, "WMP-Series, Plastic-Bodied Magmeter", Accessed Aug. 18, 2021, DOI: https://www.instrumart.com/assets/wmp-datasheet.pdf.
PCB Piezotronics, "Model 288D01 Mechanical Impedance Sensor Installation and Operating Manual", Accessed Aug. 16, 2021, DOI: https://www.pcb.com/contentStore/docs/pcb_corporate/vibration/products/manuals/288d01.pdf.
Task Force Tips, "Manual: Sho-Flow® Flow Indicator Operations", 2012, Accessed Aug. 16, 2021, DOI: https://www.manualslib.com/manual/2100660/Task-Force-Tips-Sho-Flow-Sf-Nf-Nf-125.html.
National Instruments, "User Guide and Specifications, Ni 9795 WSN C Series Gateway", Accessed Aug. 16, 2021, DOI: https://www.ni.com/pdf/manuals/375694a.pdf.
National Instruments, "User Guide and Specifications, NI WSN-3230/3231, NI Wireless Sensor Network RS-232/RS-485 Serial Interface Nodes", Accessed Aug. 16, 2021, DOI: https://www.ni.com/pdf/manuals/373305b.pdf.

(56) References Cited

OTHER PUBLICATIONS

Orfanidis, S.J., "Introduction to Signal Processing", Prentice-Hall, 1996, p. 427-436, Englewood Cliffs, NJ.

* cited by examiner

WIRELESS FIRE HOSE FLOW RATE APPARATUS AND MEASURING FLOW RATE IN A FIRE HOSE

CROSS REFERENCE TO RELATED APPLICATIONS

The application claims priority to U.S. Provisional Patent Application Ser. No. 63/071,394 filed Aug. 28, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention.

BRIEF DESCRIPTION

Disclosed is a wireless fire hose flow rate apparatus 200 for measuring flow rate in a fire hose (or other non-rigid, flexible, pipe or hose), the wireless fire hose flow rate apparatus 200 comprising: a wireless sensor network 201 comprising: a flow sensor 202 (e.g., an accelerometer) that detects vibrations of the fire hose 203 generated by water flowing through the fire hose 203, produces a sensor signal 205 from which the flow rate 215 of water in the fire hose 203 is determined, and communicates the sensor signal 205; and a wireless node 208 in electrical communication with the flow sensor 202 and that receives the sensor signal 205 from the flow sensor 202 and wirelessly communicates the sensor signal 205; a base station 209 in radiocommunication with the wireless node 208 and that wirelessly receives the sensor signal 205 from the wireless node 208 and communicates the sensor signal 205; and a flow rate analyzer 207 in electrical communication with the base station 209 and that receives the sensor signal 205 from the base station 209 and determines the flow rate 215 of the water in the fire hose 203 from the sensor signal 205.

Disclosed is a wireless flow rate apparatus for measuring flow rate in a fluid-conductive conduit, the wireless flow rate apparatus comprising: the fluid-conductive conduit comprising a non-rigid wall that communicates vibrations caused by fluid flowing through the fluid-conductive conduit; a wireless sensor network 201 comprising: a flow sensor 202 disposed on the fluid-conductive conduit that detects vibrations of the fluid-conductive conduit generated by fluid flowing through the fluid-conductive conduit, produces a sensor signal 205 from which the flow rate 215 of the fluid in the fluid-conductive conduit is determined, and communicates the sensor signal 205; and a wireless node 208 in electrical communication with the flow sensor 202 and that receives the sensor signal 205 from the flow sensor 202 and wirelessly communicates the sensor signal 205; a base station 209 in radiocommunication with the wireless node 208 and that wirelessly receives the sensor signal 205 from the wireless node 208 and communicates the sensor signal 205; and a flow rate analyzer 207 in electrical communication with the base station 209 and that receives the sensor signal 205 from the base station 209 and determines the flow rate 215 of the fluid in the fluid-conductive conduit from the sensor signal 205.

Disclosed is a process for measuring flow rate in a fire hose, the process comprising: flowing water through a fire hose 203; detecting, by a flow sensor 202, vibrations of the fire hose 203 generated by water flowing through the fire hose 203; producing, by the flow sensor 202, a sensor signal 205 based on the vibrations of the fire hose 203 detected by the flow sensor 202; communicating the sensor signal 205 from the flow sensor 202; receiving, by a wireless node 208 in electrical communication with the flow sensor 202, the sensor signal 205 from the flow sensor 202; wirelessly communicating the sensor signal 205 from the wireless node 208; wirelessly receiving, by a base station 209 in radiocommunication with the wireless node 208, the sensor signal 205 from the wireless node 208; communicating the sensor signal 205 by the base station 209; receiving, by a flow rate analyzer 207 in electrical communication with the base station 209, the sensor signal 205 from the base station 209; and determining, by the flow rate analyzer 207, the flow rate 215 of the water in the fire hose 203 from the sensor signal 205.

BRIEF DESCRIPTION OF THE DRAWINGS

The following description cannot be considered limiting in any way. With reference to the accompanying drawings, like elements are numbered alike.

DETAILED DESCRIPTION

Figure 1:
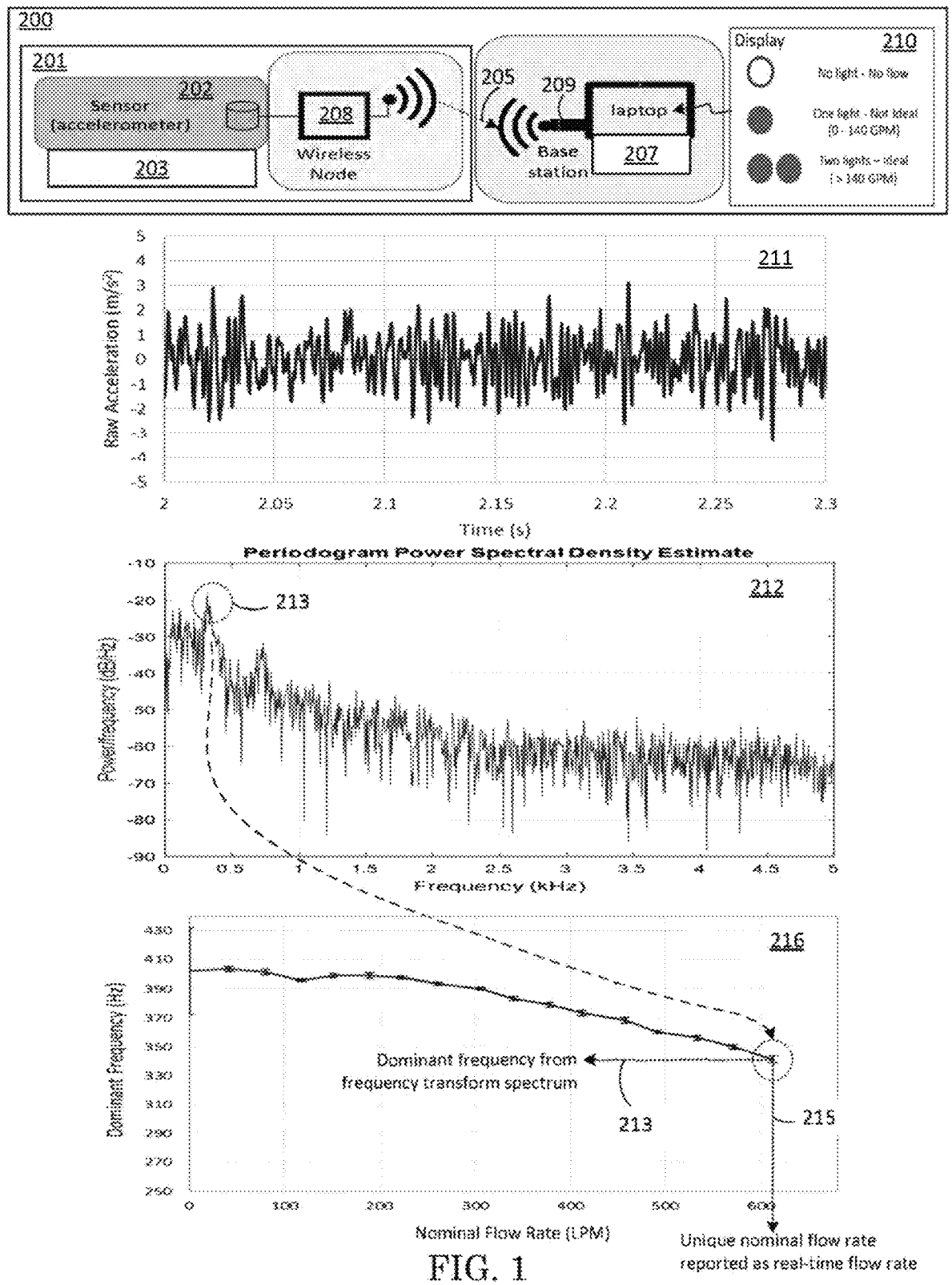
FIG. 1 shows a wireless fire hose flow rate apparatus, a graph of time domain data, a frequency transform spectrum, and a nominal flow rate curve that includes dominant frequencies and nominal flow rates.

A detailed description of one or more embodiments is presented herein by way of exemplification and not limitation.

The delivery of water through a hose line to the burning material at a fire site is a definitive factor in whether the fire will be controlled. The volume of water delivered through the hose line is typically measured in gallons per minute (GPM). On a fire truck, knowledge of the flow from the fire truck pump is an important metric for a multitude of reasons. Flow and total water applied to structures adds weight and can be a significant factor in structural stability or potential collapse of the burning structure. Certain situations demand a minimum flow. The National Fire Protection Association recommends certain minimum flow rates for interior attack of fire, but some departments may use flows in excess of such recommendations when moving inside a burning building for quick extinguishment and safety.

Fire flow requirements for different size building hazards can be estimated. In some places where water is scarce, a fire district or water district can charge for water flow used. Fire personnel may maintain a record of the total flow applied to a fire to determine how much payment is required for use of the scarce water.

Automatic type of fire nozzles at the end of the hose make a similar looking stream across a wide range of flow volumes so inadequate flow may not be easily recognized by visualization of the stream flowing from the automatic type of fire nozzle. A stream that has a similar appearance at a wide range of flows from the automatic type of fire nozzles may result in undetected low flows that are hazardous to fire personnel and the burning structures, as these low flows may not meet the need for extinguishment of the fire. These similarly appearing flows may result in undetected high flows that are hazardous to structures that are overloaded by the weight of the water or other fire retardant applied to the structure.

Excessive flow rates in some cases can be a safety hazard to personnel by generating excessive reaction forces. In addition, undetected excessive flow rates can be a safety hazard to fire personnel and the structure being extinguished because the extinguishing water or suppressant may be heavy and may impart an unmanageable load on the burning structure, particularly if the structure is compromised by the fire.

If the flow rate is unknown, then the above factors may be subject to guesswork because inadequate flow rate may impede the ability to extinguish the fire, and excessive flow may create excessive reaction forces or place the burning structure in danger of collapse.

Moreover, fire trucks can have 8 to 12 discharges to supply flow. Conventional rotor-based mechanical flow meters can be installed at the flow source on the fire truck to measure flow rate, but flow meters can be costly and take up space on the fire equipment as well as add additional weight to the equipment. Typically, flow meters are installed on individual discharges or at input pipes that flow into the discharges so the range of flow rates used has some accuracy, and equipment may have multiple discharges during operation. Certain conventional flow meters may require relatively long straight sections of pipe that take additional space in the fire truck. Alternatively, the fire truck may be designed without flow meters so that flow rates are unknown by users, or the users guess or estimate the flow rates and total flow during a fire event, which is undesirable and a technical deficiency. The detection of flow by flowmeters and lack of sensors for detecting flow result in disadvantages for the users.

Conventionally, water pressure measured at a fire engine is used to determine if water is flowing through a fire hose, but water pressure does not necessarily mean that water is flowing. It would be desirable to design, develop, implement, and deploy a wireless fire hose flow rate apparatus that overcomes technical deficiencies of conventional devices and methods such as in-line flow meters, centrifugal pumps, and fire truck pump flow prediction systems that might inaccurately provide or predict the total flow or volume of flow expelled from a flow source such as a fire truck during a fire suppression event. Moreover, the wireless fire hose flow rate apparatus avoids the complication and space requirements of the conventional flow meters, improves accuracy of the detection of total flow through the fire hose and detects flow through the fire hose quickly during the fire suppression event. The wireless fire hose flow rate apparatus described herein addresses the limitations and disadvantages of the conventional flow meters and fire trucks that do not include such for determining flow through the fire hose at the nozzle of the fire hose.

It has been discovered that a wireless fire hose flow rate apparatus directly measures water flow rate in a fire hose. Advantageously, the wireless fire hose flow rate apparatus provides an incident commander understanding of fire hose flow for situational awareness and can reduce civilian and firefighter injuries and fatalities on the fireground. Moreover, the wireless fire hose flow rate apparatus uses accelerometers to detect vibrations within the fire hose and approximates the flow rate through the fire hose. The accelerometer is disposed to a flexible hose in a wireless sensor network for firefighting so that the flow rate of water at the nozzle end on the outside of a fire hose is measured on the fireground.

Wireless fire hose flow rate apparatus 200 measures flow rate in a fire hose. In an embodiment, with reference to FIG. 1, FIG. 2, FIG. 3, FIG. 4, FIG. 5, FIG. 6, FIG. 7, FIG. 8, FIG. 9, and FIG. 10, wireless fire hose flow rate apparatus 200 includes: wireless sensor network 201 including: flow sensor 202 disposed on fire hose 203 that detects vibrations of fire hose 203 generated by water flowing through fire hose 203, produces sensor signal 205 from which flow rate 215 of water in fire hose 203 is determined, and communicates sensor signal 205; and wireless node 208 in electrical communication with flow sensor 202 and that receives sensor signal 205 from flow sensor 202 and wirelessly communicates sensor signal 205; base station 209 in radio-communication with wireless node 208 and that wirelessly receives sensor signal 205 from wireless node 208 and communicates sensor signal 205; and flow rate analyzer 207 in electrical communication with base station 209 and that receives sensor signal 205 from base station 209 and determines flow rate 215 of water in fire hose 203 from sensor signal 205.

Flow sensor 202 senses vibration of fire hose 203 and can be, e.g., an accelerometer. It is contemplated that vibration of fire hose 203 due to water flow is in the kilohertz range so flow sensor 202 should produce sensor signal 205 in response to vibration. Sensor signal 205 includes a time-varying electrical variation in voltage that is within a frequency range such that the electrical signal can be acquired or communicated as a time domain waveform of voltage or electrical current or processed outputs of the time-varying voltage that can include the nominal flow rate. The time domain data of sensor signal 205 can be converted into frequency domain data (e.g., frequency transform spectrum 212 as shown in FIG. 1) to uncover vibrational frequencies of fire hose 203 caused by the flow of fluid in fire hose 203.

Figure 5:
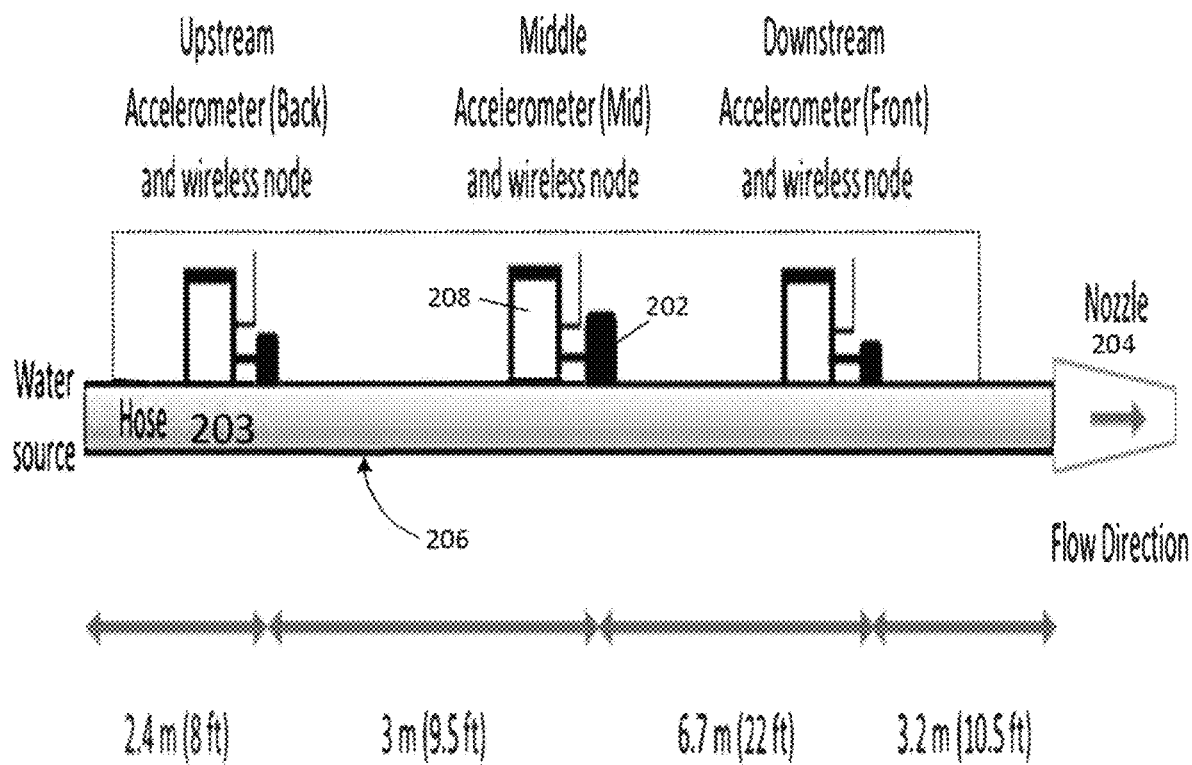
FIG. 5 shows: exemplary accelerometer locations along the 15 m (50 ft) fire hose.

Fire hose 203 can be a conventional fire hose used to deliver fire suppressant to a fire. With reference to FIG. 5, nozzle 204 is disposed at a terminus of fire hose 203 distal to the fluid source for delivery of the fire suppressant. The fire suppressant can be any substance that can be delivered via flow through fire hose 203 that diminishes a fire. Exemplary fire suppressants include foams and liquids such as water.

Instead of a fire hose, the fluid delivery device can be more generally fluid-conductive conduit that includes a non-rigid wall that communicates vibrations caused by fluid flowing through the fluid-conductive conduit. The fluid-conductive conduit can be a tube, pipe, and the like, and particularly a flexible non-metallic hose such as a fire hose. In this respect, although fire suppressant is mentioned above as being flowed through fluid-conductive conduit, the fluid flowing through the fluid-conductive conduit (including in some embodiments fire hose 203) can be any fluid that creates vibration under flow of fluid-conductive conduit. Accordingly, it is contemplated that the fluid can be a gas or liquid. Furthermore, not only can the wireless flow rate apparatus be used on firegrounds, the wireless flow rate apparatus can be used in other environments where flow rate can be determined such as plumbing, industrial plants, manufacturing processes, aeronautical structures, downhole environments, and the like.

In an embodiment, wireless flow rate apparatus for measuring flow rate in a fluid-conductive conduit includes: a fluid-conductive conduit including a non-rigid wall that communicates vibrations caused by fluid flowing through the fluid-conductive conduit; wireless sensor network 201 including: flow sensor 202 disposed on the fluid-conductive conduit that detects vibrations of the fluid-conductive conduit generated by fluid flowing through the fluid-conductive conduit, produces sensor signal 205 from which flow rate 215 of the fluid in the fluid-conductive conduit is determined, and communicates sensor signal 205; and wireless node 208 in electrical communication with flow sensor 202 and that receives sensor signal 205 from flow sensor 202 and wirelessly communicates sensor signal 205; base station 209 in radiocommunication with wireless node 208 and that wirelessly receives sensor signal 205 from wireless node 208 and communicates sensor signal 205; and flow rate analyzer 207 in electrical communication with base station 209 and that receives sensor signal 205 from base station 209 and determines flow rate 215 of the fluid in the fluid-conductive conduit from sensor signal 205. According to an embodiment, the fluid-conductive conduit is a flexible non-metallic hose.

With reference to FIG. 5, flow sensor 202 is disposed on exterior 206 of fire hose 203. In this aspect, a plurality of flow sensors 202 can be disposed and spaced apart in a selected arrangement. In an embodiment, a first flow sensor 202 is disposed proximate to the nozzle 204 of the fire hose 203, and other flow sensors 205 can be disposed at positions distal to nozzle 204. With additional flow sensors, data validation and accuracy can be obtained. Further, flow sensor 202 is disposed on fire hose 203 to not obstruct flow of water in the fire hose 203. Flow sensor 202 can be disposed on fire hose 203 such as with an adhesive (e.g., glue, epoxy, and the like), a mechanical fastener (e.g., a sleeve that fits over exterior 206), or physical integration into the body of fire hose 203 such as within the wall material of fire hose 203.

In an embodiment, wireless fire hose flow rate apparatus 200 includes flow sensor 202 disposed on fire hose 203 and in communication with wireless node 208; and a second flow sensor 202 disposed on the fire hose 203 as part of the wireless sensor network 201, wherein the second flow sensor 202 is connected to a second wireless node 208 that is in communication with the base station 209 to wirelessly communicate a second sensor signal 205 from the second flow sensor 202 to the base station 209 so that the flow rate 215 is determined from the sensor signal 205 from the flow sensor 202 and the second sensor signal 205 from the second flow sensor 202.

Sensor 202 produces sensor signal 205 in response to vibration of fire hose 203 due to flow of fluid inside of fire hose 203. Sensor signal 205 is communicated from flow sensor 202 to wireless node 208. Each flow sensor connects a wireless node 208 that wirelessly communicates sensor signal 205 to base station 209 that wirelessly receives sensor signal 205 for further communication to flow rate analyzer 207. With reference to FIG. 1, wireless sensor network 201 includes components for such wireless communication and telemetry data included in sensor signal 205. In an embodiment, wireless sensor network 201 includes a networked collection of low-power wireless nodes 208 or a single wireless node that provides tracking of flow sensor 202. Here, wireless node 208 transmits sensor information including sensor signal 205. It is contemplated that wireless node 208 can transmit such data as well as receive visual/audible alerts and warnings over an extended rugged area. In addition to wireless node 208 being equipped with flow sensor 202 (e.g., an accelerometer), other sensors (e.g., sensors such as onboard GPS, temperature, and the like) can be interfaced with wireless node 208. It is contemplated that wireless node 208 can be a mobile node that forms an arbitrary network topology for use in a multi-hop packet routing protocol to relay sensor signal 205 to the command center. The multi-hop capability provides robust communication in a variety of environments by routing around natural and man-made terrain features. Wireless node 208 can communicate over selected distance with burst rates of tens of kilobits per second or greater. Embedded software on each wireless node 208 captures, processes, and routes sensor signal 205 through the network and can display alert information to the user carrying wireless node 208.

In a fire fighting scenario, wireless fire hose flow rate apparatus 200 can include multiple fire hoses 203, flow sensors 202, and wireless nodes 208 connected to base station 209 and flow display 214 with a graphical user interface (GUI). Wireless nodes 208 and base station 209 can use the same hardware perhaps with minor variations to accommodate different functionality. Additionally, software used by flow sensor 202 and base station 209 can be different to accommodate functionality specific to each node type. Wireless sensor network 201 can be accessed through, e.g., a web-based GUI that can be a client-server based application to provide web-based capability.

Wireless node 208 can include integrated hardware as part of an ad-hoc wireless mesh network to collect real-time or near real-time telemetry from flow sensor 202. Wireless node 208 also can incorporate a user interface for receiving or producing audible or visual alerts and sending an alert signal when an emergency situation occurs. This safety feature can be used in a mayday situation when a firefighter is separated from a hose or may aid in finding a way out of a burning structure. An audible alert could help the firefighter locate the hose again. Further, wireless node 208 can incorporate spatial and frequency hopping capability with periodic updates of the local network topology to allow for rerouting of telemetry data and alerts as the network topology changes due to movements of wireless nodes or wireless nodes being powered up or down. Telemetry data including sensor signal 205 from flow sensor 202 ultimately can be sent to a remote command center via a long distance repeater link or internet connection to a web-based server for personnel status and to broadcast alerts back to wireless nodes for impending dangerous conditions requiring immediate action.

Figure 59:
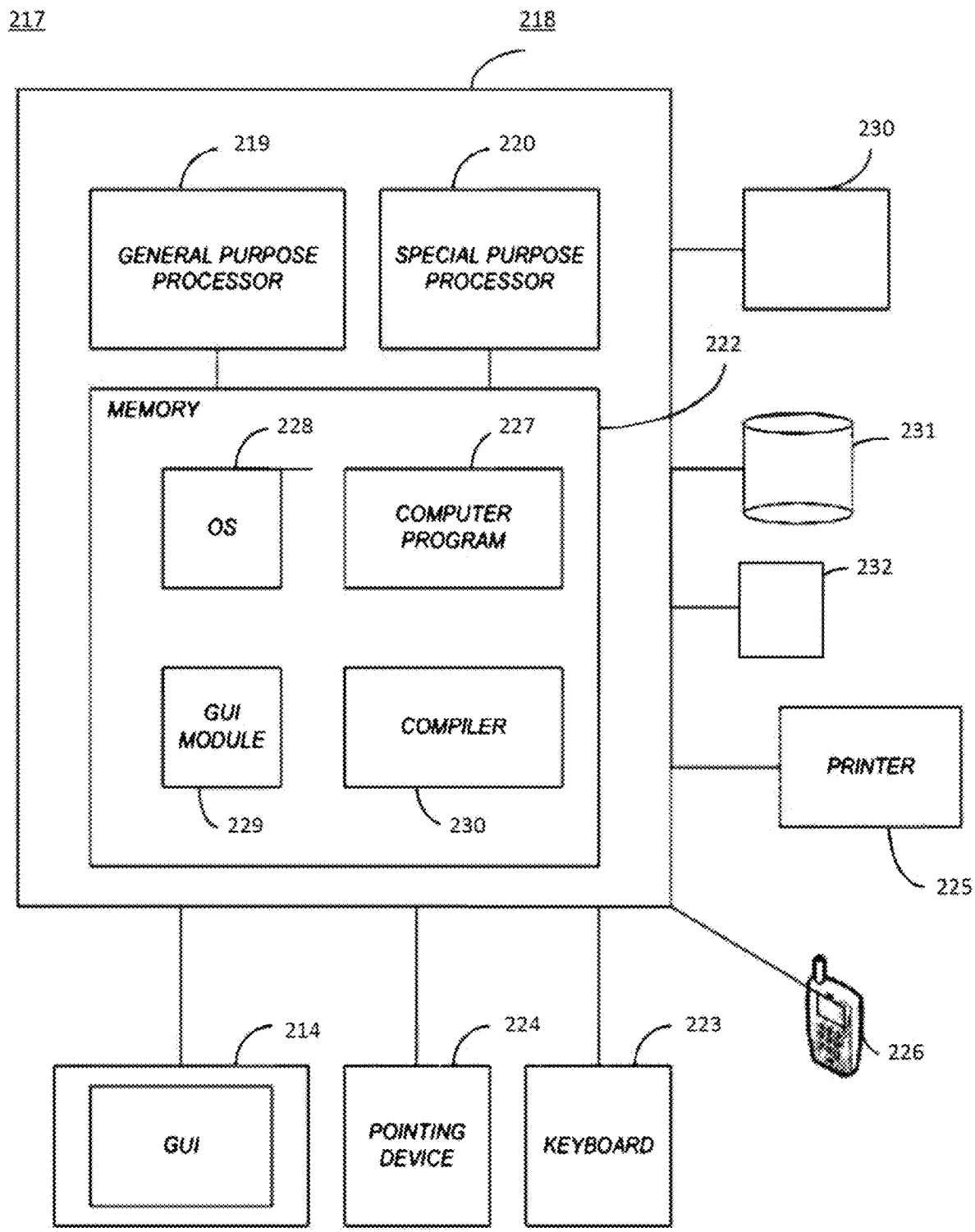
FIG. 59 shows: a hardware and software environment for a flow rate analyzer.

Flow rate analyzer 207 is in electrical communication with base station 209 to receive sensor signal 205 from base station 209 from which flow rate analyzer 207 determines the flow rate in fire hose 203. Flow rate analyzer 207 can include various hardware and software to measure the flow rate of fluid in fluid-conductive conduit, particularly fire hose 203. FIG. 59 shows an exemplary hardware and software environment 217 used to implement flow rate analyzer 207, flow display 214, or other components of the system. The hardware and software environment 217 includes computer 218 and can include peripherals. Computer 218 can be a user/client computer, server computer, or may be a database computer. Computer 218 can include general purpose hardware processor 219 or special purpose hardware processor 220 (hereinafter alternatively collectively referred to as processor 221) and memory 222, such as random access memory (RAM). Computer 218 can be coupled to or integrated with other devices including input/output (I/O) devices such as keyboard 223, cursor control device 224 (e.g., a mouse, a pointing device, pen and tablet, touch screen, multi-touch device, and the like), or printer 225. In an embodiment, computer 218 includes or is coupled to a portable or media viewing/listening device (e.g., an MP3 player, iPod™, Nook™, portable digital video player, cellular device, personal digital assistant, etc.). In some embodiments, computer 218 includes a multi-touch device, mobile phone, gaming system, internet enabled television, television set top box, or other internet enabled device executing on various platforms and operating systems.

In an embodiment, computer 218 operates by general purpose hardware processor 219 performing instructions defined by computer program 227 under control of operating system 228. Computer program 227 or operating system 228 can be stored in memory 222 and can interface with the user or other devices to accept input and commands and, based on such input and commands and the instructions defined by computer program 227 and operating system 228, to provide output and results.

Output/results can be presented on display 214 or provided to another device for presentation or further processing or action. In an embodiment, display 214 includes a liquid crystal display (LCD) having a plurality of separately addressable liquid crystals. Alternatively, display 214 can include a light emitting diode (LED) display having clusters of red, green, and blue diodes driven together to form full-color pixels. Each liquid crystal or pixel of display 214 changes to an opaque or translucent state to form a part of the image on the display in response to the data or information generated by processor 221 from the application of the instructions of computer program 227 or operating system 228 to the input and commands. The image can be provided through graphical user interface (GUI) module 229. GUI module 229 can be a separate module, or the instructions performing the GUI functions can be resident or distributed in operating system 228, computer program 227, or implemented with special purpose memory and processors.

In an embodiment, display flow display 214 is integrated with/into computer 218 and includes a multi-touch device having a touch-sensing surface (e.g., track pod or touch screen) and ability to recognize the presence of two or more points of contact with the surface. Examples of multi-touch devices include mobile devices (e.g., iPhone™ Nexus S™, Droid™ devices, and the like), tablet computers (e.g., iPad™ HP Touchpad™), portable/handheld game/music/video player/console devices (e.g., iPod Touch™, MP3 players, Nintendo 3DS™, PlayStation Portable™, and the like), touch tables, and walls (e.g., where an image is projected through acrylic or glass, and the image is then backlit with LEDs).

Some or all of the operations performed by computer 218 according to computer program 227 instructions can be implemented in special purpose processor 220. In this embodiment, some or all of the computer program 227 instructions can be implemented via firmware instructions stored in a read-only memory (ROM), a programmable read only memory (PROM), or flash memory within special purpose processor 220 or in memory 222. Special purpose processor 220 also can be hardwired through circuit design to perform some or all of the operations to implement various embodiments. Further, special purpose processor 220 can be a hybrid processor, which includes dedicated circuitry for performing a subset of functions, and other circuits for performing more general functions such as responding to computer program 227 instructions. In one embodiment, special purpose processor 220 is an application-specific integrated circuit (ASIC).

Computer 218 also can implement compiler 230 that allows an application or computer program 227 written in a programming language such as COBOL, Pascal, C++, FORTRAN, or other language to be translated into processor 221 readable code. Alternatively, compiler 230 can be an interpreter that executes instructions/source code directly, translates source code into an intermediate representation that is executed, or that executes stored precompiled code. Such source code may be written in a variety of programming languages such as Java™, Perl™, Basic™, and the like. After completion, the application or computer program 227 accesses and manipulates data accepted from I/O devices and stored in memory 222 of computer 218 using relationships and logic that were generated using compiler 230. In addition to or instead of the application being from computer program 227, a script can be performed from a scripting language such as Python or JavaScript.

Computer 218 also optionally includes an external communication device such as a modem, satellite link, Ethernet card, or other device for accepting input from, and providing output to, other computers 218 or a server.

In an embodiment, instructions implementing operating system 228, computer program 227, and compiler 230 are tangibly embodied in a non-transient computer-readable medium, e.g., data storage device 231 that can include one or more fixed or removable data storage devices 232, such as a flash drive, zip drive, floppy disc drive, hard drive, CD-ROM drive, tape drive, and the like. Further, operating system 228 and computer program 227 include computer program 227 instructions that, when accessed, are read and executed by computer 218, cause computer 218 to perform steps necessary to implement or use embodiments herein or to load the program of instructions into memory 222, thus creating a special purpose data structure causing computer 218 to operate as a specially programmed computer executing the method steps described herein. Computer program 227 or operating instructions also can be tangibly embodied in memory 222 or data communications devices 233, thereby making a computer program product or article of manufacture according to embodiments herein. As such, the terms "article of manufacture," "program storage device," and "computer program product," as used herein, are intended to encompass a computer program accessible from any computer readable device or media. It will be appreciated that any combination of the above components or any number of different components, peripherals, and other devices can be used with computer 218.

Figure 60:
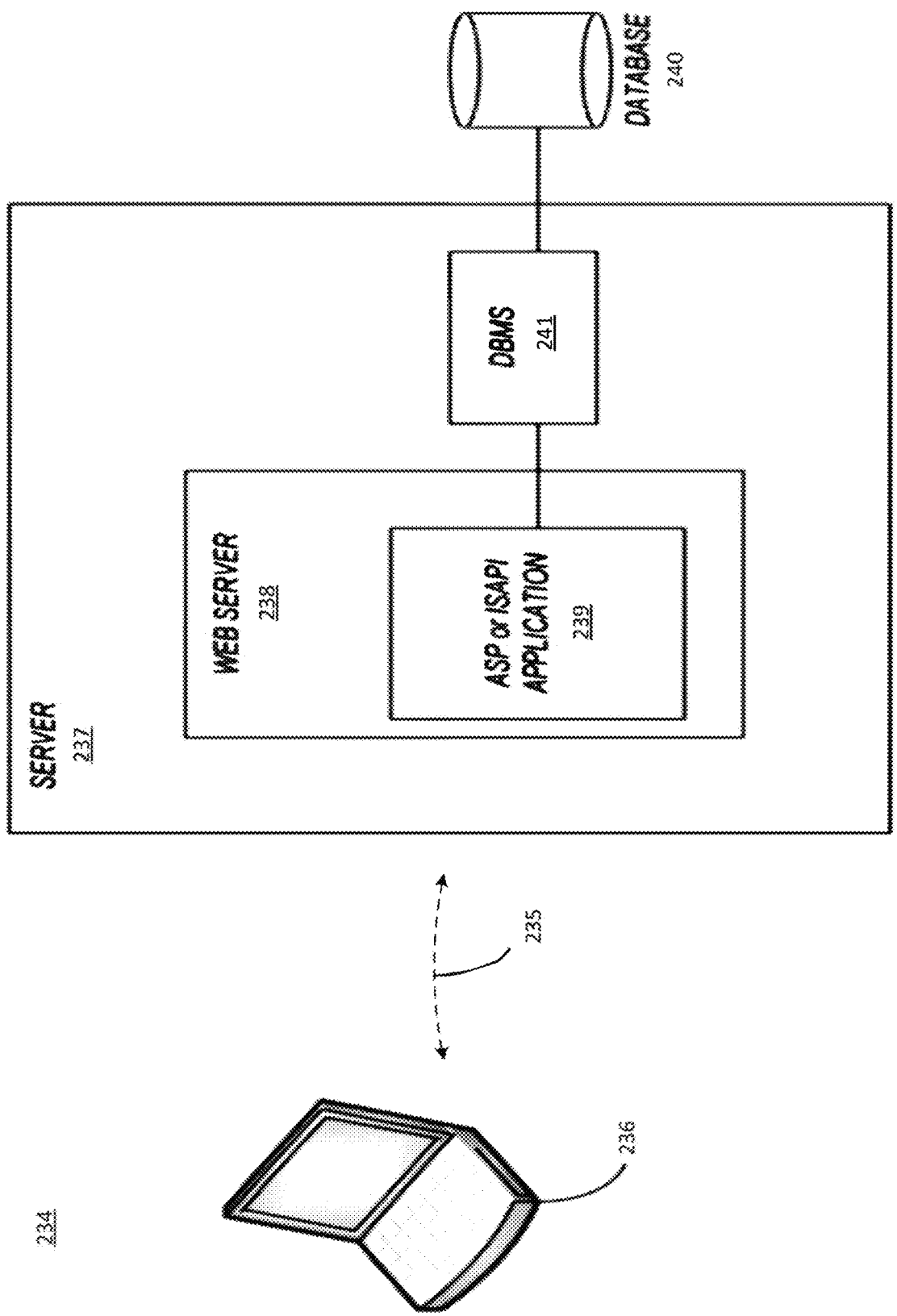
FIG. 60 shows: a distributed computer system using a network to connect client computers to server computers.

With reference to FIG. 60, a distributed computer system 234 uses a network 235 to connect client computers 236 to server computers 237. A combination of resources can include a network 235 including the Internet, LANs (local area networks), WANs (wide area networks), SNA (systems network architecture) networks, or the like, clients 236 that are personal computers or workstations, and servers 237 that are personal computers, workstations, minicomputers, or mainframes. However, different networks such as a cellular network (e.g., GSM [global system for mobile communications] or otherwise), a satellite based network, or any other type of network can be used to connect clients 236 and servers 237 in accordance with embodiments.

Network 235 such as the Internet connects clients 236 to server computers 237. Network 235 can use ethernet, coaxial cable, wireless communications, radio frequency (RF), and the like to connect and provide communication between clients 236 and servers 237. Clients 236 may execute a client application or web browser and communicate with server computers 237 executing web servers 238. Such a web browser can be a program such as MICROSOFT INTERNET EXPLORER™ or EDGE™, MOZILLA FIREFOX™ OPERA™ APPLE SAFARI™, GOOGLE CHROME™, and the like. Further, the software executing on clients 236 can be downloaded from server computer 237 to client computers 236 and installed as a script, plug-in, or ACTIVEX™ control of a web browser. Accordingly, clients 236 can use ACTIVEX™ components/component object model (COM) or distributed COM (DCOM) components to provide a user interface on a display of client 236. The web server 238 can be a program such as MICROSOFT'S INTERNET INFORMATION SERVER™.

Web server 238 can host an active server page (ASP) or Internet server application programming interface (ISAPI) application 239 that may execute scripts. The scripts invoke objects that execute business logic (referred to as business objects). The business objects then manipulate data in database 240 through a database management system (DBMS) 241. Alternatively, database 240 may be part of, or connected directly to, client 236 instead of communicating/obtaining the information from database 240 across network 235. When a developer encapsulates the business functionality into objects, the system can be referred to as a component object model (COM) system. Accordingly, the scripts executing on web server 238 (or application 239) invoke COM objects that implement the business logic. Further, server 237 can use a transaction server to access data stored in database 240 via an interface such as ADO (active data objects), OLE DB (object linking and embedding database), or ODBC (open database connectivity).

Components 234-241, e.g., as shown in FIG. 60, can include logic or data that is embodied in or retrievable from device, medium, signal, or carrier, e.g., a data storage device, a data communications device, a remote computer, or device coupled to the computer via a network or via another data communications device, and the like. Moreover, this logic or data, when read, executed, or interpreted, results in the steps to implement or use the embodiment being performed.

Although the terms "user computer," "client computer," or "server computer" are referred to herein, it is understood that such computers 236 and 237 can be interchangeable and further can include thin client devices with limited or full processing capabilities, portable devices such as cell phones, notebook computers, pocket computers, multi-touch devices, or other devices with suitable processing, communication, or input/output capability.

It will be appreciated that any combination of the above components or any number of different components, peripherals, and other devices can be used with computers 236 and 237. Embodiments can be implemented as a software application on client 236 or server computer 237. Further, client 236 or server computer 237 can include a thin client device or a portable device that has a multi-touch-based display.

When flow rate analyzer 207 receives sensor signal 205, flow rate analyzer 207 determines flow rate 215 of the fluid (e.g., water) in fluid-conductive conduit, e.g., fire hose 203, from sensor signal 205 by applying a relationship between dominant frequency 213 of sensor signal 205 and nominal flow rates, e.g., as shown in FIG. 1. The nominal flow rate can be determined before or after flow rate analyzer 207 receives sensor signal 205, e.g., using separate hardware as described above. In an embodiment, flow rate analyzer 207 determines flow rate 215 of the water in fire hose 203 from sensor signal 205 by converting sensor signal 205 from the time domain to the frequency domain to form frequency transform spectrum 212; determining dominant frequency 213 in frequency transform spectrum 212; and matching dominant frequency 213 to a unique nominal flow rate, e.g., as shown in lower panel of FIG. 1. Subsequently, flow display 214 displays information about flow rate 215 of the water in the fire hose 203 as determined by flow rate analyzer 207.

Wireless fire hose flow rate apparatus 200 can be made of various elements and components that are custom fabricated or commercially available components. Elements of wireless fire hose flow rate apparatus 200 can be various sizes. It is contemplated that flow sensor 202 can be selected based on a frequency of vibration produced by fire hose 203, which can be varied by a choice of materials included in fire hose 203 and nozzle 204. Elements of wireless fire hose flow rate apparatus 200 can be made of a material that is physically or chemically resilient in an environment in which wireless fire hose flow rate apparatus 200 is disposed. Exemplary materials include a metal, ceramic, thermoplastic, glass, semiconductor, and the like. The elements of wireless fire hose flow rate apparatus 200 can be made of the same or different material and can be monolithic in a single physical body or can be separate members that are physically joined.

Wireless fire hose flow rate apparatus 200 can be made in various ways. It should be appreciated that wireless fire hose flow rate apparatus 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead or physical compartmentalization. As a result, wireless fire hose flow rate apparatus 200 can be disposed in a terrestrial environment or space environment. According to an embodiment, the elements of wireless fire hose flow rate apparatus 200 are formed using 3D printing although the elements of wireless fire hose flow rate apparatus 200 can be formed using other methods, such as injection molding or machining a stock material such as block of material that is subjected to removal of material such as by cutting, laser oblation, and the like. Accordingly, parts of the wireless fire hose flow rate apparatus 200 can be made by additive or subtractive manufacturing.

Wireless fire hose flow rate apparatus 200 has numerous advantageous and unexpected benefits and uses. In an embodiment, a process for measuring flow rate in a fire hose with wireless fire hose flow rate apparatus 200 includes: flowing water through fire hose 203; detecting, by flow sensor 202, vibrations of fire hose 203 generated by water flowing through fire hose 203; producing, by flow sensor 202, sensor signal 205 based on the vibrations of fire hose 203 detected by flow sensor 202; communicating sensor signal 205 from flow sensor 202; receiving, by wireless node 208 in electrical communication with flow sensor 202, sensor signal 205 from flow sensor 202; wirelessly communicating sensor signal 205 from wireless node 208; wirelessly receiving, by base station 209 in radiocommunication with wireless node 208, sensor signal 205 from wireless node 208; communicating sensor signal 205 by base station 209; receiving, by flow rate analyzer 207 in electrical communication with base station 209, sensor signal 205 from base station 209; and determining, by flow rate analyzer 207, flow rate 215 of the water in fire hose 203 from sensor signal 205.

The process for measuring flow rate can include applying, by flow rate analyzer 207, a relationship between dominant frequency 213 of sensor signal 205 and nominal flow rates to determine flow rate 215 of the water in fire hose 203 from sensor signal 205. The nominal flow rate can determined before or after flow rate analyzer 207 receives sensor signal 205. Determining, by flow rate analyzer 207, the flow rate of the water in fire hose 203 from sensor signal 205 can include: converting sensor signal 205 from time domain data 211 to the frequency domain to form frequency transform spectrum 212; determining dominant frequency 213 in frequency transform spectrum 212; and matching dominant frequency 213 to a unique nominal flow rate as flow rate 215 of the water in fire hose 203. Exemplary data steps are shown in FIG. 1

The process for measuring flow rate can include displaying, by flow display 214 in communication with flow rate analyzer 207, information about flow rate 215 of the water in fire hose 203 as determined by flow rate analyzer 207 and making nominal flow rate curve 216 comprising data pairs of dominant frequency and nominal flow rate. Making nominal flow rate curve 216 can include: acquiring time domain vibration data over a set of discrete nominal flow rates of water flowing through fire hose 203; and converting, for the discrete nominal flow rates of water flowing through fire hose 203, the corresponding time domain vibration data to the frequency domain and determining the dominant frequency at each discrete nominal flow rate to form a set of pairs of dominant frequency and nominal flow rate for nominal flow rate curve 216.

Wireless fire hose flow rate apparatus 200 and processes disclosed herein have numerous beneficial uses, including: improving situational awareness where firefighters will know that water is flowing from an out of sight hose nozzle; identifying emergency situations when water is not flowing to the nozzle because the hose is blocked or ruptured; identifying that water is flowing throughout a building's standpipe system for fire suppression; providing situational awareness to the pump operator so the pump operator knows what is flowing rather than allowing on pressure at the pump while performing other fireground tasks; benefitting the fire service in extremely hazardous environments such as chemical, radiation, or explosive environments, where a charged hose line is advanced with a robot and a robot mounted camera may not be able to visually provide confirmation of water flow in smoky or dark conditions that block the camera from capturing images; measuring water flow at many locations along a forestry hose in wildland firefighting would improve situational awareness where a forestry hose line may be stretched unattended and out of sight for hundreds of feet along a fire line, and may develop a hose leak due to a puncture from ground debris or develop a burn hole from a spot fire or flying embers; or providing feedback from hose flow to be used by an incident commander to determine how and where to apply tanker water at large fires. Wireless fire hose flow rate apparatus 200 is applicable to a number of measurements, including moderate and high flow rates in tubing.

Advantageously, wireless fire hose flow rate apparatus 200 overcomes limitations and technical deficiencies of conventional devices and conventional processes such as: conventional hoses may not use flow meters; conventional flow meters can be heavy or bulky and used for hose testing instead of for firefighting; conventional devices are in-line with the flow and can be difficult to service or repair; or some conventional inline meters involve turbine blades that spin in the flow and can be blocked by debris in the flow. Further, wireless fire hose flow rate apparatus 200 provides a lightweight and small flow system that can measure flow for the fire service, provide an external device that will not block water flow, and can be installed and replaced easily.

Wireless fire hose flow rate apparatus 200 and processes herein unexpectedly provides improved situational awareness on the fireground where water flow at the hose nozzle is wirelessly communicated to an incident commander away from the fire. Because of its small size and robustness, it can be used during firefighting operations. Moreover, wireless fire hose flow rate apparatus 200 provides a smart system to provide water flow to an incident commander to quick operational decisions.

The articles and processes herein are illustrated further by the following Examples, which are non-limiting.

EXAMPLES

Example 1

A wireless sensor network was created to measure water-flow rate in a fire hose. An integrated electronic piezoelectric (IEPE) accelerometer was chosen as the sensor to measure the flow rate based on the vibrations generated by water flowing through a fire hose close to the hose nozzle. These sensors are small, lightweight, and they can attach to the outside of the hose, not obstructing the water's flow path. A relationship between the dominant-frequency metric and the flow rate was applied and used to determine real-time water flow in a fire hose critical for improving fireground situational awareness. A nearly monotonic relationship of flow rate to the dominant frequency was established and then used in a custom graphical user interface for quick, real-time, visual referencing by fire personnel of flow rate in a fire hose. While more work is needed, such as improved physical robustness of the sensor-node assembly and increase robustness of the signal metric, this preliminary study showed the potential of a "smart" fire hose for improved situational awareness during a fire attack.

Smart Fire Fighting—Water Flow at the Fire Hose Nozzle

Placing, and flowing water, from the initial hose line, and including all other hose lines, at a fire is very important for the success of the fire attack. The water flowing from the hoses helps cool the environment which improves the chance of survival of trapped occupants, protects the fire fighters from excessive heat, and extinguishes the fire. Therefore, hoses are simultaneously a fire fighter's and occupant's lifeline. Knowing the rate at which water is flowing through those hoses is a critical part of those lifelines, in general, and situational awareness, in particular, especially if that rate is zero, which unfortunately happens.

Applying 'smart' technology to a fire hose could improve the awareness of the hose's current status and the chance of a successful fire attack. Harnessing the power of 'smart' technology to improve situational awareness of the hoses was a part of the vision of Smart Fire Fighting. A 'smart' system uses sensors to collect data, provides the data in an understandable format to a user, then allows the user to make a decision. Today, the users are human, but tomorrow they may include software.

Figure 2:
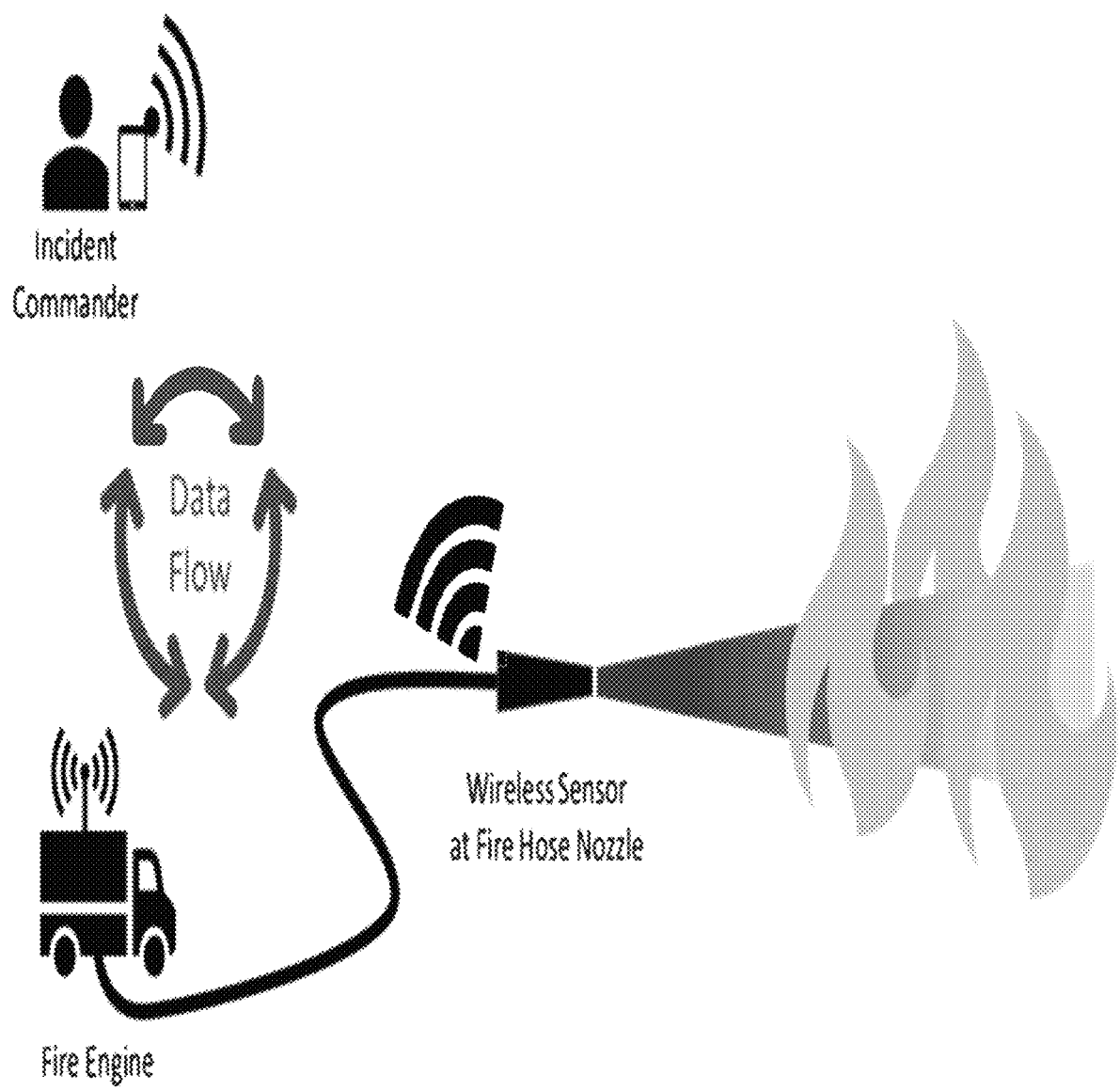
FIG. 2 shows: a smart sensor network can measure flow rate at the fire hose nozzle and wirelessly communicate the flow rate in real time to the incident commander (IC) and pump operator for decision making.

Human fire fighters are the backbone of the fire service. The safety of fire fighters who risk their lives on the fireground could benefit from a smart sensor network, that could perform two tasks: determine if water is flowing at the fire hose nozzle and communicate this information back to the pump operator or incident commander (IC) at the fire engine. The smart system includes a sensor at the nozzle, wirelessly transmitting the flow rate data to the incident commander (IC), and a way to present the data to the IC (FIG. 2). The IC must be able to make quick decisions regarding the water flow for suppression activities on the fireground.

Conventionally, communication between the fire fighter at the nozzle and the pump operator or IC is typically done using radios. The fire fighter at the nozzle, or his backup, should be able to communicate by radio with the pump operator or IC to provide feedback about water flow. However, this is not always possible to do with competing radio traffic, while the team is advancing the hose, and conducting suppression activities that take two hands.

Presently, water pressure measured at the fire engine's pump panel is used by the pump operator to determine if water is flowing at the hose nozzle. Fireground threats to normal water flow such as hose damage and hose blockage can make reliable decisions on water pressure misleading. A pressure loss indicated on the fire engine's pump panel may occur when water flows from the nozzle, as intended, or unintentionally through a ruptured hose. A ruptured hose can occur as a result of wear and tear, a burn hole in the hose, a leaking coupling, or from being crushed under a vehicle tire or structure debris.

Sufficient water pressure may show at the pump panel even if the hose is partially or fully blocked preventing water, or allowing too little water, from reaching the nozzle. A charged hose line advanced inside a structure could become partially blocked as a result of being crimped around a sharp corner or past a piece of furniture. A hose pinched under a door, under a piece of furniture, under a vehicle tire, or under fallen debris could also reduce water flow at the nozzle. Water flow through the hose could be fully blocked by a closed in-line valve, debris in the hose, or by a closed nozzle bale that cannot be opened by an incapacitated fire fighter.

The safest way for the IC to know that water is flowing from the hose nozzle is to have real-time water flow information sent to them. The goal of this study is to provide that information digitally by developing a wireless-sensor network to measure water flow in a fire hose. Our approach is to collect vibration data, send it to the IC's laptop, and then convert it into a flow rate based on data-derived correlations. Flow rate will be determined in real time to improve fireground situational awareness.

Vibrations from fluid or gas flow can occur in any relatively rigid pipe such as water, oil, and gas utility or industrial pipes. Wired sensors, including accelerometers, have been attached securely to the outside surface of rigid pipes to measure fluid or gas induced pipe vibrations to determine flow rate within the pipe in research settings as well as in the utility pipeline industry.

The advantages of wireless sensor networks have resulted in their application to rigid pipes and utility pipelines to detect flow and assess pipeline health where long distances of pipe can be checked from fewer remote locations. Wireless technology has been applied to fire hoses. An in-line, turbine, commercial wireless flow meter is available for fire hoses that transmits data to a hand-held device using Bluetooth® that reports the flow rate. The turbine also supplies power to the hose meter.

Wireless Sensor Network (WSN) Components

Figure 3:
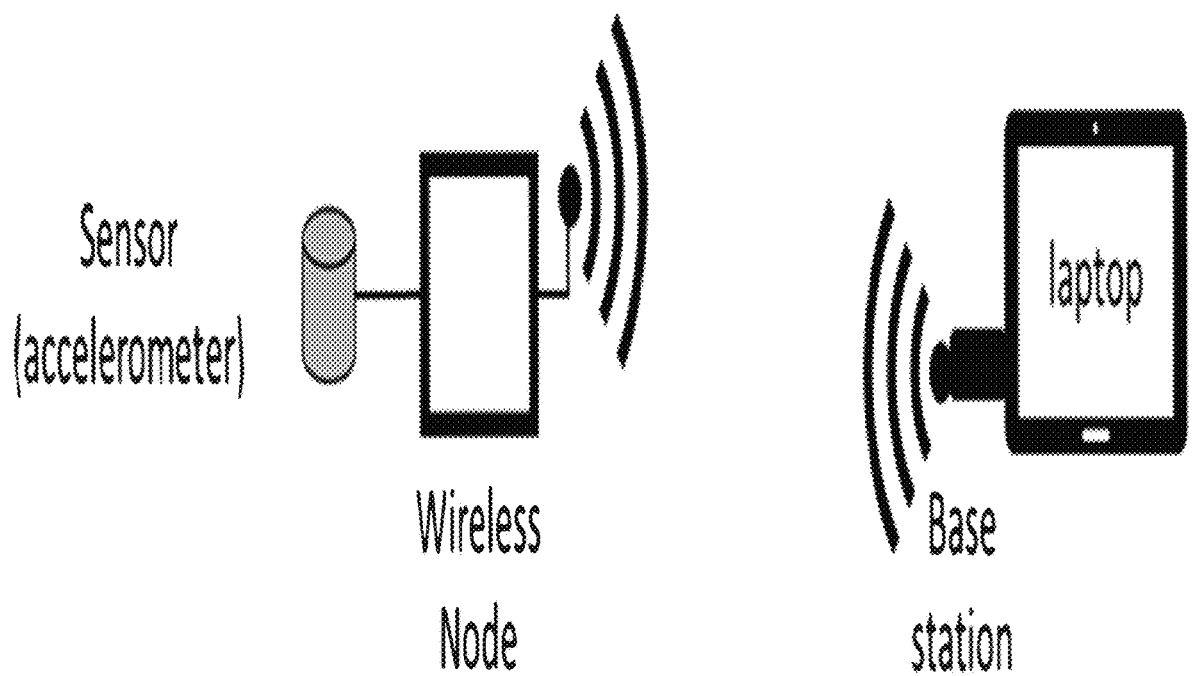
FIG. 3 shows: the wireless sensor network components: 1) The accelerometer sensor, 2) the wireless node, and 3) the base station at the laptop.

The wireless sensor network included the accelerometer as the sensor, the wireless node, and the base station (FIG. 3). The sensor collects data, the wireless node transmits the data, and the base station receives the data and passes it to a laptop for analysis. However, processing can be done on a microcontroller, and then the estimate (one number instead of thousands of raw data points) can be sent to the laptop, which can save a time or energy for sending the data.

Wireless Sensor Network—Sensor—Accelerometer

Accelerometers measured the vibration of the hose caused by water flowing through the fire hose. Two accelerometers were used on the hose at the Front (downstream) and Back (upstream) locations for one series of tests (Test 4). Three accelerometers collected data from the Front, Mid (middle) and Back locations on the hose for the following two different series of tests (Test 5 and Test 6). The wired sensor network tests from the previous tests were labeled as Test 1, Test 2, and Test 3.

Figure 4:
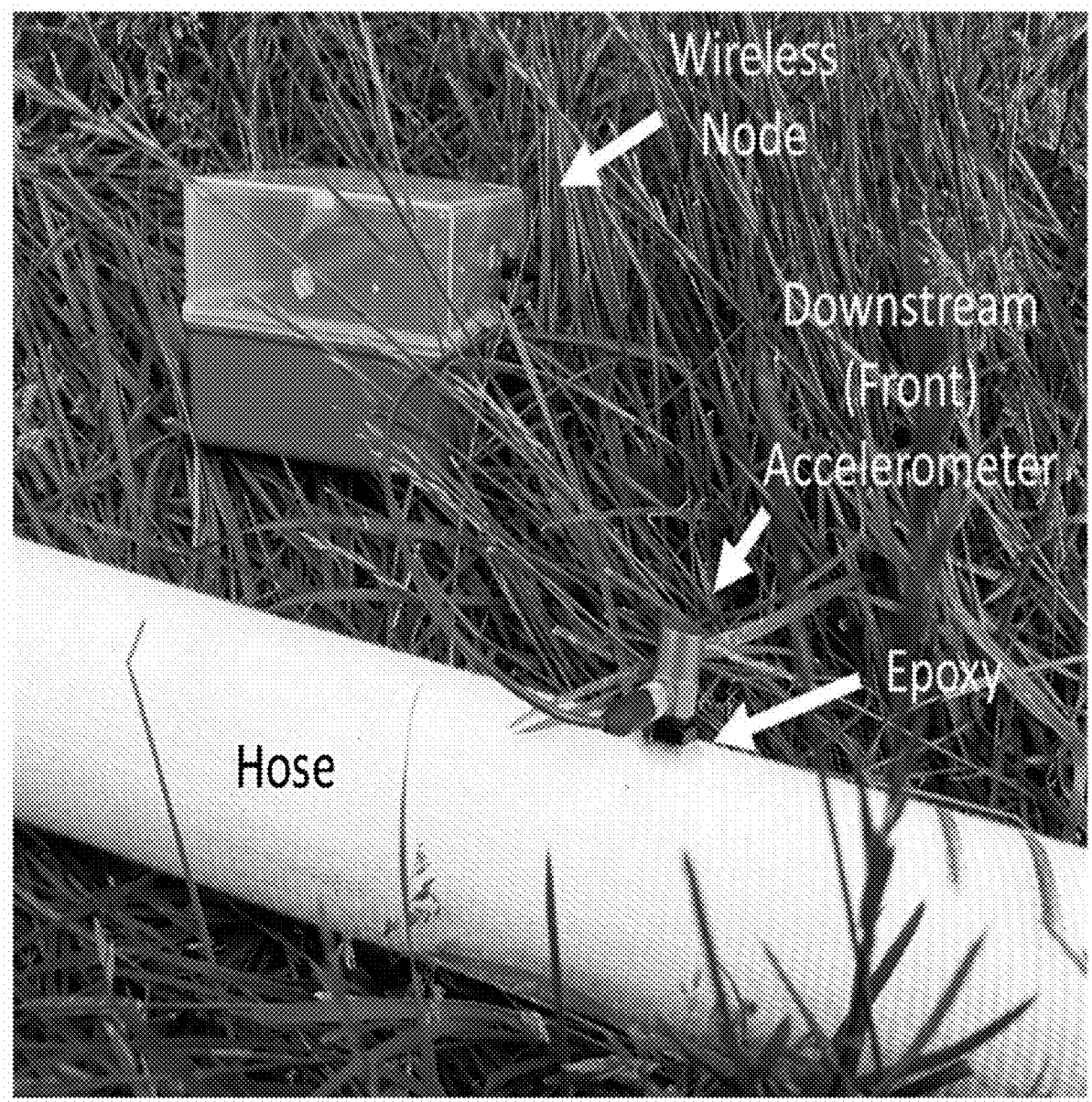
FIG. 4 shows: the Front accelerometer attached to a base that was epoxied to the exterior fabric of the fire hose. The wireless node is inside a protective plastic box.
Figure 6:
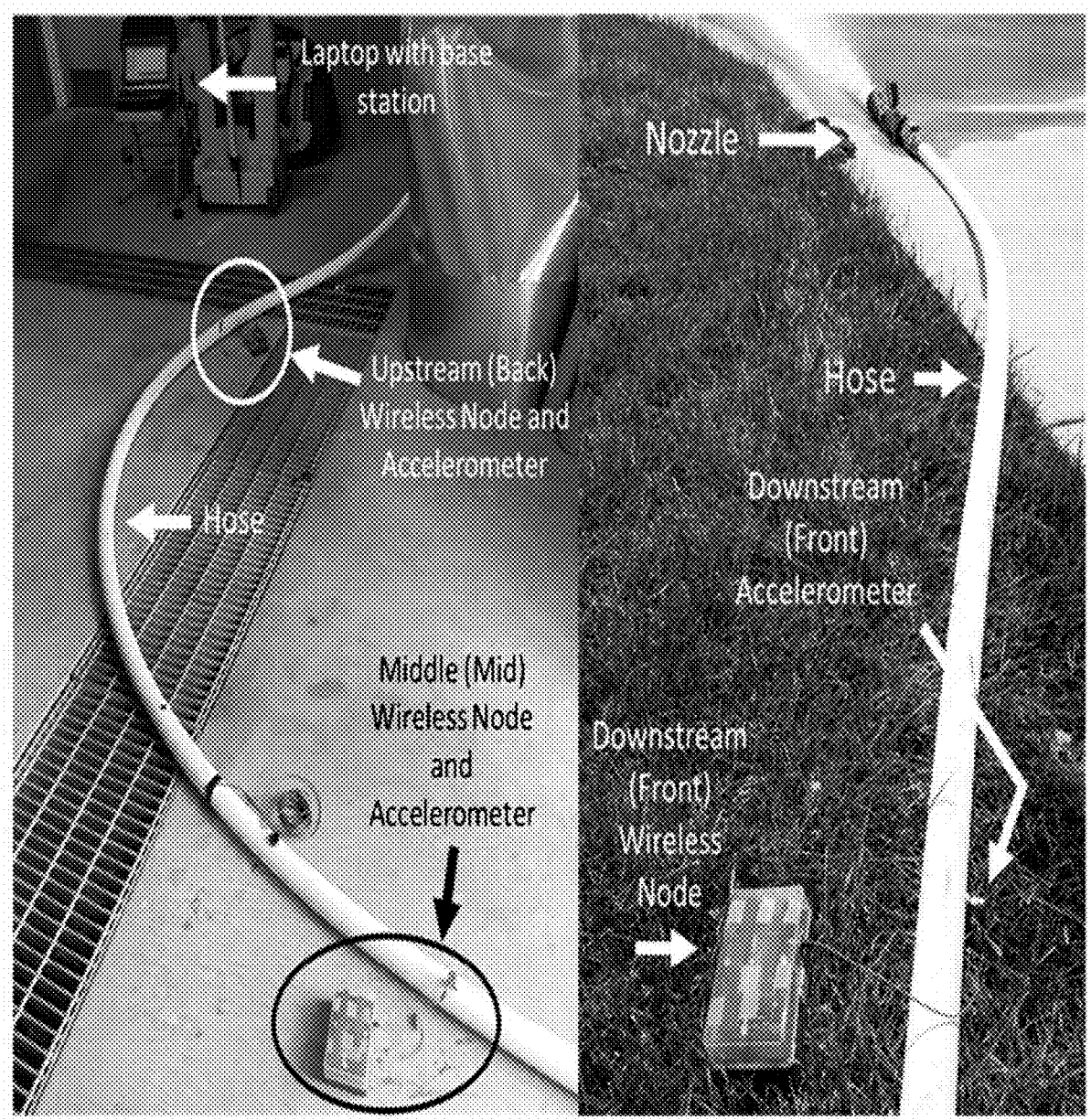
FIG. 6 shows: the two accelerometers at the Back and Mid locations on the concrete floor (left), and the accelerometer at the Front location outside in the grass close to the nozzle (right)

The piezoelectric accelerometers at either end of the hose measured acceleration and stand about 2 cm high mounted on a base epoxied to the exterior fabric of the fire hose (FIG. 4). The Front accelerometer was located approximately 3 m (10 ft) from the nozzle on a section of hose laying on grass (FIG. 5 and FIG. 6). The Back accelerometer was located approximately 2.4 m (8 ft) from the hose attachment to the water source at a position where the fire hose was on the concrete floor.

Figure 7:
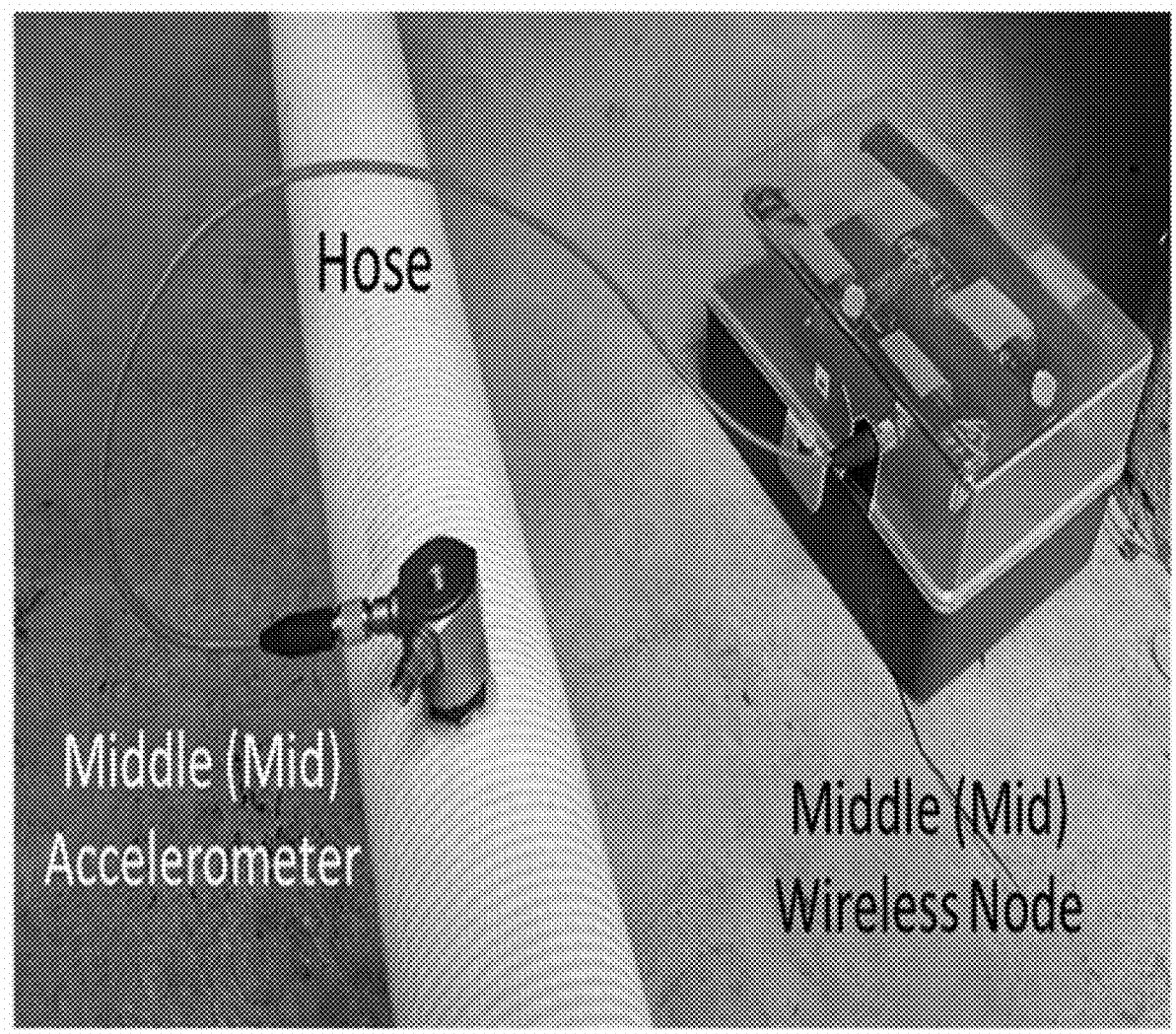
FIG. 7 shows: the Mid accelerometer mounted to the base on the exterior fabric of the fire hose.

The Mid accelerometer (PCB model 288D01) also measured acceleration and was about 2 cm high mounted in the same way to the hose (FIG. 7). The Mid accelerometer was located approximately 10 m (32.5 ft) from the nozzle (FIG. 5) on a section of hose that was on the concrete floor (FIG. 7). Power to the accelerometers was supplied from the wireless nodes.

Wireless Sensor Network—Node

Figure 8:
FIG. 8 shows: the wireless node with antenna.

The second component of the wireless sensor network was the wireless node (FIG. 8). Each accelerometer was connected to a wireless node by a coaxial cable with 10-32 connectors. Some wireless nodes may include an embedded sensor, however for this study, the same accelerometers were also used for the wired sensor network in another study.

Figure 9:
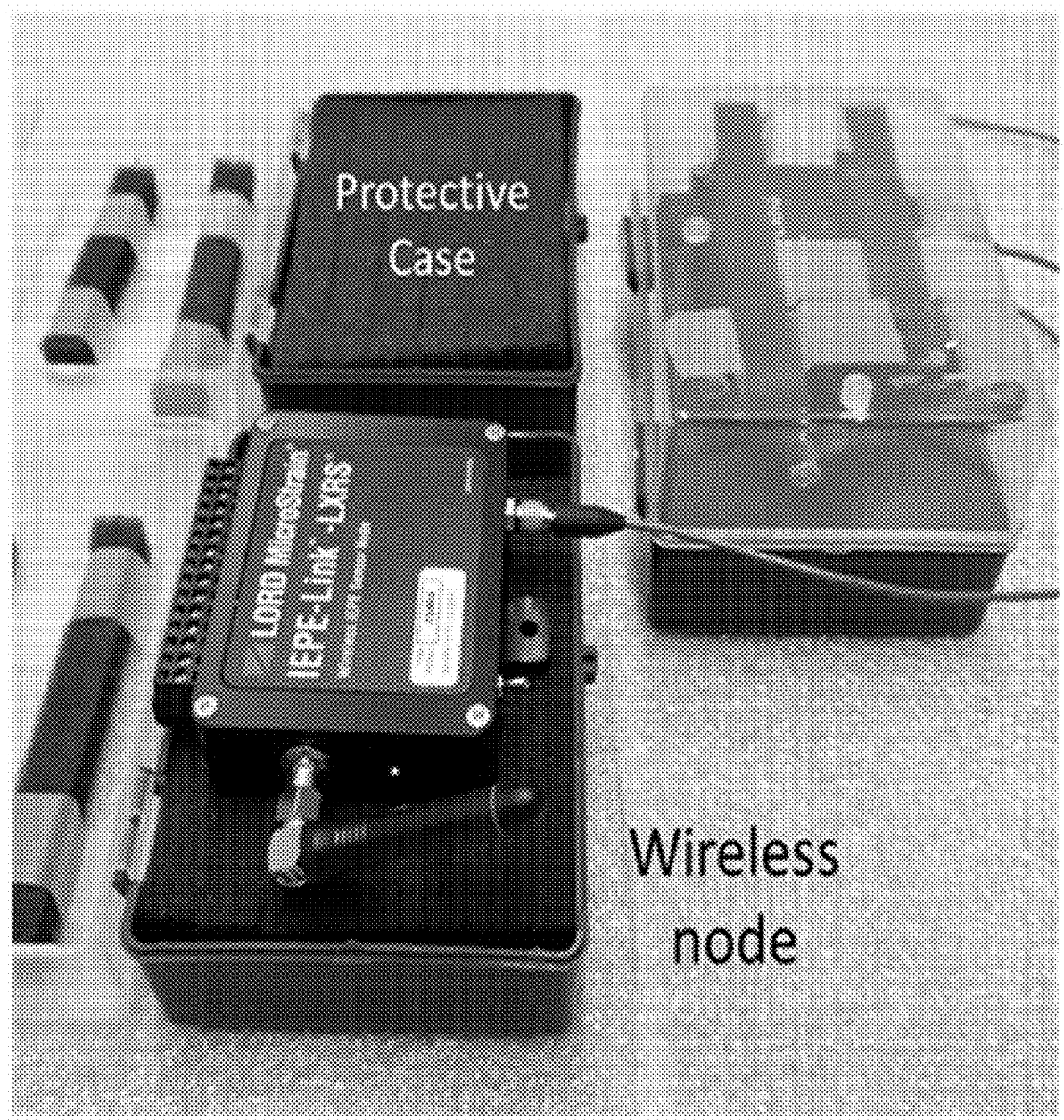
FIG. 9 shows: during testing, the wireless node was inside a protective plastic box to avoid damage.

The number of wireless nodes used in the wireless sensor network affects the data sampling frequency, data collection time, and interval between data collection times. For data collection, three wireless nodes were used. The node is powered by a rechargeable battery which also powered the accelerometers. During testing in this study, the nodes were placed within a protective plastic box to prevent damage (FIG. 9). The protective plastic box did not affect the wireless signal.

Wireless Sensor Network—Base Station

Figure 10:
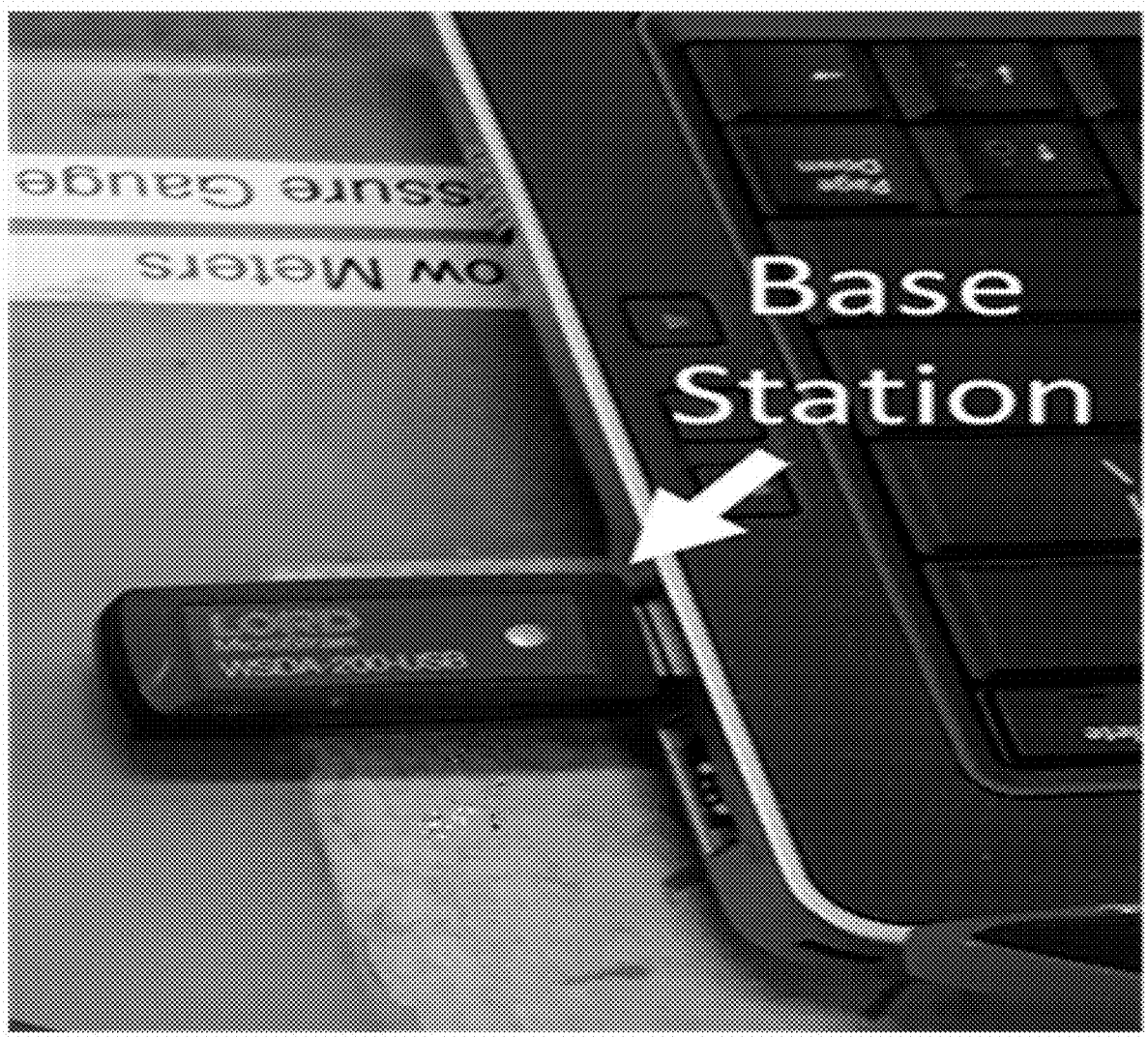
FIG. 10 shows: the base station attached to the laptop through a USB port.

The third component of the wireless sensor network was the base station, also called a gateway (FIG. 10). The wireless nodes communicate with the base station using radio frequency (RF) signal (2.425 GHz) which receives and collects the sensor data. The base station in this study was connected to, and powered by, a laptop via a USB port. The base station synchronized the data from multiple wireless nodes transmitted on the same RF and passed the data to the laptop software for processing.

Experiment Set Up

The commercial fire attack hose used in this study had a nominal 4.5 cm (1.75 in) inner diameter and is approximately 15 m (50 ft) long with 3.8 cm (1.5 in) couplings. It had a polyester inner and outer jacket with EPDM (ethylene propylene diene monomer rubber) synthetic rubber inner lining typical for a commercial fire hose attack line. Water was supplied to the hose from a building interior water supply. The maximum pressure supplied by the water source to the hose was approximately 0.6 MPa (90 psi).

Figure 11:
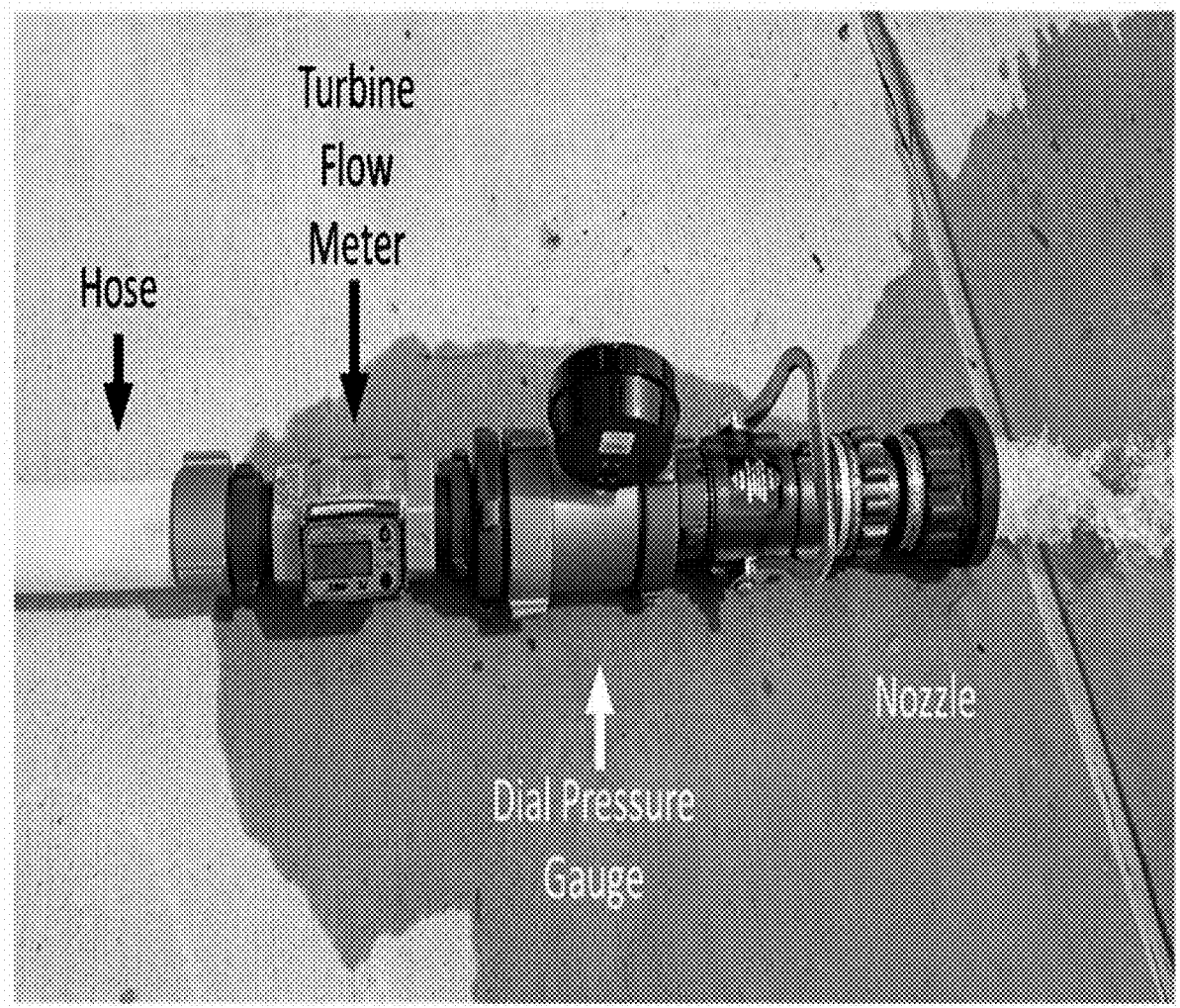
FIG. 11 shows: nozzle, dial pressure gauge, and turbine reference flow meter at the front, or downstream, end of the fire hose used during testing of the system.

A commercial turbine flow meter was used at the nozzle to measure the reference flow rate during the study. The flow meter was shown to provide the correct flow rate following AS/NZS 1221:1997. For a variety of reasons, the reference flow rate drifted approximately ±3.8 LPM (1.0 GPM) at the highest reference flow rates, but drifted less than approximately ±1.9 LPM (0.5 GPM) at the lower reference flow rates. For consistency, the abbreviation 'LPM' represents L/min and 'GPM' represents gallons/min. The turbine flow meter and a dial pressure gauge were attached between the fire hose and the nozzle (FIG. 11). There was sufficiently straight flow upstream and downstream of the commercial flow meter turbine to satisfy the manufacturer's recommendation for maintaining the flow meter accuracy.

In the wireless sensor network used in this study, the wireless nodes sampled data in synchronized bursts and followed a burst cycle. Sampling data continuously was not an available option with the wireless nodes. The burst cycle consisted of four phases: Phase 1—the accelerometer was charged from the wireless node before the first data sampling burst; Phase 2—at the scheduled burst time, the node started sampling data for the duration of the burst period as selected; Phase 3—once data sampling was completed, the data was transmitted from the wireless node to the base station; Phase 4—when transmission was completed, the node returned to its low power mode until the next scheduled burst.

Figure 12:
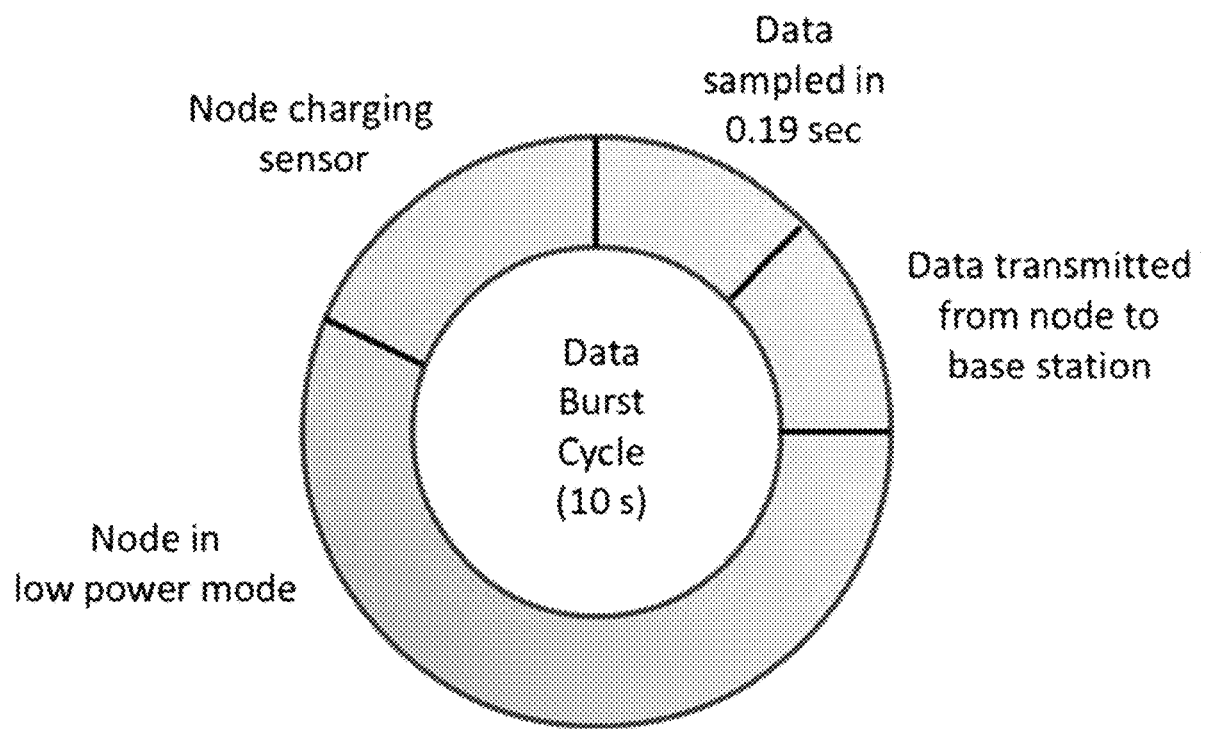
FIG. 12 shows: the data sampling burst cycle for a single node. Data was sampled for 0.19 seconds, every 10 seconds in the burst cycle in this study.

For this study, the parameters for the burst cycle were selected based on the number of nodes in the network and the data sampling rate for the available bandwidth of the wireless sensor network. For a three-node network, and a data sampling rate of 10 kHz, data was sampled for 0.19 seconds every 10 seconds (FIG. 12). The node takes time to transmit data that depends on the amount of sampled data and the transmit rate. The transmit rate for the nodes in this study was automatically set based on the time increment between samples. The data received by the base station was passed to the software in nearly real-time acquisition.

Figure 13:
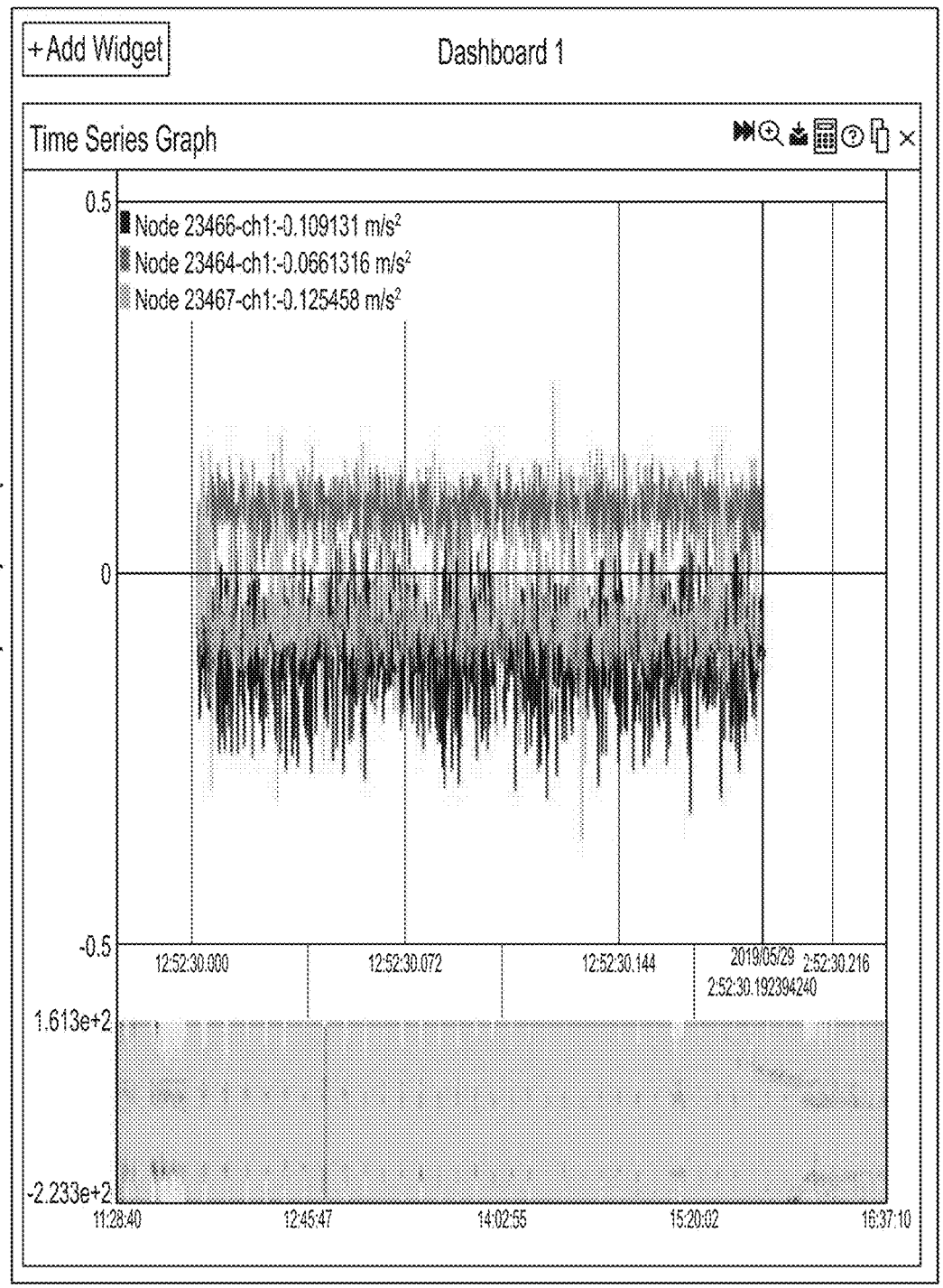
FIG. 13 shows: baseline data collected during a single sampling burst for 0.19 seconds for the no-flow condition in a time-series plot.

The hose was pressurized with the nozzle closed and the dial gauge measured approximately 0.6 MPa (90 psi). Once the three sensors were attached and confirmed to be collecting vibration data, the data collection program was started and vibrations from the Back (upstream), Front (downstream), and Mid (middle) accelerometers were collected at a sampling frequency of 10 kHz. The no-flow vibrations from the three sensors were collected for five minutes. The baseline data collected indicated that the no-flow, noise vibrations were in the range of approximately ±0.1 m/s$^2$ (FIG. 13).

Figure 14:
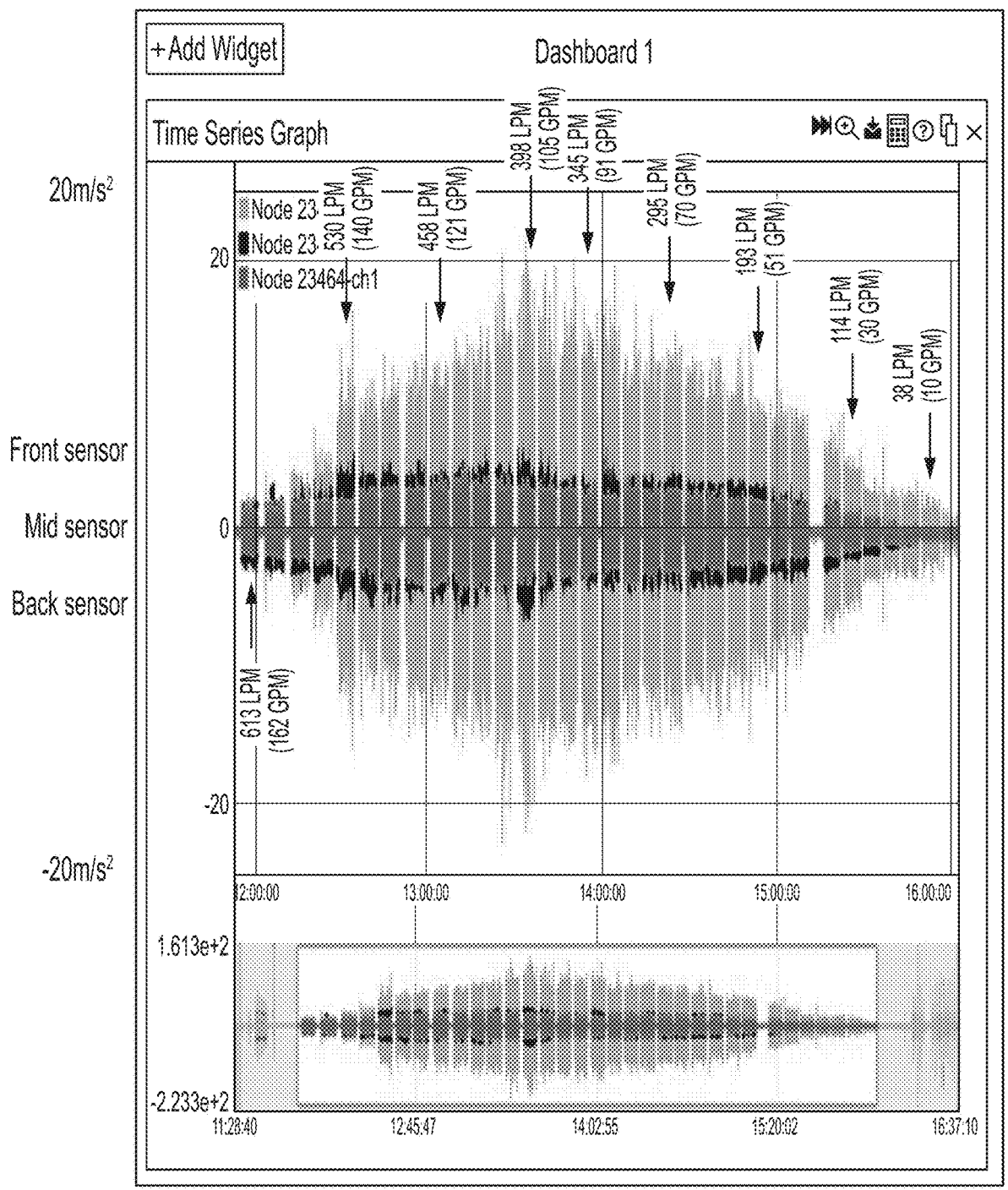
FIG. 14 shows: data collected (from Test 6) for all data sampling bursts in a time-series plot for the entire water flow range.
Figure 15:
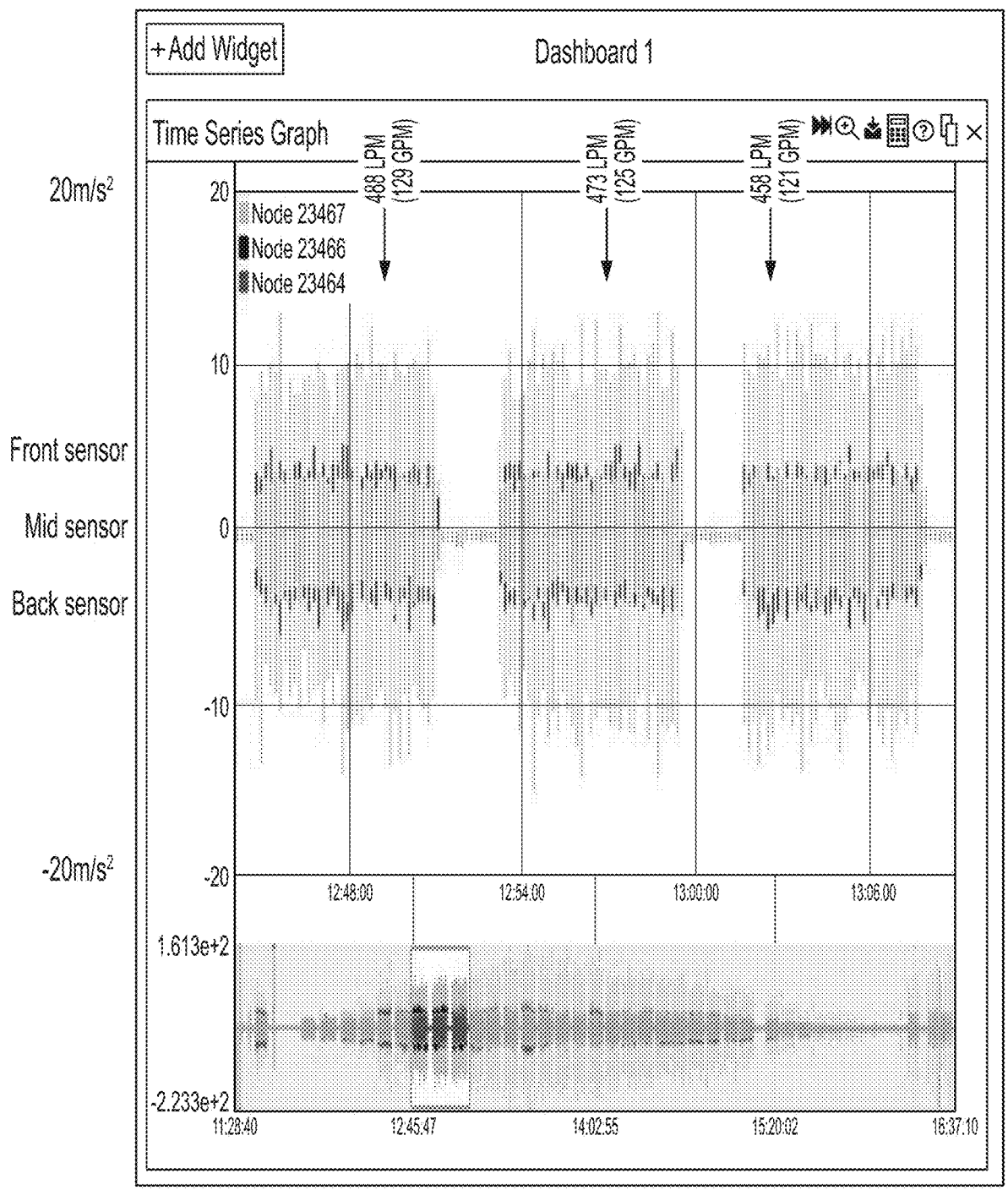
FIG. 15 shows: data collected (from Test 6) for data sampling bursts for three flow rates, 458 LPM (121 GPM), 473 LPM (125 GPM), and 488 LPM (129 GPM) in a time-series plot.

After the no-flow condition was sampled, the desired flow rate was measured using the nozzle bale to regulate the water flow. The reference flow rate was measured by the turbine flow meter at the nozzle. Data sampling bursts for 0.19 seconds continued to occur every 10 seconds throughout the entire flow range. The water flow rate was measured about every 19 LPM (5 GPM) from approximately 606 LPM (160 GPM) to 0 LPM (FIG. 14). Each flow rate was maintained for approximately 5 minutes for a minimum of 30 consecutive data sampling bursts at a single flow rate (FIG. 15). The nozzle was closed for several data bursts between each flow rate.

The last ten data sampling bursts of 0.19 seconds were exported from the data collection software as comma-separated values files (.csv). The time column within each file was originally recorded as the time-of-day and was reset to time relative to the beginning of each data burst; time was set to 0 s at the start of the 0.19 seconds of data, and the sampling burst ended at 0.19 seconds. Each data file was checked to confirm that each accelerometer recorded a full data set of 1900 data samples. The files were saved as text files (.txt) in preparation for data analysis.

Results and Discussion—Test 4, Test 5, and Test 6

The first step of this study was to develop the wireless sensor network to measure water flow at the fire hose nozzle using an accelerometer as the sensor. Although it was determined that the dominant frequency metric can be used to determine flow rate as documented previously, the standard deviation of acceleration was also determined at the sensor locations along the hose to compare our results to the results of the wired sensor network.

Figure 16:
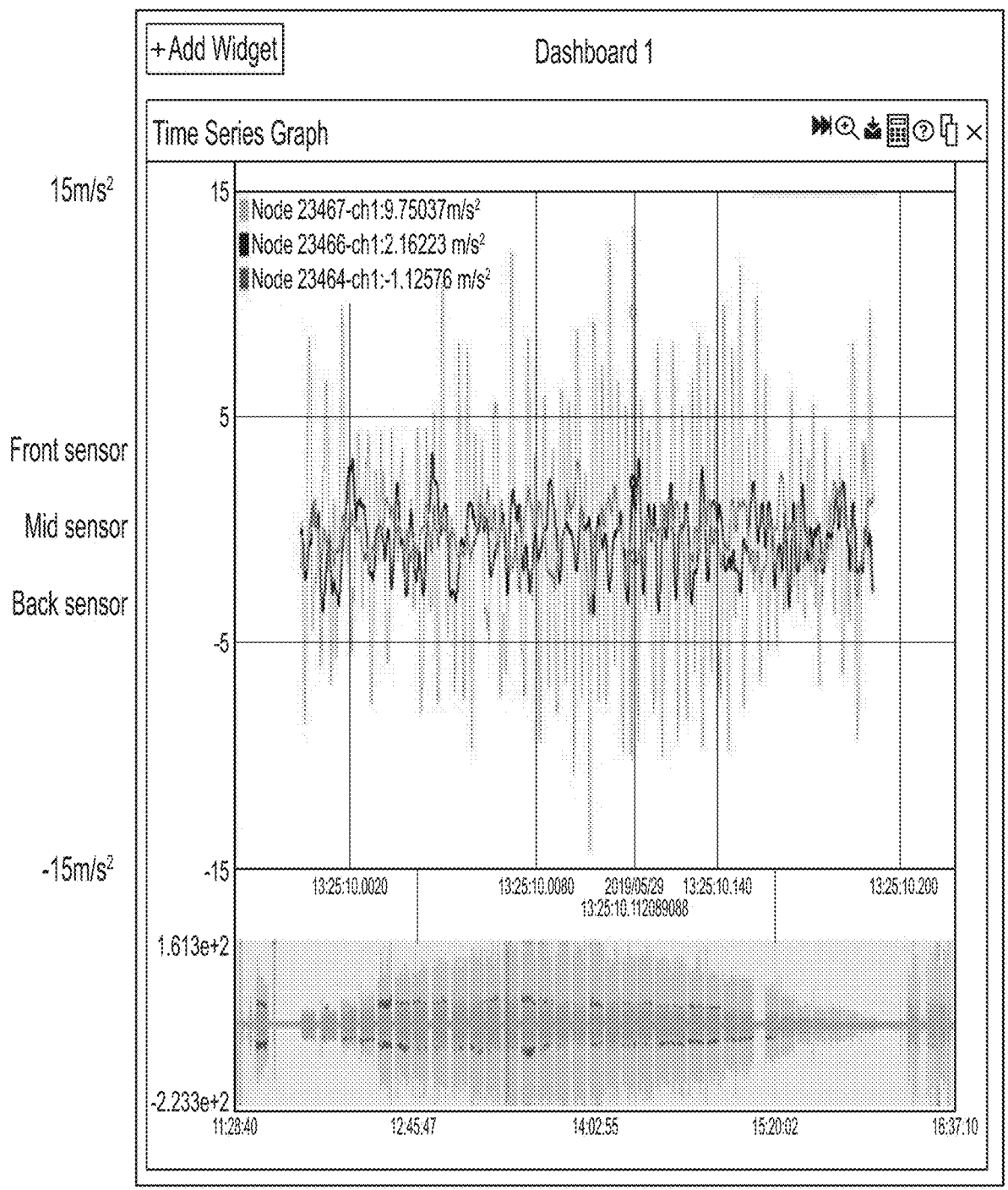
FIG. 16 shows: data collected (from Test 6) for a single data sampling burst for 0.19 seconds for the three accelerometers at 420 LPM (111 GPM) in a time-series plot from which the standard deviation of the signal was determined.

Results and Discussion—Test 4, Test 5, and Test 6—Standard Deviation of Acceleration The standard deviation of acceleration was determined in order to compare the results of the wireless sensor network to the wired sensor network. The raw time-series acceleration data was collected from all the accelerometers (FIG. 16). However, the standard deviation of acceleration was determined for only the Front accelerometer for each flow rate based on 1) the results of the wired testing that showed the Front accelerometer had the highest values, and 2) it was the sensor closest to the hose nozzle and therefore of most interest for our application.

Figure 17:
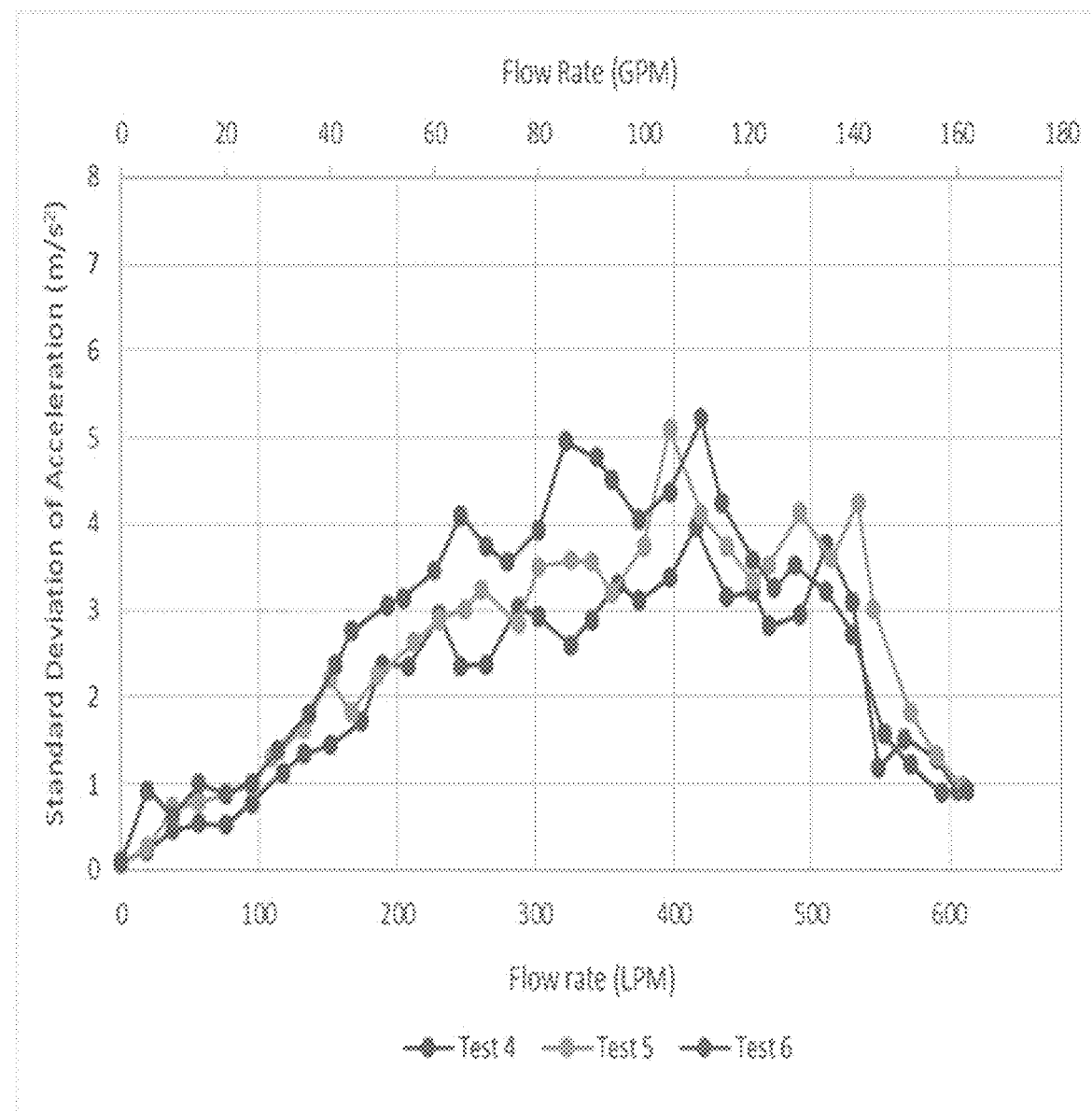
FIG. 17 shows: the standard deviation of acceleration versus flow rate for Test 4, Test 5, and Test 6 for the Front accelerometer.
Figure 18:
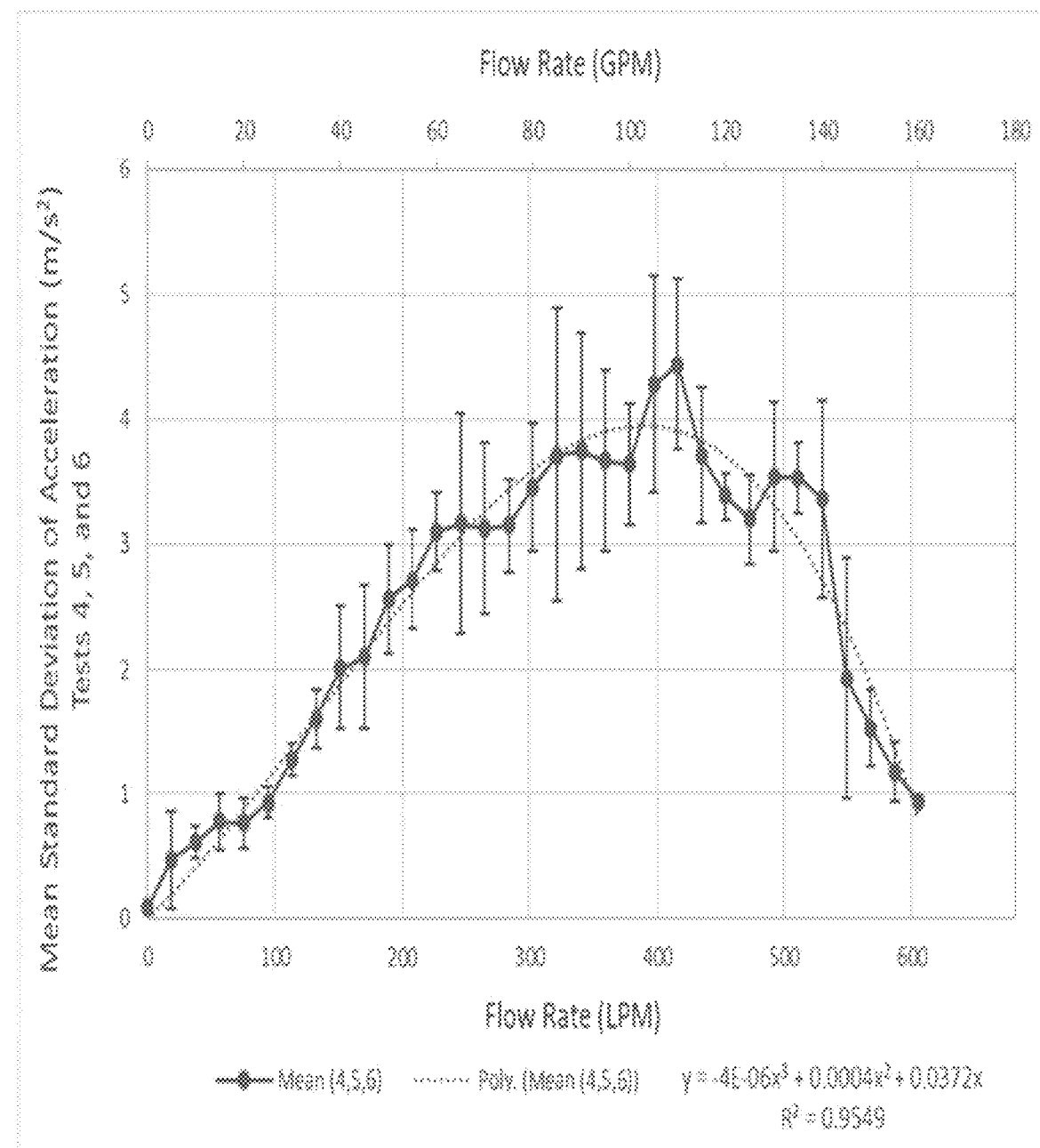
FIG. 18 shows: the mean standard deviation of acceleration with standard deviation bars versus flow rate for the Front accelerometer from Test 4, Test 5, and Test 6.
Figure 19:
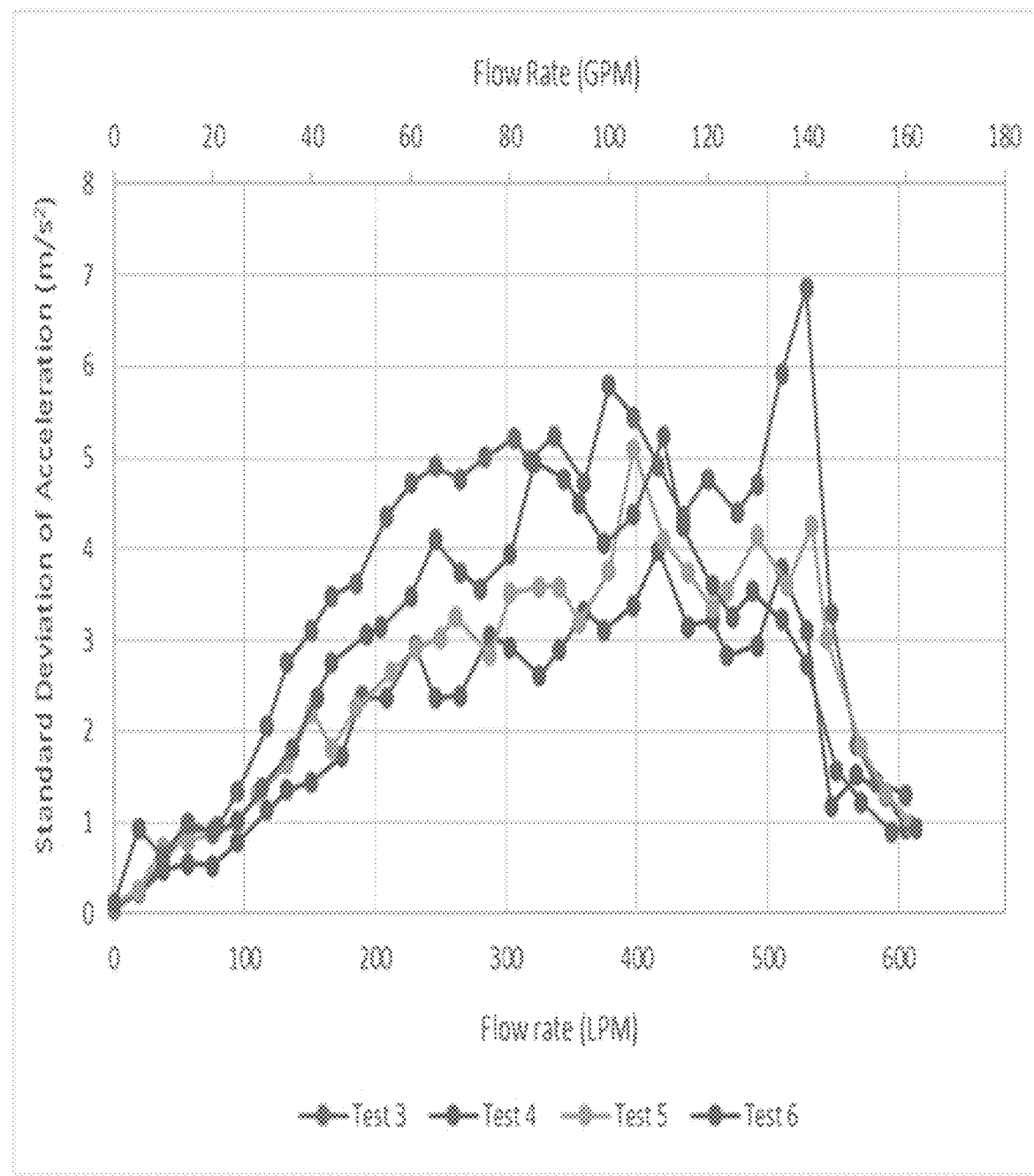
FIG. 19 shows: the standard deviation of acceleration versus flow rate for the Front accelerometer for the wireless Test 4, Test 5, and Test 6 and wired Test 3.

The standard deviation of acceleration was determined for each flow rate for the Front accelerometer for Test 4, Test 5, and Test 6 (FIG. 17 and FIG. 18). Although the last 10 sampling bursts were processed at each flow rate, the data were similar such that only one sampling burst was used at each flow rate to determine the standard deviation of acceleration. The trend followed the wired sensor network tests (Test 3 shown) with a bell-shaped relationship for the flow range (FIG. 19). The decreasing trend at higher flow rates was not expected based on previous research for rigid pipes. The peaks also continued to occur in approximately the same region as for the wired tests. Based on the bell-shaped relationship, this metric will continue to be excluded as the primary metric for determining flow rate.

Results and Discussion—Test 4, Test 5, and Test 6—Initial Dominant Frequency

Figure 20:
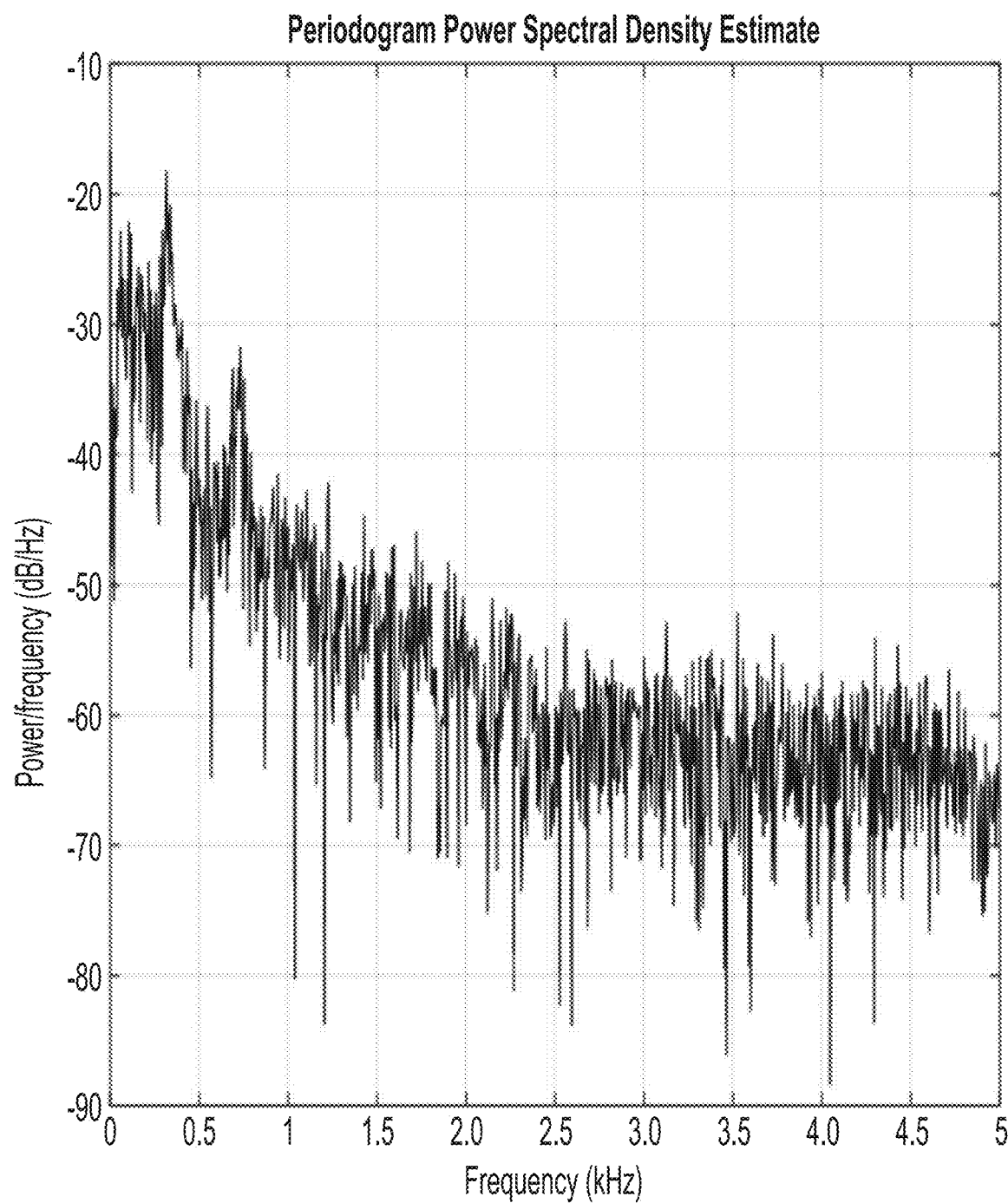
FIG. 20 shows: a sample of the dominant frequency based on the power spectrum. A peak can be seen around 300 Hz.

Based on the previous study using the wired accelerometers, the primary metric of interest to determine flow rate was the dominant frequency of the hose. The time-series accelerometer data was converted to the frequency-domain using a Fast Fourier Transform (FFT). A dominant frequency at each flow rate was determined based on the peak frequency from the power spectrum (FIG. 20).

Figure 21:
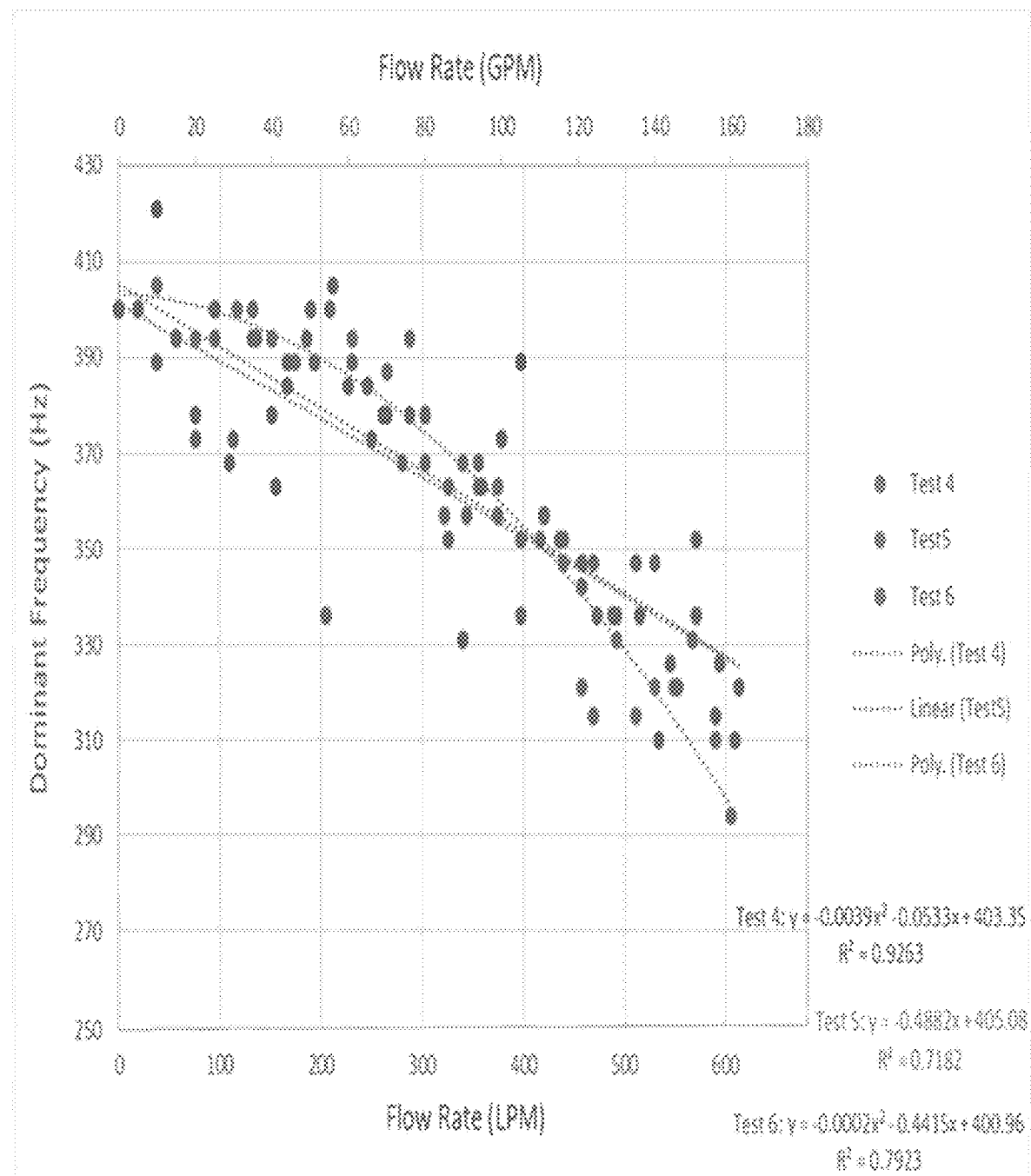
FIG. 21 shows: dominant frequency versus flow rate for the Front accelerometer for the wireless Test 4, Test 5, and Test 6.

A dominant frequency at each flow rate was observed for the Front accelerometer for Test 4, Test 5, and Test 6 (FIG. 21). The dominant frequency generally decreases with increasing flow rate for water flowing within the fire hose. The dominant frequency decreases with increasing flow rate for rigid pipes, and for flexible fire hose using a wired sensor network.

Figure 22:
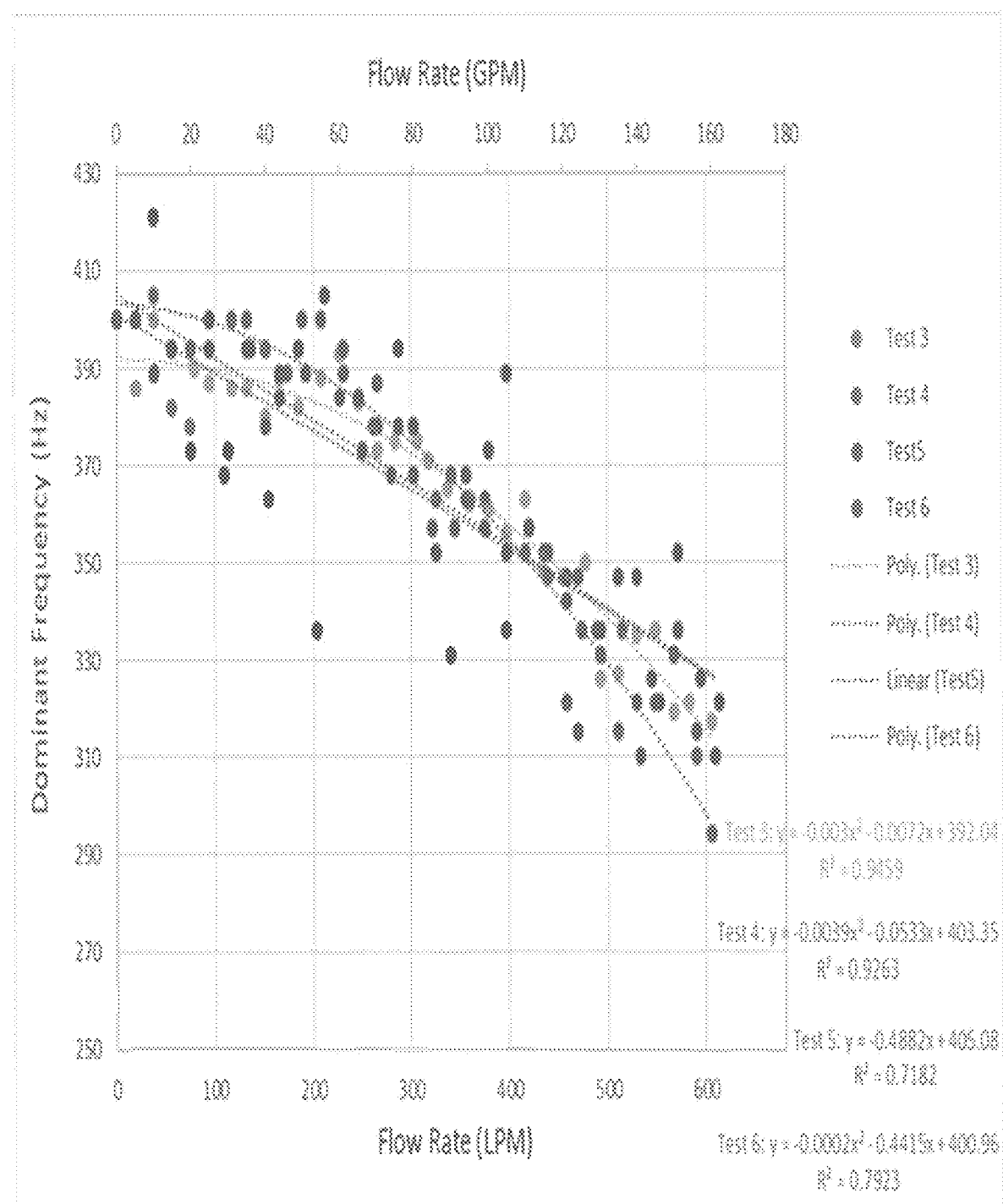
FIG. 22 shows: dominant frequency versus flow rate for the Front accelerometer for the wireless Test 4, Test 5, and Test 6 and for the wired Test 3.
Figure 23:
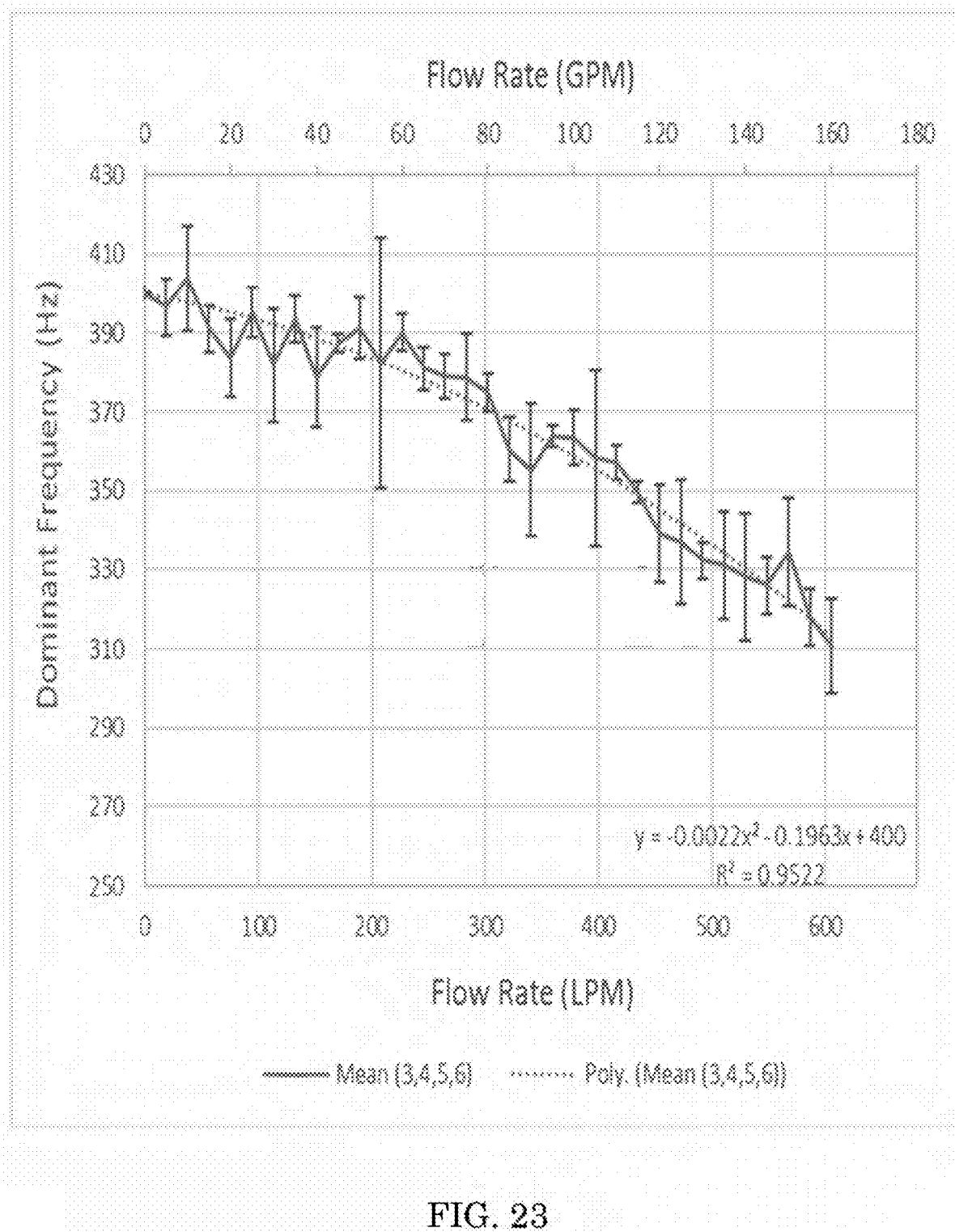
FIG. 23 shows: The mean dominant frequency with standard deviation bars versus flow rate from wired Test 3 and wireless Test 4, Test 5, and Test 6.

The dominant frequency results from Test 4, Test 5, and Test 6 for the wireless sensor network compare well to Test 3 results from the wired sensor network (FIG. 22). The same decreasing trend of the dominant frequency is observed over the flow rate range. The mean relationship for the dominant frequency and flow rate for wired Test 3, and wireless Test 4, Test 5, and Test 6, were used initially for real-time processing to determine flow rate (FIG. 23). The spread of the data was likely the result of the short data sampling burst time, which was only 0.19 seconds for the wireless Test 4, Test 5, and Test 6.

The initial dominant frequency results from the Front accelerometer for the wireless sensor network, although similar to the wired tests documented previously, resulted in large values of standard deviation (FIG. 23). The scatter in the data is primarily the result of the wireless sensor network tests (Test 4, Test 5, and Test 6). If a dominant frequency of 340 Hz was detected, it could indicate a flow rate of anywhere between 337 LPM (90 GPM) and 568 LPM (150 GPM). This is a large flow range for a single dominant frequency, and for this example, could mean the difference between hose flow that is adequate with 568 LPM (150 GPM) versus inadequate flow at 337 LPM (90 GPM) for extinguishing a fire. Although FIG. 23 provided an initial relationship between dominant frequency and flow rate, more testing was needed to reduce the data scatter to make real-time processing a possibility.

Figure 24:
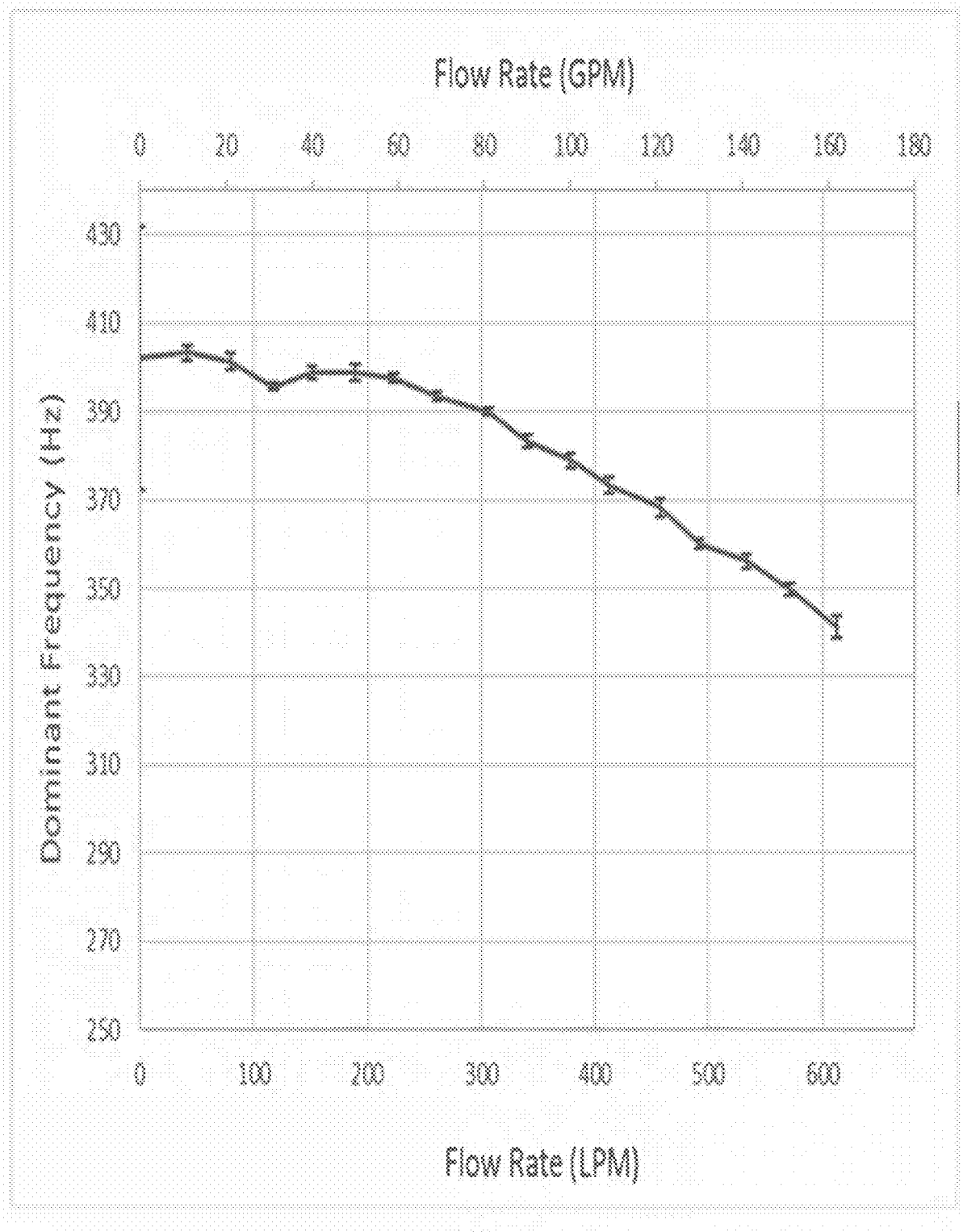
FIG. 24 shows: dominant frequency with standard deviation bars versus flow rate data after modifying the data sampling parameters resulting in reduced scatter, except at zero flow where the signal noise dominated causing scatter.

The initial data sampling parameters were modified in order to capture more data to reduce the dominant frequency data scatter. The data sampling rate was lowered from 10 kHz to 1 kHz, but the data sampling burst time was increased from 0.19 s to 10 s. This change resulted in approximately five times more data being processed during the burst cycle over a longer time period of 10 s. The raw accelerometer time-series data from the Front accelerometer was collected and processed in the custom data acquisition program. The software converted the time-series data to the frequency domain in real-time. A Savitzky-Golay filter was used to smooth the frequency domain data in which the dominant frequency was identified for each flow rate (FIG. 24).

The use of filtering techniques resulted in reduced data scatter and standard deviation for the dominant frequency at each flow rate. The dominant frequency fluctuated less in FIG. 24 than in FIG. 23 with changing flow rate; the negative slope is less. However, the standard deviation bars are much smaller. The standard deviation bar at zero flow is large because the signal noise instead of the flow in the hose dominated the signal at zero flow. Other limits, discussed later, were used within the software to identify the zero-flow condition since the dominant frequency was inconsistent due to signal noise. FIG. 24 was used to determine the flow rate in real-time based on the dominant frequency of the water flowing through the hose during subsequent flow tests.

Real-Time Fire Hose Flow Rate

Figure 25:
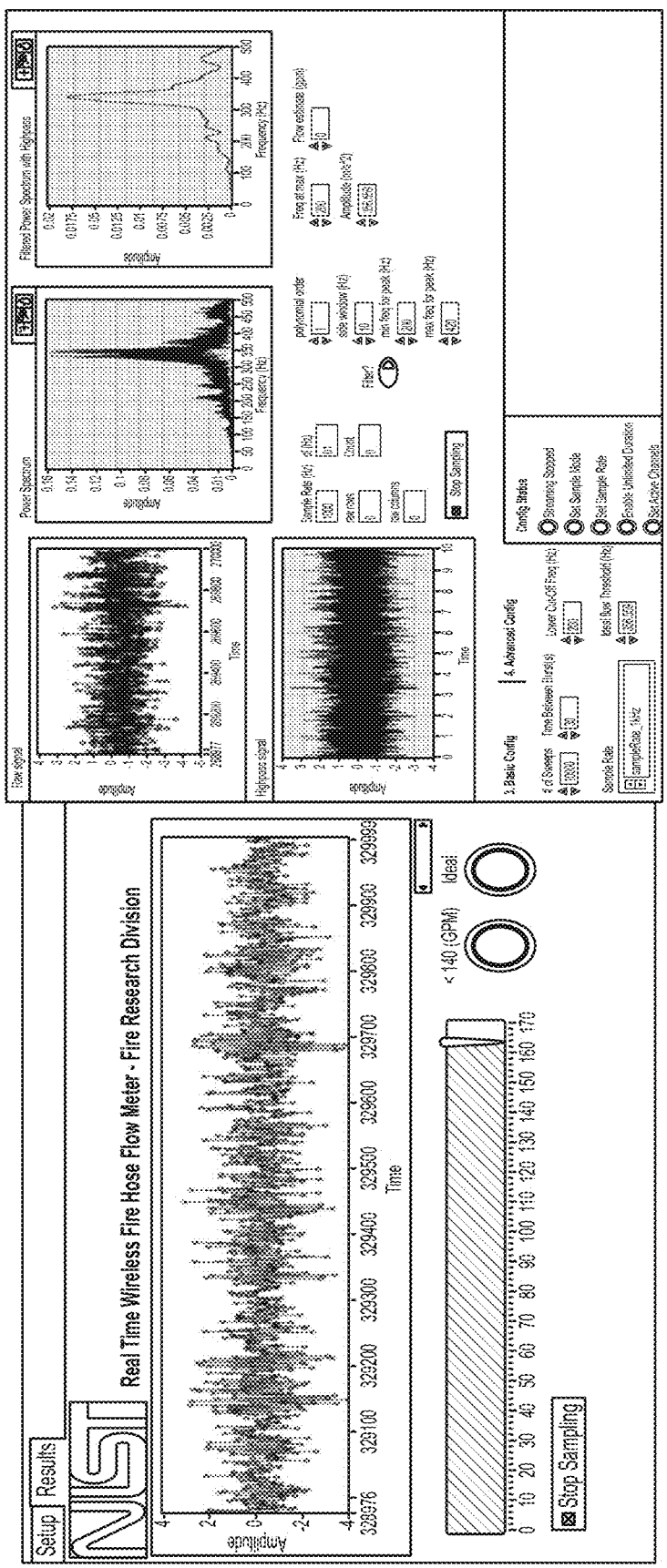
FIG. 25 shows: the GUI—Flow dashboard (left) and Frequency dashboard (right)

Data processing software was used to receive the raw time-series accelerometer data and convert the time-series to frequency-series using an FFT. The dominant frequency was then determined by the processing software to identify the flow rate using FIG. 24. The graphical user interface (GUI) for the software, as seen in FIG. 25, was designed as two dashboards: the 'Flow' dashboard and the 'Frequency' dashboard. The Flow dashboard displayed a colored flow bar meter to indicate the flow rate in GPM, as well as a two-light indicator for quick reference by an IC during a fire. The Frequency dashboard displayed the initial conditions for the wireless node including the dominant frequency.

The Frequency dashboard (FIG. 26) was separated into several sections. First, there was a section that displayed the basic data collection parameters such as the number of samples recorded during a data burst (i.e., 10,000 samples), sample rate (1 kHz) and time between bursts (30 s). Second, a time-series plot displayed the raw acceleration signal including amplitude. Third, the raw power spectrum signal showed the dominant frequency along with the Savitzky-Golay smoothing filter input data. Fourth, the filtered power spectrum showed the dominant frequency after the smoothing filter. Fifth, the value of the dominant frequency based on the filtered power spectrum, and the amplitude of the time-series accelerometer data were shown. Sixth, the flow rate estimate (in GPM) was displayed based on the dominant frequency in FIG. 24.

Figure 26:
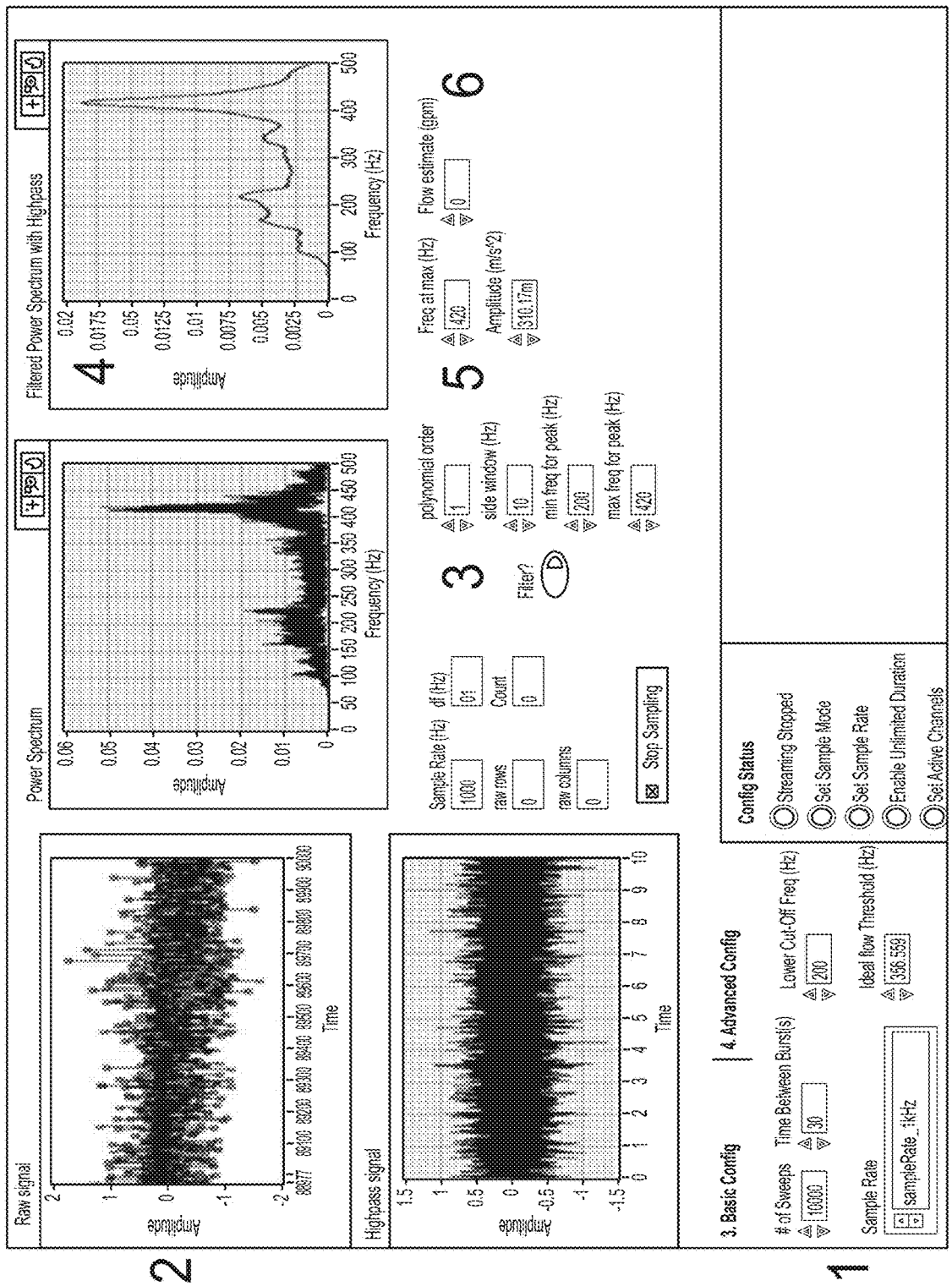
FIG. 26 shows: the Frequency dashboard for the zero-flow condition: 1) the initial settings, 2) the raw time-series signal, 3) filtering input, 4) filtered frequency, 5) dominant frequency, 6) flow rate based on the dominant frequency.

FIG. 26 shows the Frequency dashboard during the zero-flow condition. During zero-flow, the software also monitored the amplitude of the time-series signal. If the amplitude of the time-series signal was less than 0.5 m/s$^2$ then the no-flow condition would remain regardless of the dominant frequency. The amplitude of the noise during the no-flow condition did not typically exceed approximately 0.5 m/s$^2$ but the dominant frequency of the noise could jump into a dominant frequency range as shown in FIG. 24 with the large data scatter at zero flow. To avoid the signal noise triggering a false dominant frequency measurement, the amplitude must exceed a minimum value of 0.5 m/s$^2$. In the raw power spectrum plot, there was a lot of signal at the lower frequencies, between 150 and 250 Hz. Filtering removed that signal below 200 Hz so that the dominant frequency was not influenced by the noisy lower frequency signals.

Figure 27:
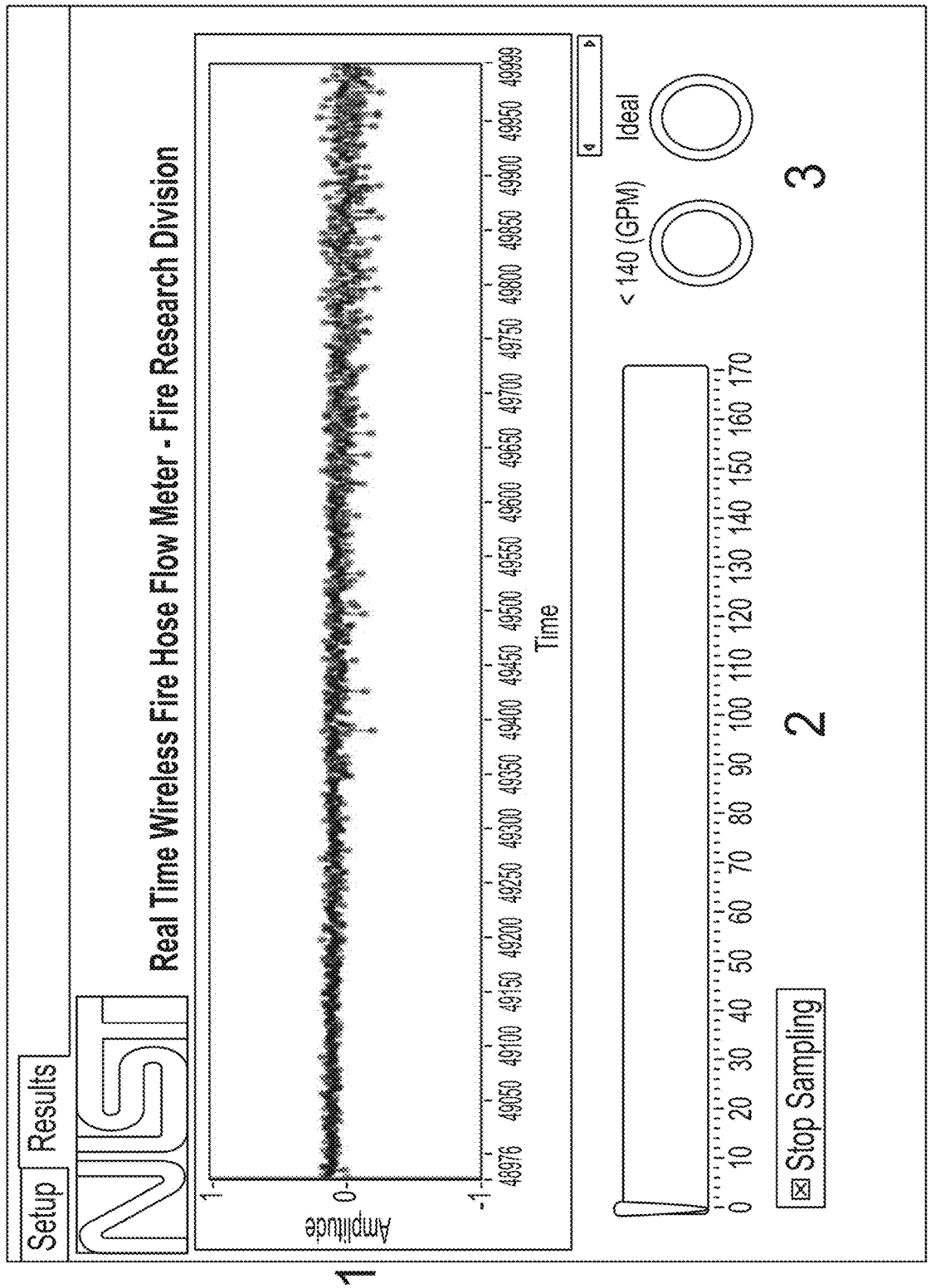
FIG. 27 shows: the Flow dashboard for no-flow: 1) the time-series signal, 2) a bar meter for the flow rate of 0 GPM, 3) two-light indicator for flow rate.

In the Flow dashboard, there were three main sections (FIG. 27). First, the time-series plot of the raw acceleration signal was shown. Second, a colored bar meter displayed the flow rate both numerically and visually. The bar was red when the flow rate was less than 50 GPM (dominant frequency between 399 Hz and 403 Hz), yellow between 50 GPM and 140 GPM (dominant frequency between 399 Hz and 356 Hz) and green when the flow rate was 140 GPM or above (dominant frequency 356 Hz or less). Third, there was a two-light indicator that showed no lights for the no-flow condition, one blue light when flow was measured up to 140 GPM, and then two lights were illuminated when the flow exceeded 140 GPM. The two-light display was for a quick reference for an IC to easily check on the flow rate. FIG. 27 shows the Flow dashboard for the zero-flow condition; signal amplitude less than 0.5 m/s$^2$, bar meter showed red at 0 GPM, and neither blue lights were illuminated.

Figure 28:
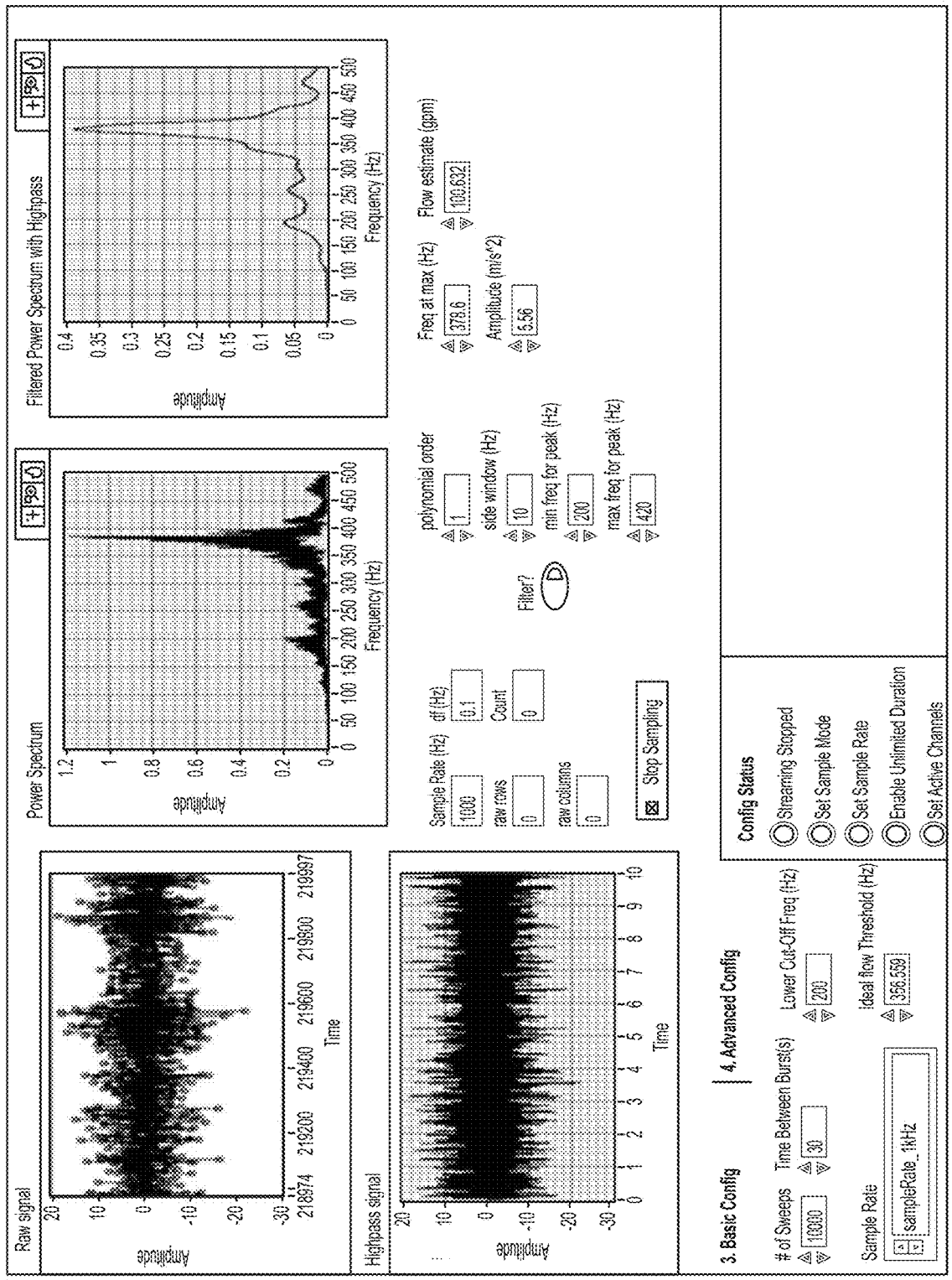
FIG. 28 shows: the Frequency dashboard for 100 GPM and displayed a dominant frequency of 378.6 Hz.

At 100 GPM, the Frequency dashboard displayed a higher raw time-series signal amplitude up to approximately 10 m/s² (FIG. 28). This amplitude corresponded with FIG. 18 that showed the peak standard deviation of acceleration occurring often around approximately 100 GPM. The dominant frequency was shown on the dashboard as 378.6 Hz which corresponded to approximately 100 GPM as shown in FIG. 24.

Figure 29:
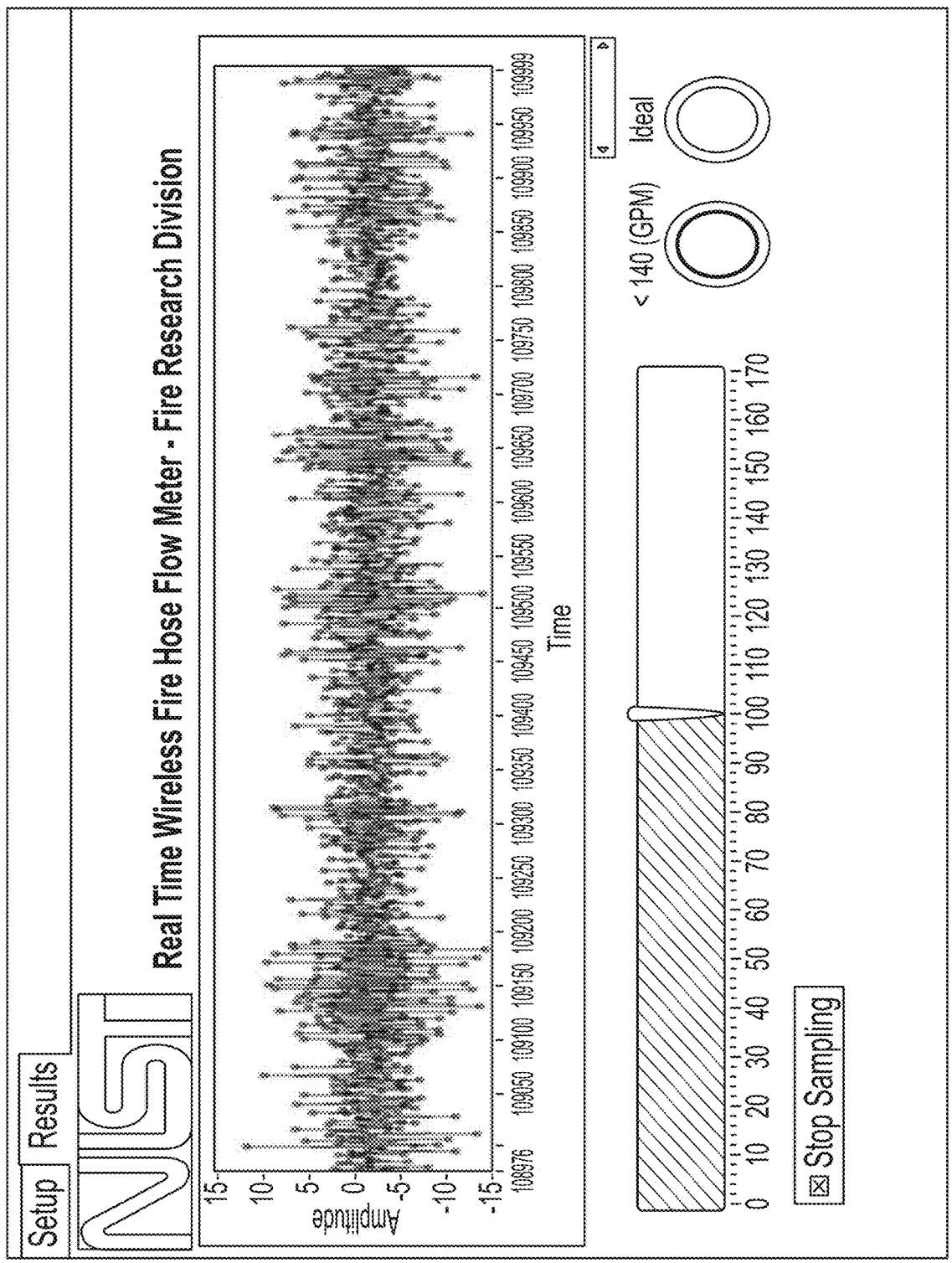
FIG. 29 shows: the Flow dashboard for 100 GPM with yellow colored bar meter and with one blue light illuminated.

On the Flow dashboard, the bar meter showed yellow for the 100 GPM flow rate, and one of the two blue lights was illuminated indicating flow. Although flow was indicated (thus the yellow color, and one light illuminated), the flow rate was less than the goal of 150 GPM for a fire hose attacking a single-family dwelling fire (FIG. 29).

Figure 30:
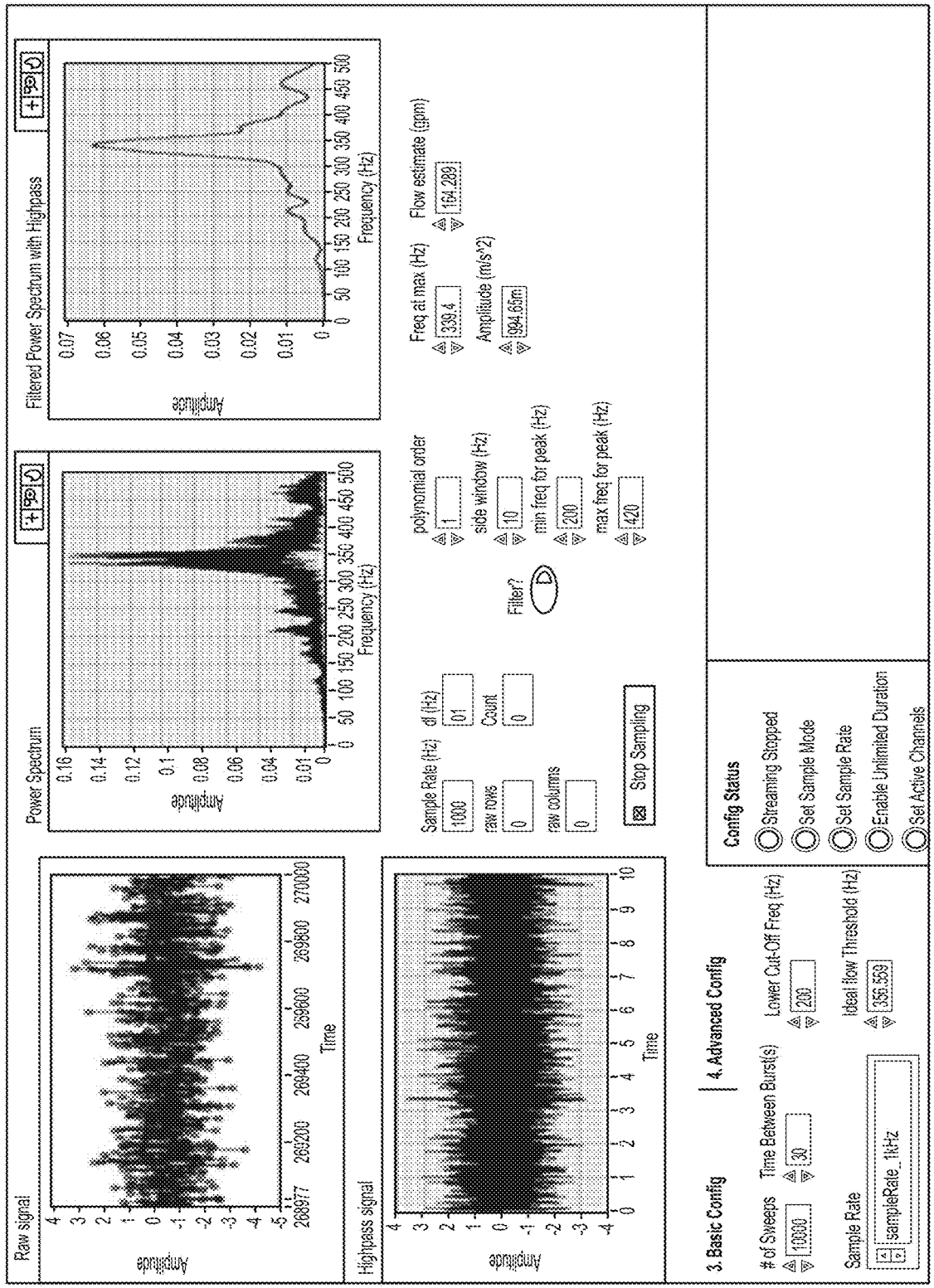
FIG. 30 shows: the Frequency dashboard for 164 GPM. Note the Savitzky-Golay smoothing filter reduced the two peaks seen in the raw power spectrum to one dominant frequency.

At 164 GPM, the Frequency dashboard displayed a smaller amplitude on the raw time-series plot (FIG. 30). This corresponded to the trend in the standard deviation of acceleration results (FIG. 18) where a decrease in standard deviation occurred at higher flow rates. On the raw power spectrum, two peaks were seen to be competing for dominance. The Savitzky-Golay smoothing filter reduced the two competing frequencies to one dominant frequency value.

Figure 31:
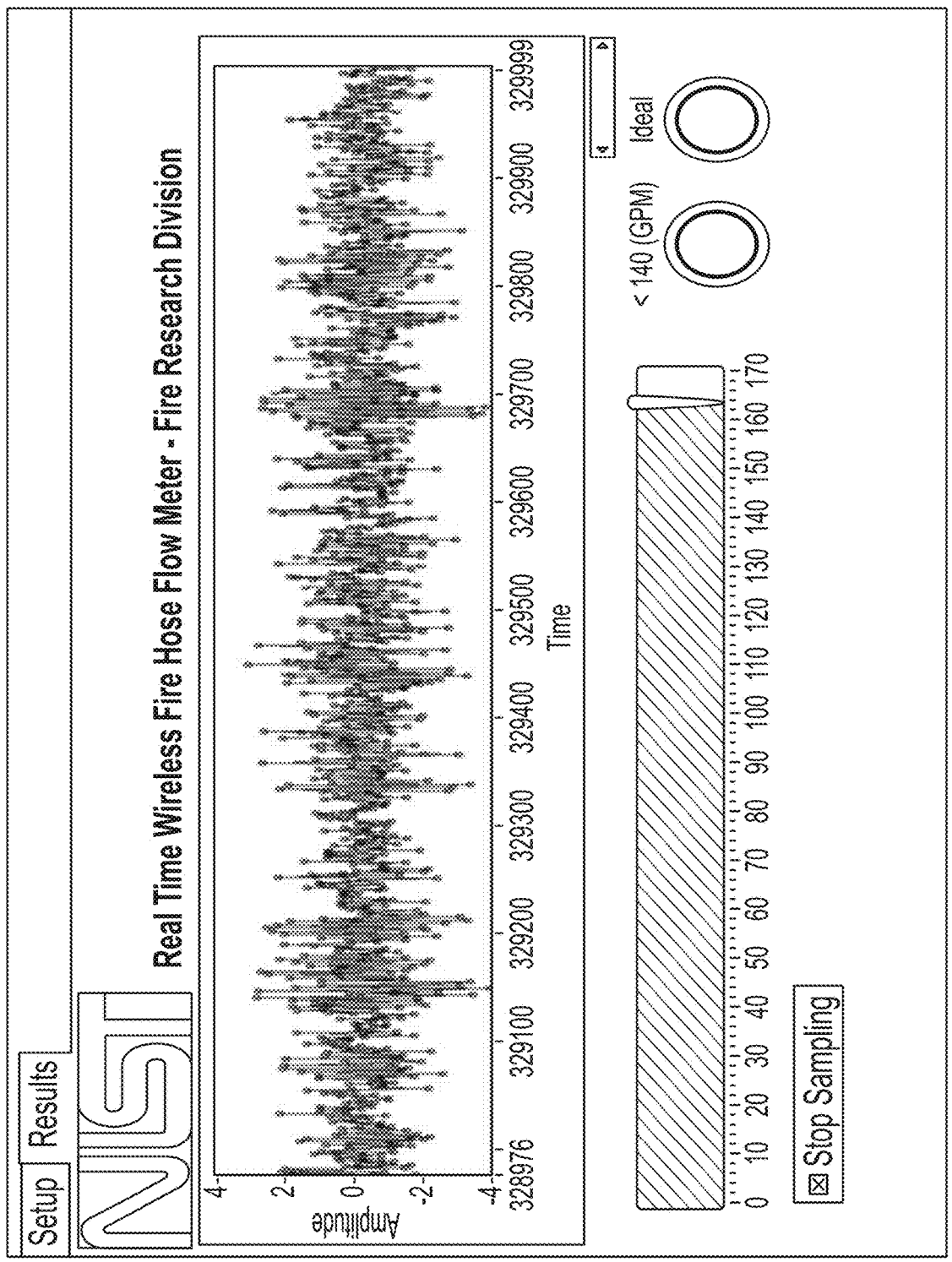
FIG. 31 shows: the Flow Panel for 164 GPM with green colored meter and with two blue lights illuminated.

On the Flow dashboard, the bar meter for flow rate was green since the flow rate was above 140 GPM (FIG. 31). Both blue lights were illuminated on the 2-light indicator since the flow rate was above 140 GPM. The IC can refer to the two blue lights and know that the attack hose has a flow rate above 140 GPM at the nozzle.

Practical Considerations for a Nozzle Flow Meter

The sensor, wireless nodes, and base station required power. In this study, power was supplied to the accelerometers from the nodes, and from the laptop to the base station. For the fire hose application, the wireless nodes and sensor can have a source of power. Replaceable or rechargeable batteries can be used.

The wireless sensor network was applied to the fire hose in a non-hostile, outside, environment. The wireless sensor network on a fire hose on the fireground can be capable of withstanding high temperature, water and be durable to survive being dragged on the ground while attached to the exterior fabric of the fire hose. The protective case used in this study was intended to provide protection during testing.

The accelerometer and the wireless node were separate, and the node was not applied directly to a fire hose. Combining the accelerometer and the wireless node together and reducing the node size can occur for adoption to an actual fire hose. Although already sufficiently lightweight, a smaller single unit containing both the sensor and node with a lower profile may be less likely to be damaged during use on the fireground.

The wireless node used radio frequency (RF) signals to transmit data to the base station. In order to maximize the signal range, physical barriers should be minimized, radio frequency interference and electromagnetic interference should be minimized, and metal near the node or base station antenna should be minimized. For an actual fire hose application, the node will not likely have a clear line of sight to the base station, either due to structural obstructions like interior and exterior walls, floors, ceilings, or doors. Ground terrain may prevent a clear line of site in a forest or if the node is underground in a basement. There may also be civilian sources of RF signals as well as radio interference from fire department sources that could interfere or weaken the RF signal from the flow meter. Preventing the loss of a signal due to these factors will be important.

Because the dominant-frequency metric was based on acceleration at the hose surface, the dominant-frequency metric was affected by hose structural dynamics. The relationship of dominant frequency to flow rate (FIG. 24) changed slightly based on factors including (1) bending of the hose, (2) placement of the hose on stiff concrete or pliable grass foundation, (3) pressure and head loss, (4) friction inside the hose. Currently, filtering is used to eliminate lower-frequency affects from other sources, such as the pump on a fire engine. However, low-frequency movements of the hose that cause the hose dynamics to change may affect the dominant frequency, which is an undesired situation. For example, the difference in slopes and values between FIG. 23 and FIG. 24 was due mainly to the different hose dynamics from the differences in experimental setup. Thus, a more robust metric needs to be established to accommodate these differences in hose dynamics.

Example 2

Consider the following scenario describing a typical house fire with fire fighters using the current fire hose. The first fire engine arrives at the front of a single-family house with smoke showing from behind the house. The first arriving officer conducts his initial size up by walking completely around the house. Concurrently, a fire fighter stretches a 60 m (200 foot) preconnected 4.5 cm (1.75 inch) hose from the engine to the front door of the house and brings hand tools from the fire engine. The officer finishes his exterior assessment and the two-person team prepares to enter the house through the front door. When the team is ready to enter the house, they signal to the pump engine operator to charge the hose line with water. The team enters the front door of the house and advances the pressurized hose into the house in search of the fire.

The two-person team inside the house is relying on the water from the hose to protect them from the heat and to extinguish the fire. Once the hose line has been charged, the pump operator may conduct other duties on the fire ground away from the pump panel, including placing ladders to windows of the house, connecting an intake hose from a hydrant to the engine, chocking wheels, etc. Once the suppression team disappears into the house, the pump operator may not know that the fire fighters are flowing water.

Older engines will indicate pressure loss on their pump panel gauge when the hose nozzle is opened. Additional water pressure must then be added to increase the hose pressure after the nozzle is open. This means the pump operator must be at the pump panel to increase the pressure to the target pressure once the nozzle is opened. By increasing pressure to the hose line, the pump operator assumes that water is flowing from the nozzle as intended.

On newer engines the hose pressure can be preset, and once the nozzle is opened and the pressure in the hose line drops, the engine pump will automatically compensate by increasing pressure to achieve the preset target pressure. This means the pump operator does not need to stay at the pump panel to wait for the fire fighters to open the nozzle so the pump operator can increase the pressure. The pump operator may, or may not, be able to hear the pump sounds while standing next to the pump panel as the engine's pump automatically increases water pressure. Unfortunately, this also means the pump operator may not know if water is flowing from the nozzle on the other end of the hose line out of sight inside the house.

Some engines have a flow meter that measures the total flow rate of all the water flowing out of the engine. The flow meter does not measure the flow rate for a specific hose unless only one hose is being used. Since the flow meter is on the engine, it does not necessarily indicate that water is flowing out of a specific hose nozzle as intended.

Currently, communication between the fire fighter at the nozzle and the pump operator or IC is typically done using radios. The fire fighter at the nozzle, or his backup, should be able to communicate by radio to the pump operator or IC to provide feedback about water flow. However, this is not always possible to do with competing radio traffic while the team is advancing the hose and conducting suppression activities that take two hands. Fire fighters in danger may not be capable of operating the hose or radio for help. If their hose nozzle was closed prior to their emergency and remains closed, the pump panel will show there is sufficient pressure in the charged hose line yet there is no flow from the nozzle.

Fire engines have a gauge on the pump panel for the amount of water in their supply tank. The water level will decrease when the engine is operating using only its own water supply and water is flowing out of the engine. If the first arriving engine initially supplies water from its own supply tank, the decreasing level of tank water will indicate that water is flowing out of the engine, but not necessarily flowing from the nozzle as intended. If the engine has an external water supply, from a hydrant or tanker, then the volume of water will be replenished, and the tank volume will not indicate that water is leaving the engine. In both of these cases, the engine's water tank level will not clearly indicate if water is flowing from the nozzle.

Normal Pump Pressure, but Low Nozzle Flow Due to Hose Rupture or Leak

Presently, water pressure measured at the fire engine's pump panel is used by the pump operator to determine if water is flowing at the hose nozzle. Fireground threats to normal water flow such as hose damage and hose blockage can make reliable decisions on water pressure misleading. A pressure loss indicated on the fire engine's pump panel may occur when water flows from the nozzle, as intended, or unintentionally through a ruptured hose.

Figure 32:
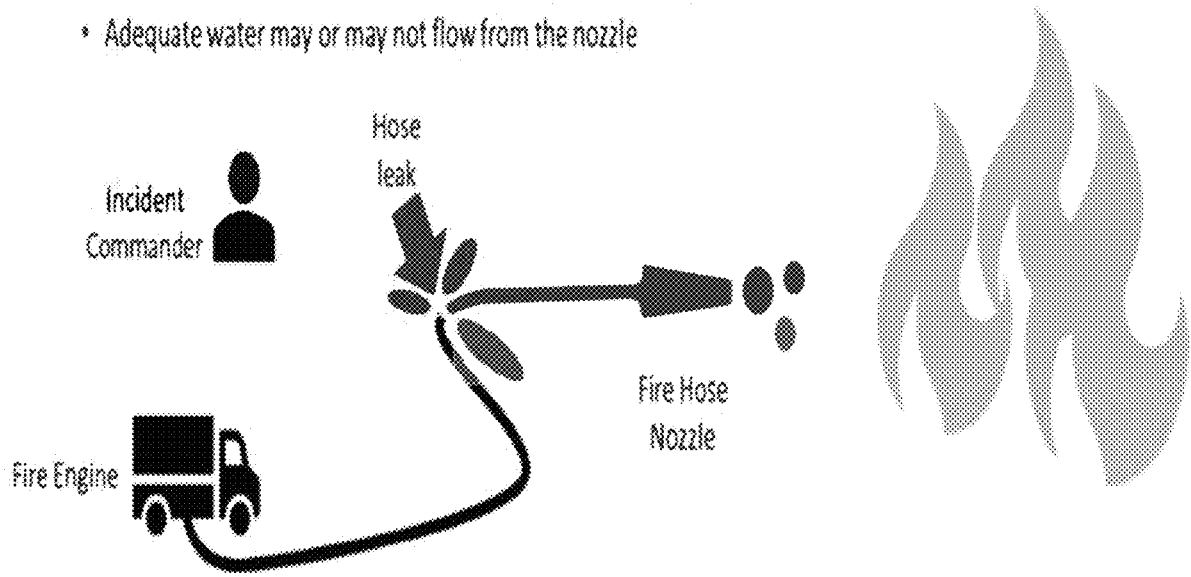
FIG. 32 shows: threats to normal nozzle flow include holes from wear and tear or burns, leaking couplings, or hose rupture from car tires or structural collapse.

Several fire ground threats could cause a decrease in pressure at the pump panel, falsely indicating a loss in pressure from normal operations while water is not flowing from the nozzle. Hose failures that threaten normal water flow from the hose nozzle include a hose rupture or leak from hose wear and tear, a burn hole in the hose, a leaking coupling, or a hose rupture from being crushed by vehicle tires or structure debris. These threats could cause water to flow unintentionally from somewhere along the hose before the nozzle, decreasing pressure at the pump panel as if water was flowing properly from the nozzle (FIG. 32).

The pressure loss would cause the engine's pump to increase the water pressure, automatically or manually, to account for the decrease in pressure assuming that water is flowing from the nozzle. But if there is a hose failure, less or no water may be flowing from the nozzle where it is needed. The safety of the fire fighters and occupants is threatened by these types of dangerous events; measuring only pressure at the pump panel is deceiving.

Normal Pump Pressure, but Low Nozzle Flow Due to Blockage

Figure 33:
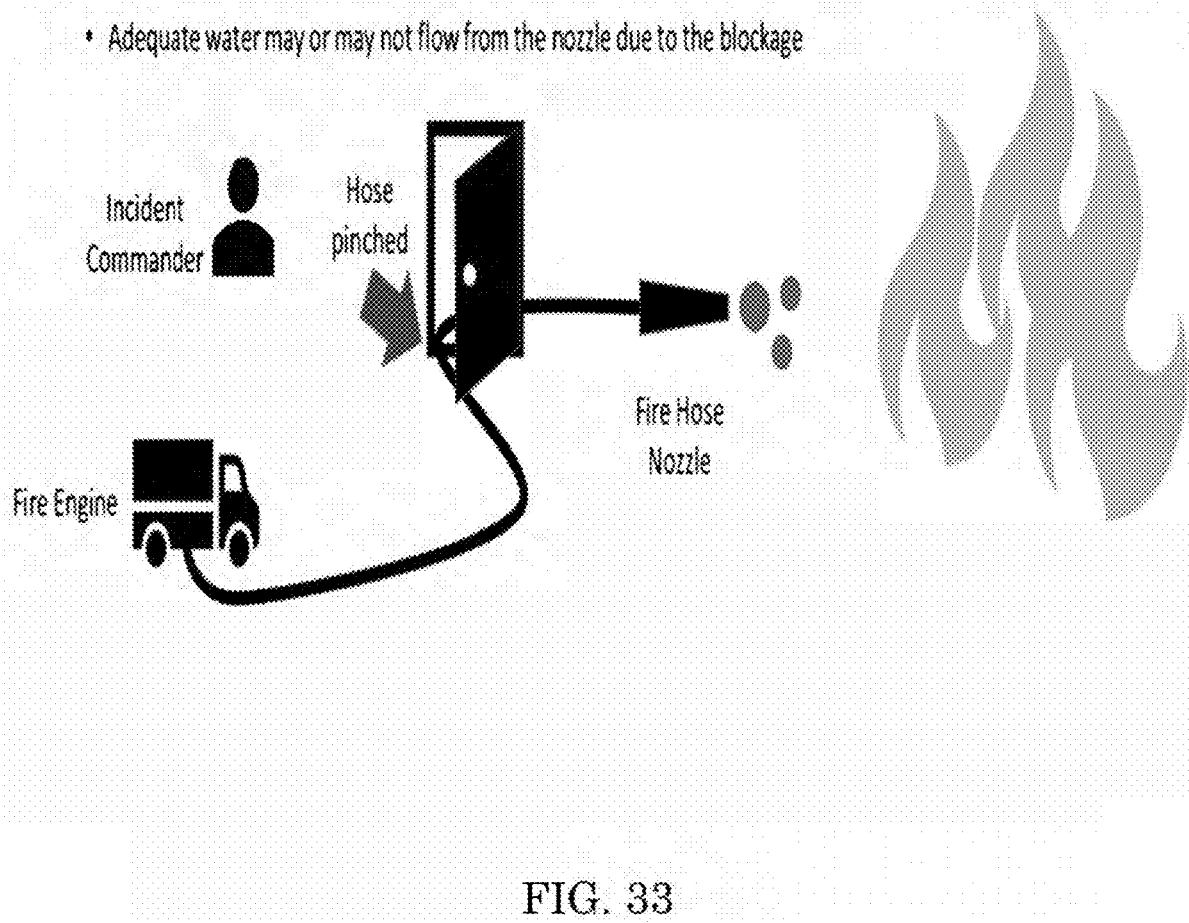
FIG. 33 shows: normal water flow at the hose nozzle is reduced by a partially blocked hose from crimping or pinching, or a fully blocked hose from a closed valve or closed nozzle bale, yet these dangerous conditions may not be obvious at the pump panel where water pressure may appear normal.

When the fire engine measures only water pressure at the fire engine's pump panel, the pump operator will not know if a hose is partially or fully blocked preventing water flow at the nozzle. Sufficient water pressure may show at the pump panel even if the hose is partially or fully blocked preventing water from reaching the nozzle. Several threats on the fireground can partially or fully block a fire hose (FIG. 33). A charged hose line advanced inside a structure could become partially blocked as a result of being crimped around a sharp corner or past a piece of furniture. A hose pinched under a door, under a piece of furniture, under a vehicle tire, or under fallen debris could also reduce water flow at the nozzle. Water flow through the hose could be fully blocked by a closed in-line valve, debris in the hose, or by a closed nozzle bale that cannot be opened by an incapacitated fire fighter. The fully blocked hose would appear at the pump panel to have sufficient pressure.

Presently, water pressure measured at the fire engine's pump panel is used by the pump operator to determine if water is flowing at the hose nozzle. Decisions based on water pressure can be misleading because of fireground threats such as hose damage and hose blockage.

The safest way for the IC to know that water is flowing from the hose nozzle is to have real-time water flow information sent to them. A basic graphic display could simplify water flow information and reduce radio traffic when multiple hoses are in operation from several engines at large fires.

The wireless sensor network described here improves fireground situational awareness by measuring water flow at the fire hose nozzle. Hose vibration data will be collected and then transmitted wirelessly to a device where the data is converted into flow rate in real-time for improved situational awareness and efficient fireground decisions.

The wired-sensor network measures water flow in a fire hose, wherein vibration data is collected, converted into a flow rate using an algorithm, and flow rate is displayed at the incident command post. The wired sensors were piezoelectric accelerometers and the dominant frequency and standard deviation of acceleration of the water flow vibrations on the hose were examined as possible metrics to determine flow rate. Example 1 describes the wireless sensor network and real-time flow measurements.

Wired Accelerometer Test 1 and Test 2

Introduction—Wired Accelerometer Test 1 and Test 2

In Test 1 and Test 2, the accelerometer was applied to the exterior of the fire hose, wherein data was collected to see a relationship between the hose vibration sensed by the accelerometer and the flow rate of the water in the fire hose.

Methods—Wired Accelerometer Test 1 and Test 2

Several different types of flow meters were assessed for use in this study such as: turbine, electromagnetic, and pressure differential meters. However, these types of meters were typically too large, heavy, and bulky for use with the fire hose. Alternatively, a smaller, lightweight, exterior, accelerometer was chosen for the fire hose application.

Figure 34:
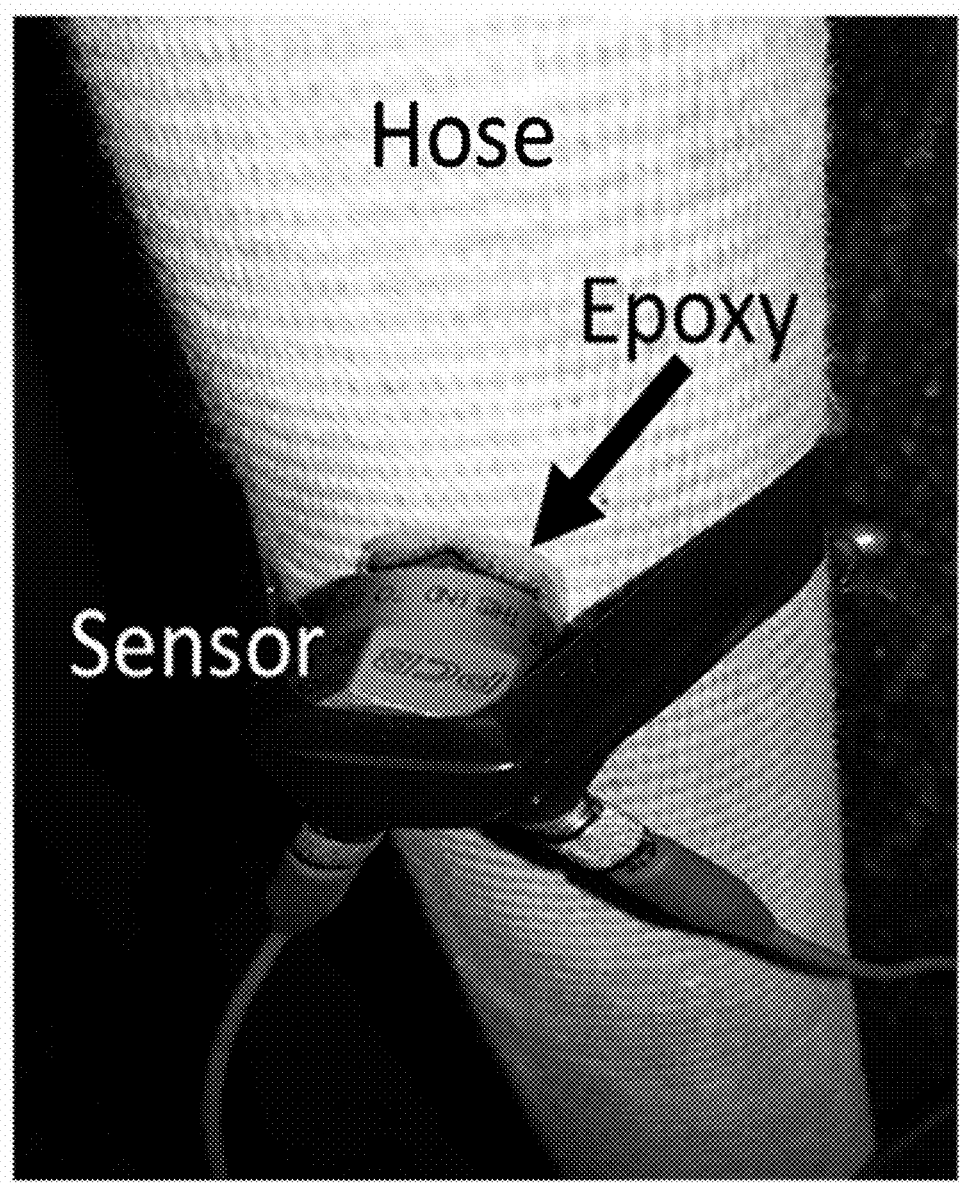
FIG. 34 shows: the transducer base was epoxied to the hose fabric and the accelerometer was screwed tightly to the base. Black electrical tape was applied to provide additional support to the transducer while the epoxy cured.
Figure 35:
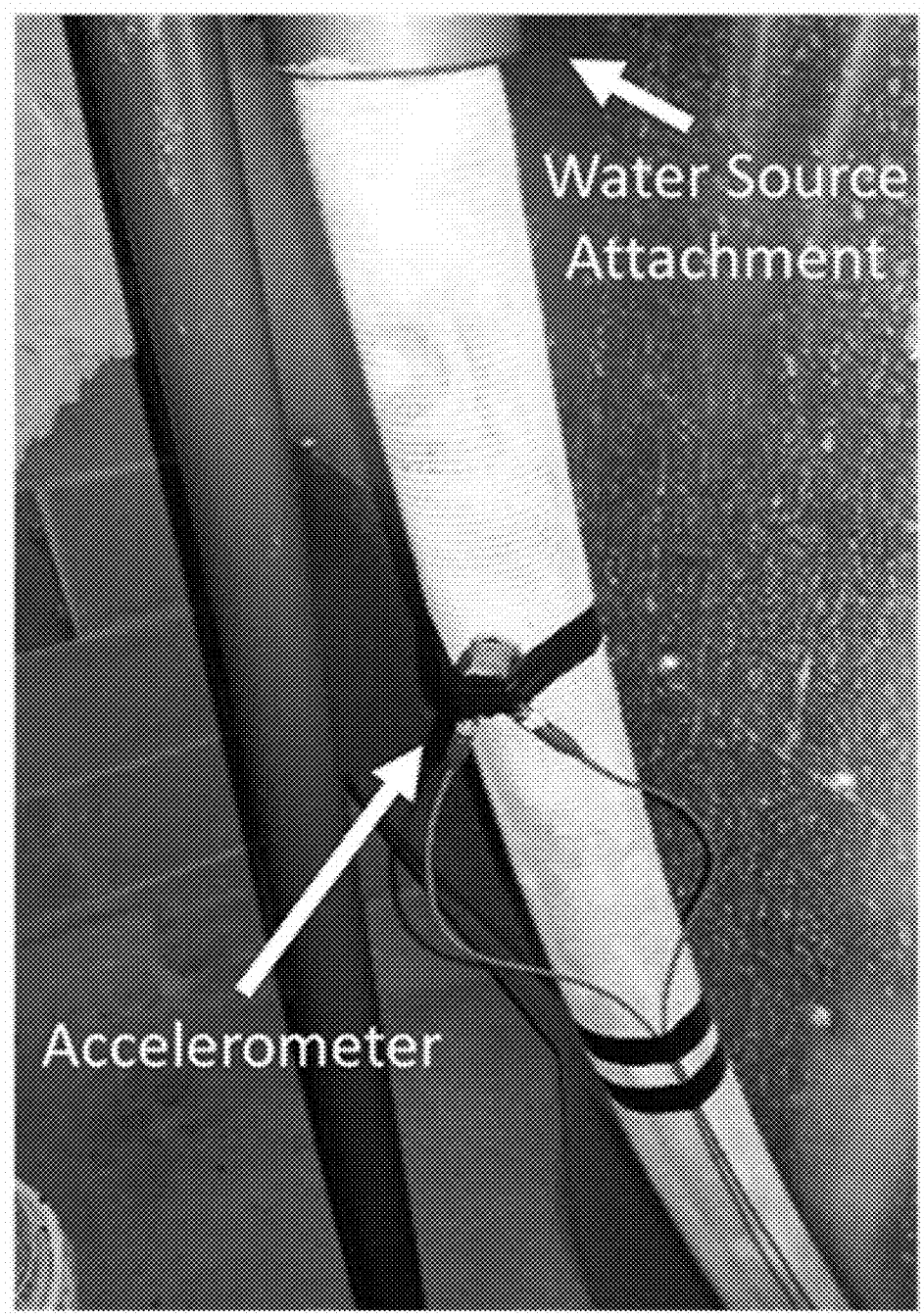
FIG. 35 shows: the transducer was attached to the hose approximately 31 cm (12 in) downstream from the hose-water source attachment point. Black electrical tape was applied to help provide stress relief to the wire leads from the transducer.

One accelerometer (PCB model 288D01), an integrated electronic piezoelectric (IEPE) transducer, was used to measure both force and acceleration. The mechanical strain of the piezo ceramic material within the accelerometer resulting from vibration is converted to an electrical signal. For this accelerometer, the maximum and minimum acceleration was ±490.5 m/s$^2$. The maximum and minimum force was ±222.4 N. The frequency range for the accelerometer was up to 5000 Hz. The maximum frequency for data collection was 51.2 kHz. Power to the accelerometer was supplied from the data acquisition system. The accelerometer was mounted to a base that was epoxied to the exterior hose fabric (FIG. 34) approximately 31 cm (12 in) downstream of the water source connection (FIG. 35).

The commercial fire-attack hose used in this study had a nominal 4.5 cm (1.75 in) inner diameter and was approximately 15 m (50 ft) long with 3.8 cm (1.5 in) couplings. It had a polyester inner and outer jacket with EPDM (ethylene propylene diene monomer rubber) synthetic rubber inner lining typical for a commercial fire hose attack line. Water was supplied to the hose from a building interior water supply. The maximum pressure supplied by the water source to the hose was approximately 0.6 MPa (90 psi).

Figure 36:
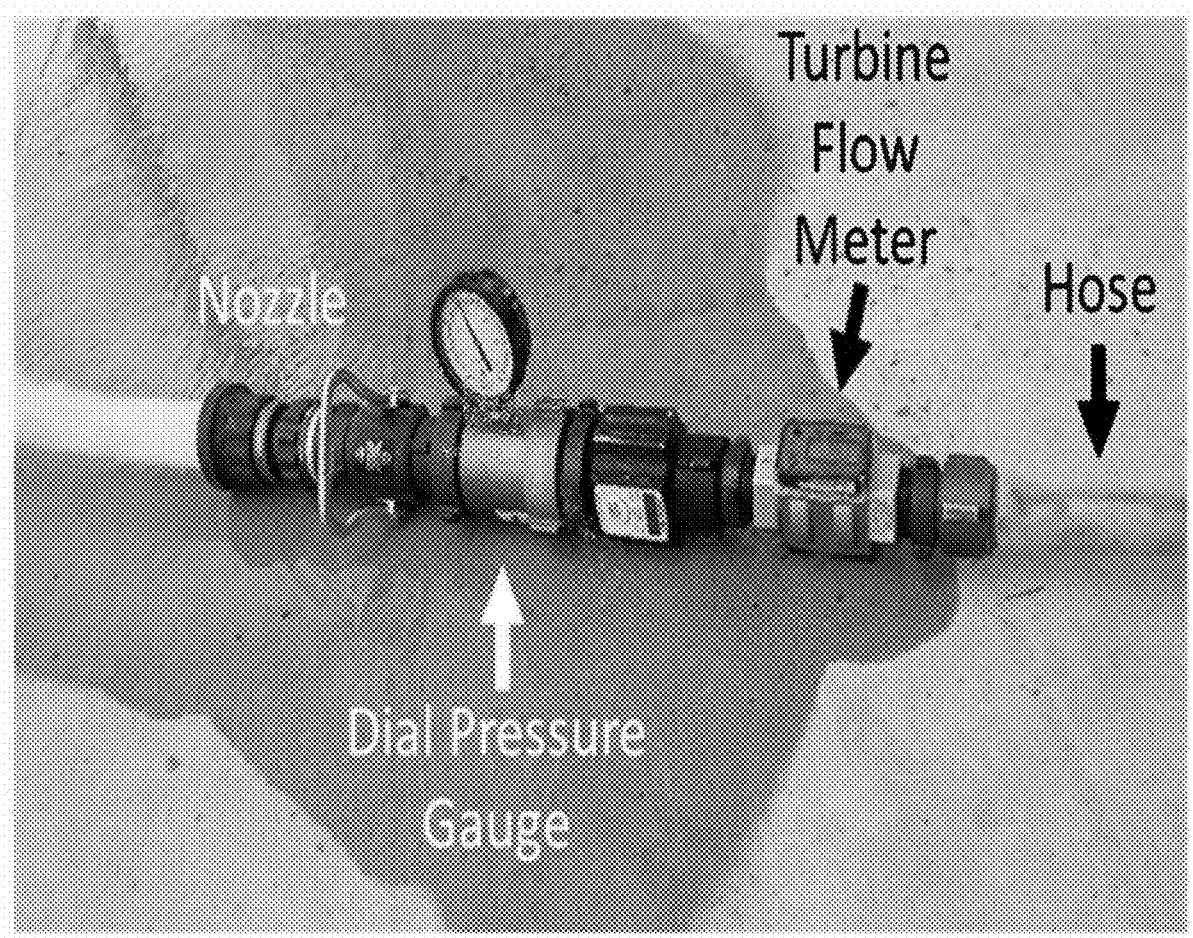
FIG. 36 shows: the in-line turbine flow meter and dial pressure gauge at the nozzle end of the hose during testing.

A commercial turbine flow meter was used at the nozzle to measure the reference flow rate during the study. The flow meter was previously shown to provide the correct flow rate following AS/NZS 1221:1997. For a variety of reasons, the reference flow rate drifted approximately ±3.8 LPM (1.0 GPM) at the highest reference flow rates, but drifted less than approximately ±1.9 LPM (0.5 GPM) at the lower reference flow rates. For consistency, the abbreviation 'LPM' represents L/min and 'GPM' represents gallons/min for the remaining text. The turbine flow meter and a dial pressure gauge were attached between the fire hose and the nozzle (FIG. 36). There was sufficiently straight flow upstream and downstream of the commercial flow meter turbine to satisfy the manufacturer's recommendation for maintaining the flow meter accuracy.

Figure 37:
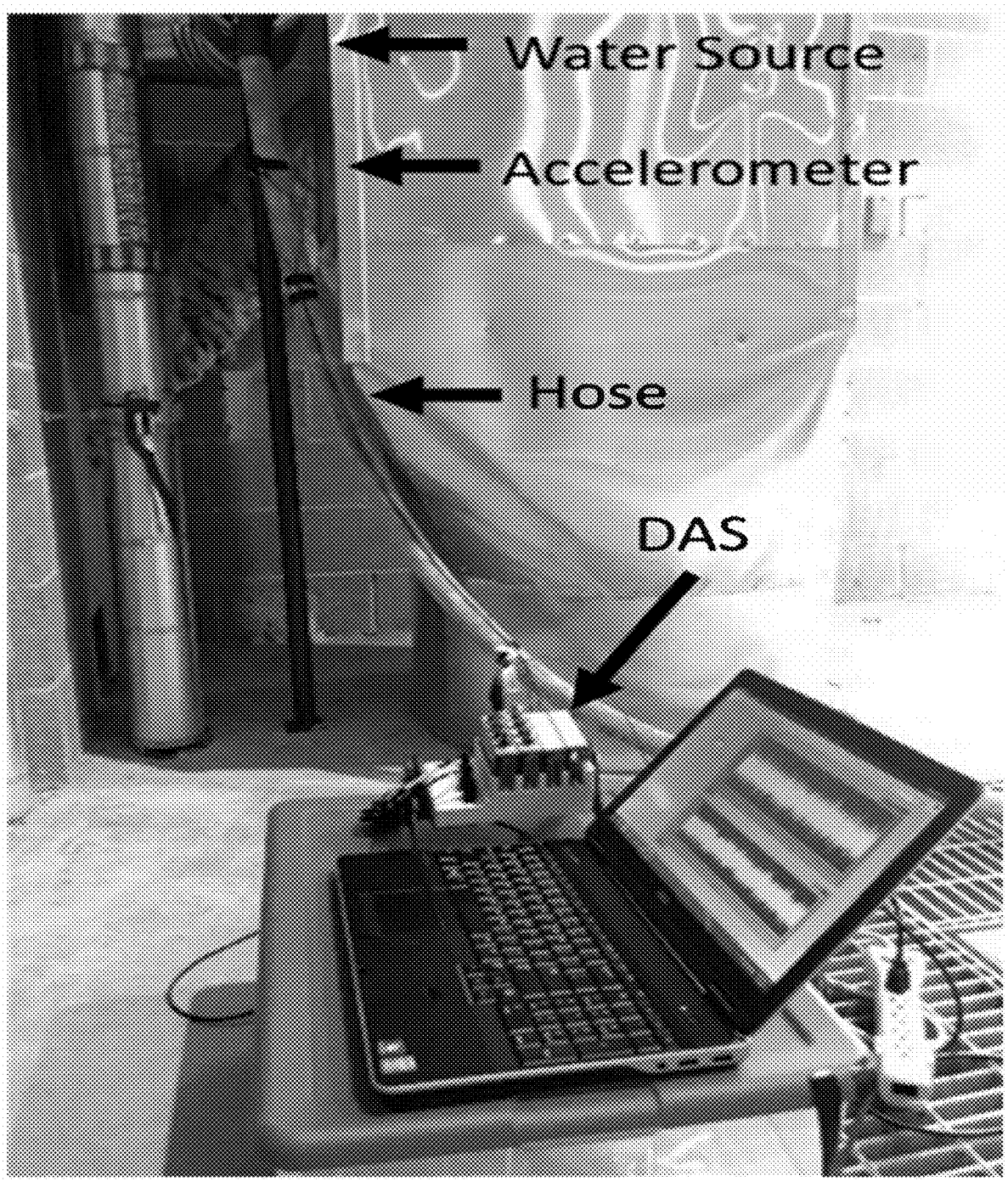
FIG. 37 shows: the wired experiment set up during data collection. The acceleration lead wire from the transducer was attached to the data acquisition system (DAS) and the laptop.

The lead wires from the transducer were attached to the channel unit with one channel for force and one for acceleration measured in volts. The channel unit was connected to the data acquisition system (DAS) on a laptop using a USB connection. Data collection software was used to collect and organize the data (FIG. 37).

Baseline acceleration and force data were collected for five, 10-second-long intervals while the hose was pressurized but water was not flowing. Data collected during the five baseline test runs indicated that typical noise vibrations in the hose were in the range of approximately ±0.1 m/s$^2$.

Figure 38:
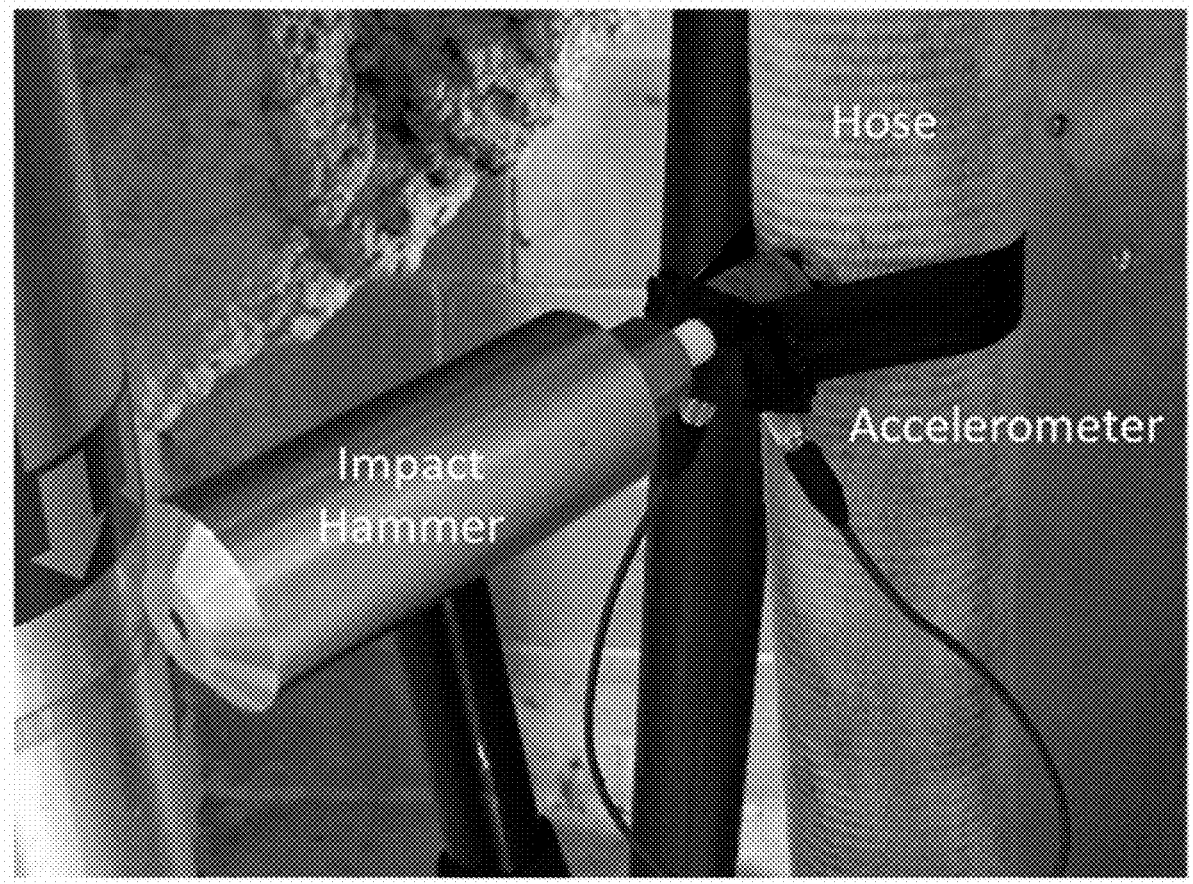
FIG. 38 shows: the impact hammer was used on the force sensor of the transducer.

Impact testing during Test 1 was done with the hose fully pressurized but without flow (0 LPM) before the flow testing started. Five impacts were made during a 10-second-long interval using an impact hammer on the force sensor of the transducer (FIG. 38). Ten, 10-second-long, data files were collected at the maximum frequency of 51.2 kHz. The impact testing resulted in accelerations between −400 m/s$^2$ to 150 m/s$^2$ and a force measurement less than 30 N.

Figure 39:
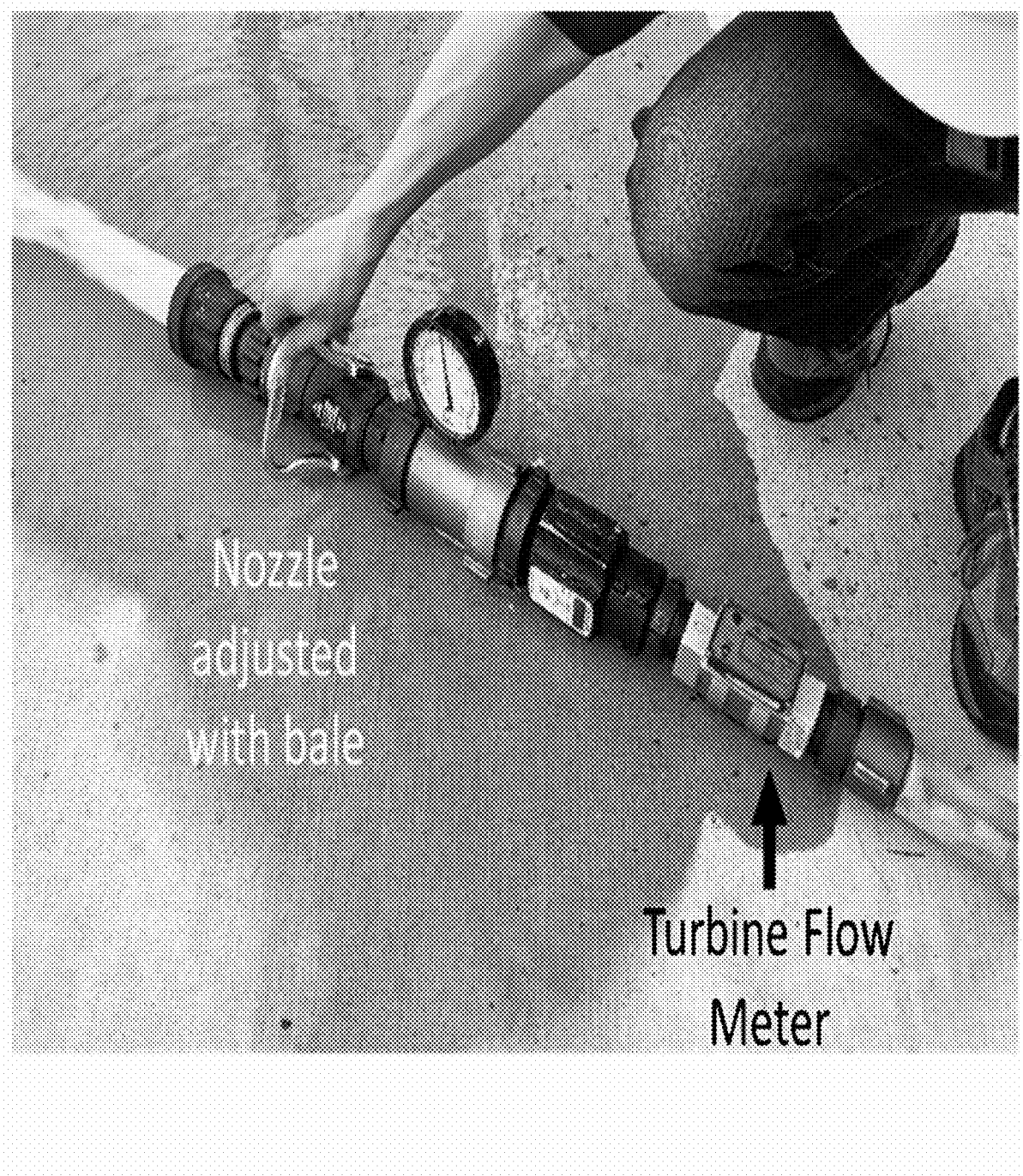
FIG. 39 shows: the flow rate was adjusted for each setting using the nozzle while reading the in-line turbine flow meter.

After the fire hose was pressurized with water, the nozzle bale was opened and the flow rate measured using the turbine flow meter at the nozzle (FIG. 39). The flow rates during Test 1 were approximately 38 LPM (10 GPM) apart, beginning with 0 LPM and ending at the highest flow rate that was achieved with the water source that day, 469 LPM (124 GPM), for a total of 13 flow rates. At each flow rate, 5 consecutive, 10-second-long test intervals of data were collected. A sampling rate of 51.2 kHz was used. Pressure was measured by a dial pressure gauge at the nozzle and noted for each flow rate.

During Test 2, a maximum flow rate of 538 LPM (142 GPM) was achieved and used to start the series of flow tests and the flow rate was decreased approximately 19 LPM (5 GPM) to 0 LPM, for a total of 30 flow rates. At each flow rate, 50 consecutive, 3-second-long test intervals of data were collected. A data sampling rate of 5 kHz was used. Although the duration of the test intervals and the sampling frequency was reduced to improve data management, it was determined that sufficient data was still being captured.

During Test 2, impact testing was done at the following flow rates: 0 LPM, 189 LPM (50 GPM), 379 LPM (100 GPM), and 568 LPM (150 GPM). At each flow rate, 30 consecutive, 3-second-long files were collected, each file with one impact. Data was collected at a sampling frequency of 5 kHz. A different impact hammer was used to excite the sensor at lower frequencies, below 100 Hz, as compared to the previous test.

Results and Discussion—Wired Accelerometer Test 1 and Test 2

The first step of this study was to apply a wired sensor and then to determine a metric to measure flow rate. The metric must provide a consistent relationship to flow rate that would also eventually allow for determining the flow rate in the hose in real-time.

The First Metric Chosen was the Standard Deviation of the Acceleration

Figure 40:
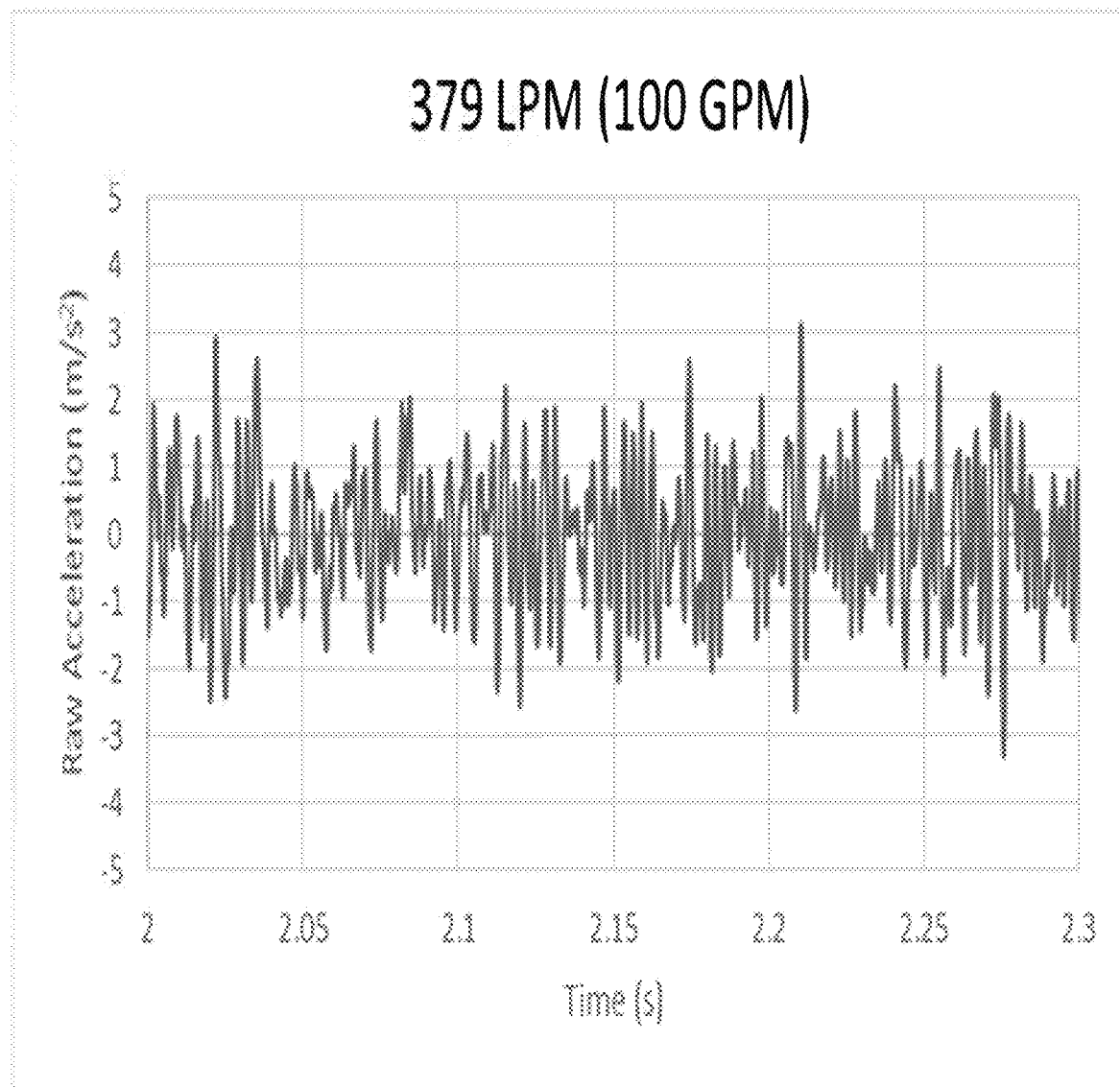
FIG. 40 shows: a sample of raw acceleration data from an accelerometer during a flow test (379 LPM (100 GPM)) for a 0.3-second-long time period. The standard deviation of the acceleration signal is used as a metric to determine if there is flow in the hose.

A sample time-series plot for 0.3 seconds of raw accelerometer data is shown (FIG. 40) for a single flow rate. The standard deviation for all the data points is calculated to represent the spread of the acceleration signal. As flow rate increased, the amplitude of this signal also increased for the flexible hose.

Figure 41:
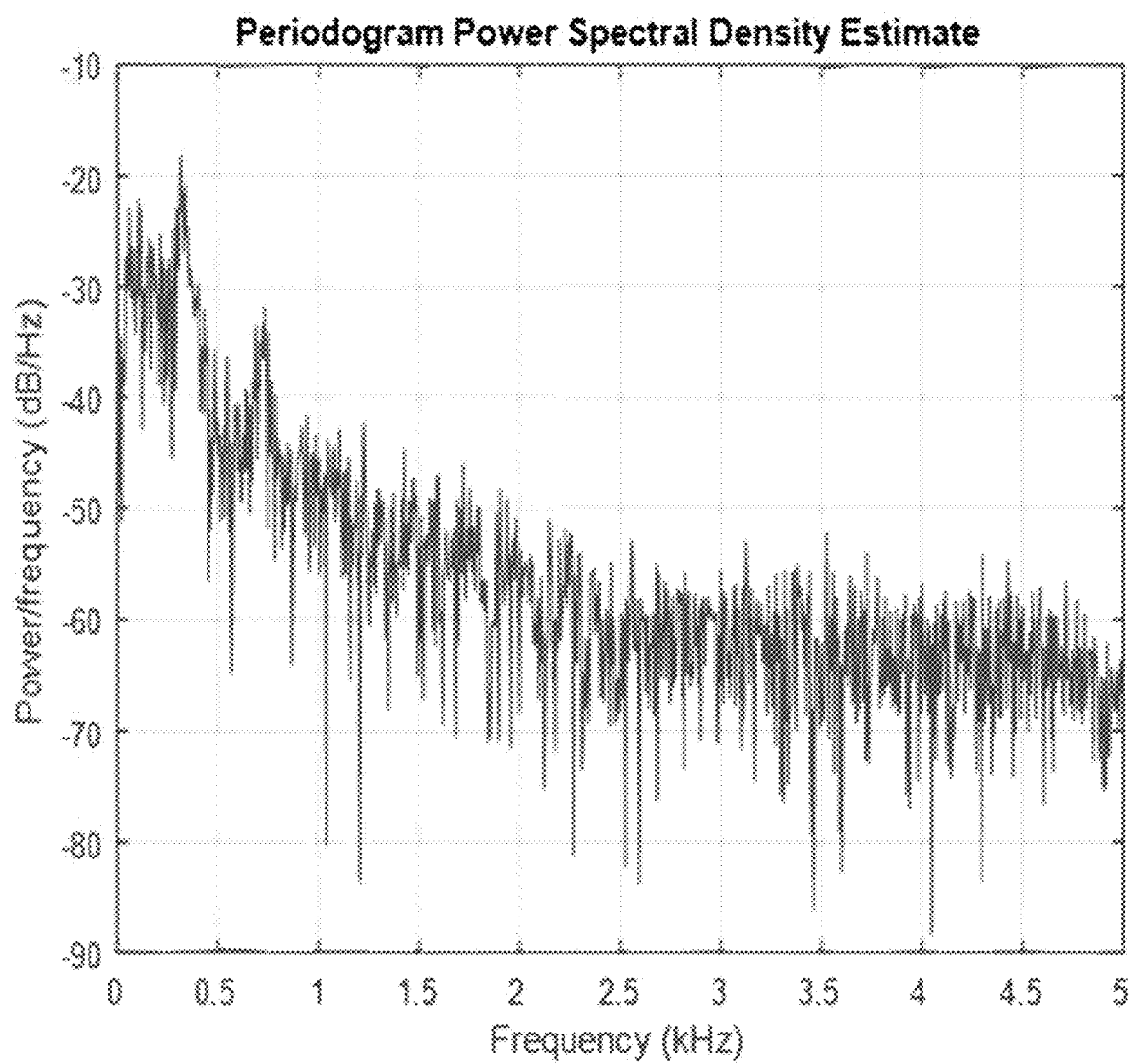
FIG. 41 shows: a sample of the dominant frequency based on the power spectrum. A peak can be seen around 300 Hz.

Another metric chosen was the dominant frequency at each flow rate. The time-series data was converted to the frequency-domain using a Fast Fourier Transform (FFT). A dominant frequency at each flow rate was determined based on the peak frequency from the power spectrum (FIG. 41). Decreasing power spectral density curves with increasing frequency is seen in FIG. 41. The natural frequency of a rigid pipe system generally decreases with increasing water flow rate through the pipe.

Results and Discussion—Wired Accelerometer Test 1

Figure 42:
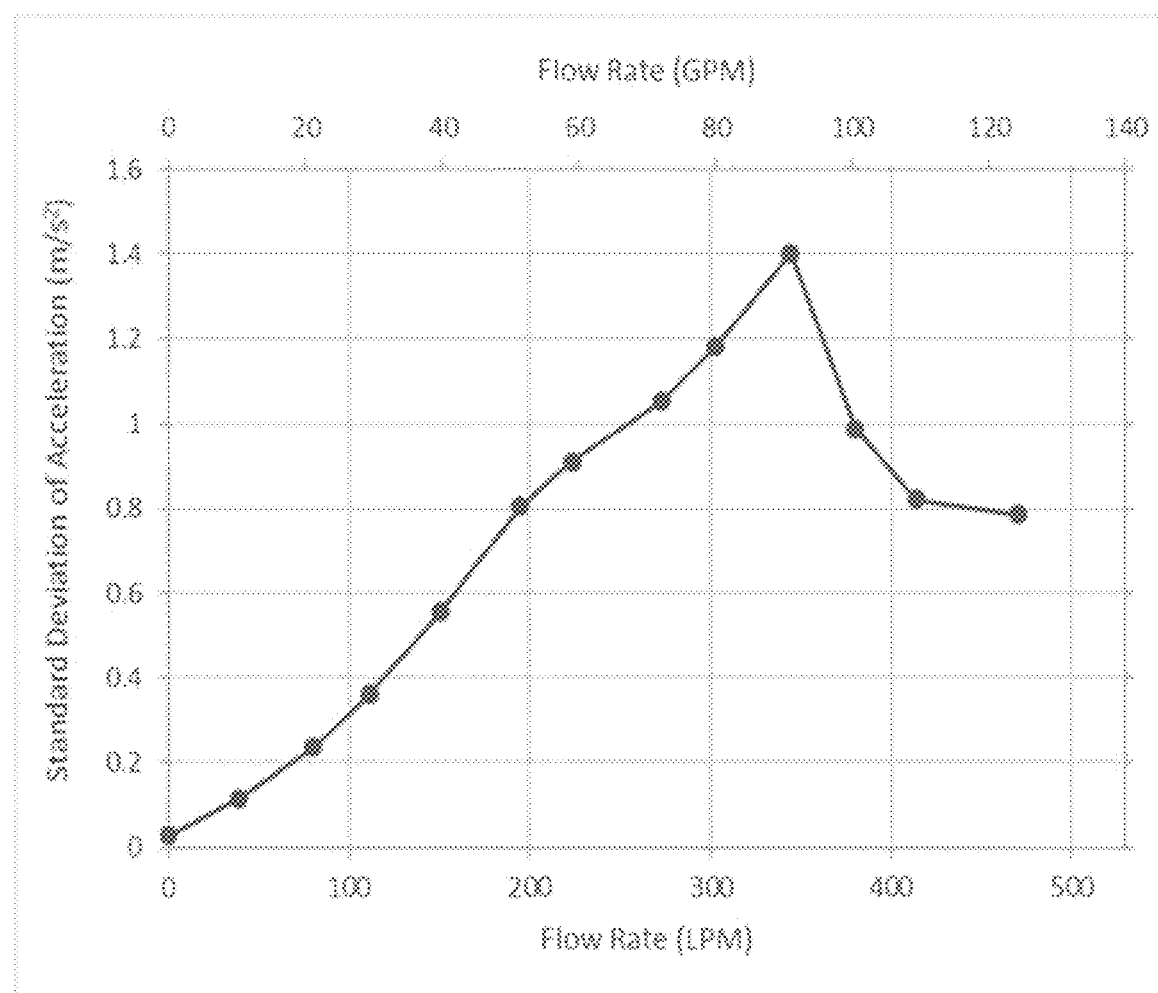
FIG. 42 shows: standard deviation of acceleration versus flow rate for Test 1. A peak is noted around 344 LPM (91 GPM)

The standard deviation of acceleration was determined for each flow rate (FIG. 42). Although at each flow rate, 5 consecutive, 10-second-long intervals of data were collected at a sampling rate of 51.2 kHz, the data for each interval were very similar. Hence, only one 10-second-long test interval was used to determine the standard deviation of acceleration. At a sampling rate of 51.2 kHz, the single 10 second interval contained a total of 512 k data points. Since this was the first test, a high sampling rate was used to capture a full data set.

The trend in FIG. 42 shows that the standard deviation of acceleration increased fairly linearly as the flow rate increased until 344 LPM (91 GPM). After the peak, the standard deviation of acceleration began decreasing even as the flow rate continued to increase.

The impact testing on the force sensor on the accelerometer showed a dominating frequency around 450 Hz. Initially, a high pass filter was applied to the analysis so that data collected with a frequency of less than 500 Hz was ignored to avoid the impact of the dominant frequency. With the filtering, an almost linear relationship was observed between the standard deviation of acceleration and flow rate for the entire flow range. However, this linear trend especially throughout the upper range of flow rates did not occur for any of the subsequent tests (Test 2 and Test 3). Filters in the data analysis were removed. The dominant frequency at each flow rate was also determined for Test 1, yet the relationship was not consistent with flow rate. The inconsistency may have been due to the location of the accelerometer on the hose close to the water source, or the hose hanging vertically down from the connection with the water source.

Results and Discussion—Wired Accelerometer Test 2

Thirty flow rates were chosen from 0 LPM to 538 LPM (142.2 GPM), set in 19 LPM (5 GPM) increments for Test 2. Acceleration data from the single accelerometer located in the same position as in Test 1 was collected 50 consecutive times, for 3 seconds each, in separate data files at each flow rate at a sampling rate of 5 kHz. Data among the 50 consecutive runs was similar and therefore only one, 3-second-long, test interval was used. At a sampling rate of 5 kHz, the single 3-second-long interval contained a total of 15 k data points. A lower sampling rate was used for Test 2 than for Test 1 but was sufficient in capturing a full set of data with frequencies below the Nyquist value of 2.5 kHz. Software processed the raw data to determine the standard deviation of the acceleration.

Figure 43:
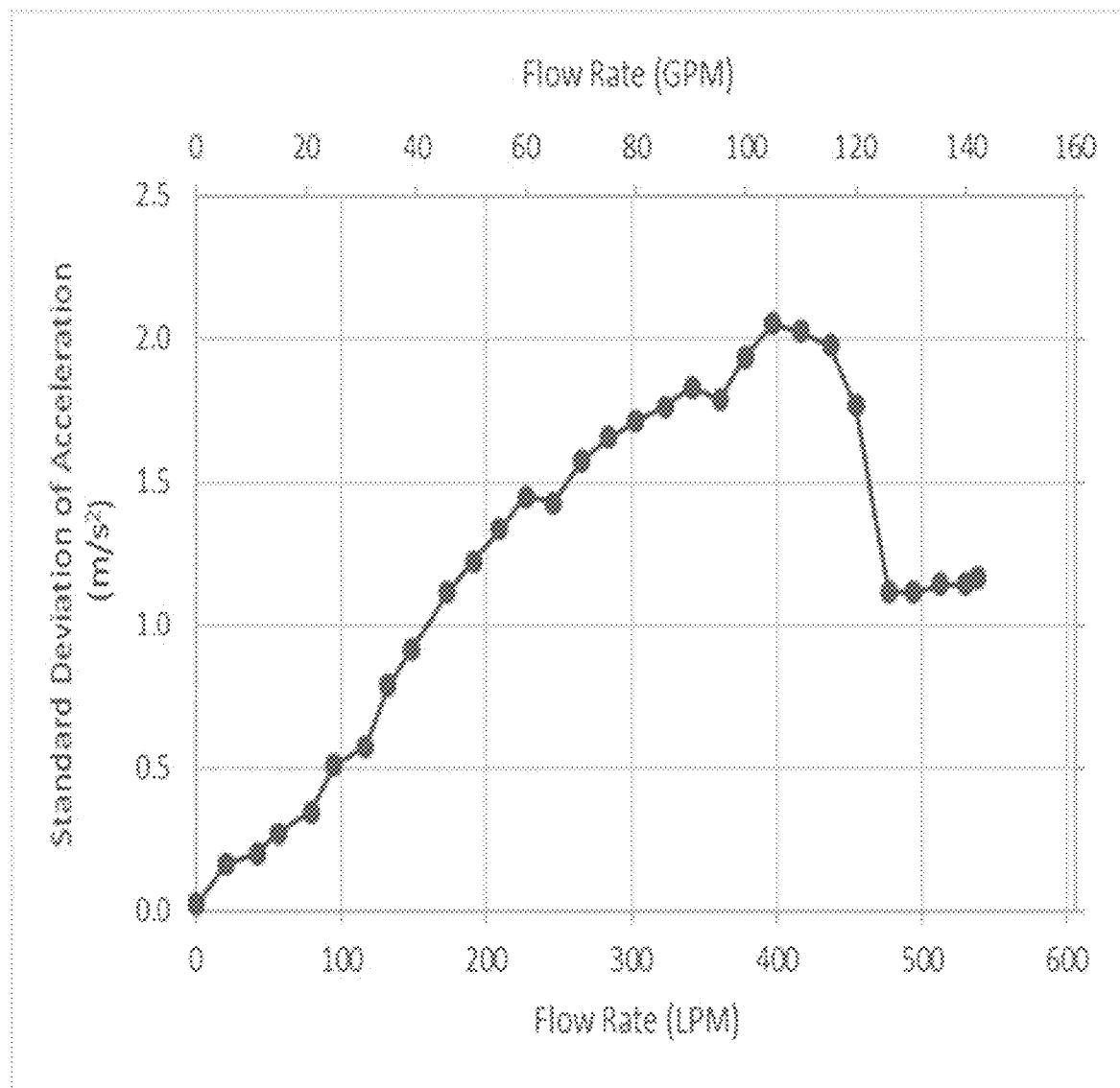
FIG. 43 shows: standard deviation of acceleration versus flow rate for Test 2.

Standard deviation of acceleration was plotted versus flow rate (FIG. 43). The trend of the data was similar to Test 1 in FIG. 42. In Test 2 the standard deviation peaked, around 397 LPM (105 GPM) after a fairly linear region, and then decreased. The dominant frequency at each flow rate was also determined, however, similar to Test 1, the relationship was not consistent with flow rate which may have been related to the accelerometer being in the same position on the vertical hanging hose section.

Wired Accelerometers Test 3—Four Accelerometer Study

Introduction—Wired Accelerometers Test 3

Based on the previous experiments with the single accelerometer, Test 3 was designed to include four accelerometers to collect data. One accelerometer was located at each end of the hose, and two accelerometers were in the middle. Since the overall goal of this project is to measure water flow at the nozzle end of the hose, one of the accelerometers was placed close to the nozzle.

Methods—Wired Accelerometers Test 3

Figure 44:
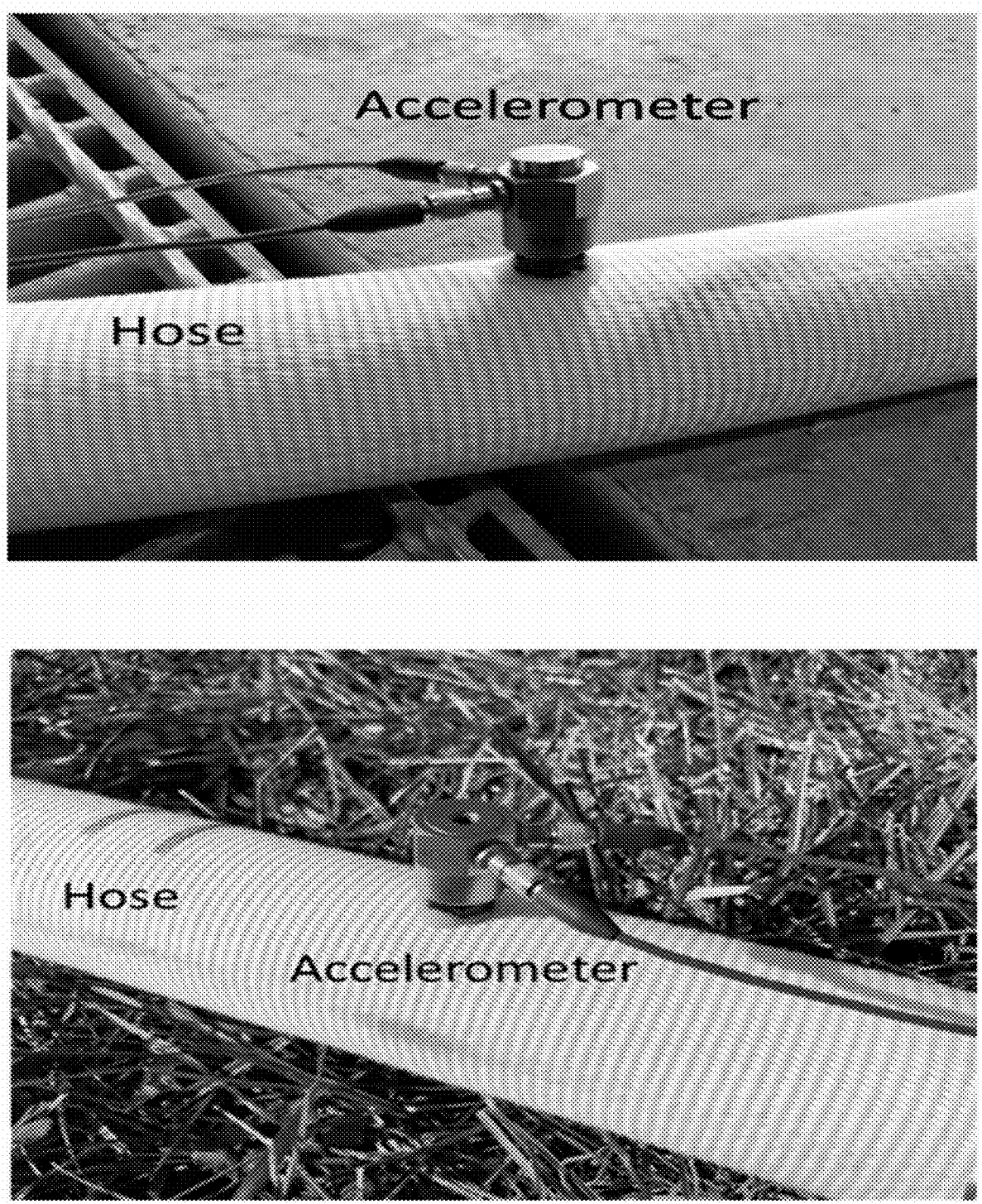
FIG. 44 shows: the two accelerometers at the upstream (Back) location (on the concrete floor (left), and the downstream (Front) location outside in the grass close to the nozzle (right)
Figure 45:
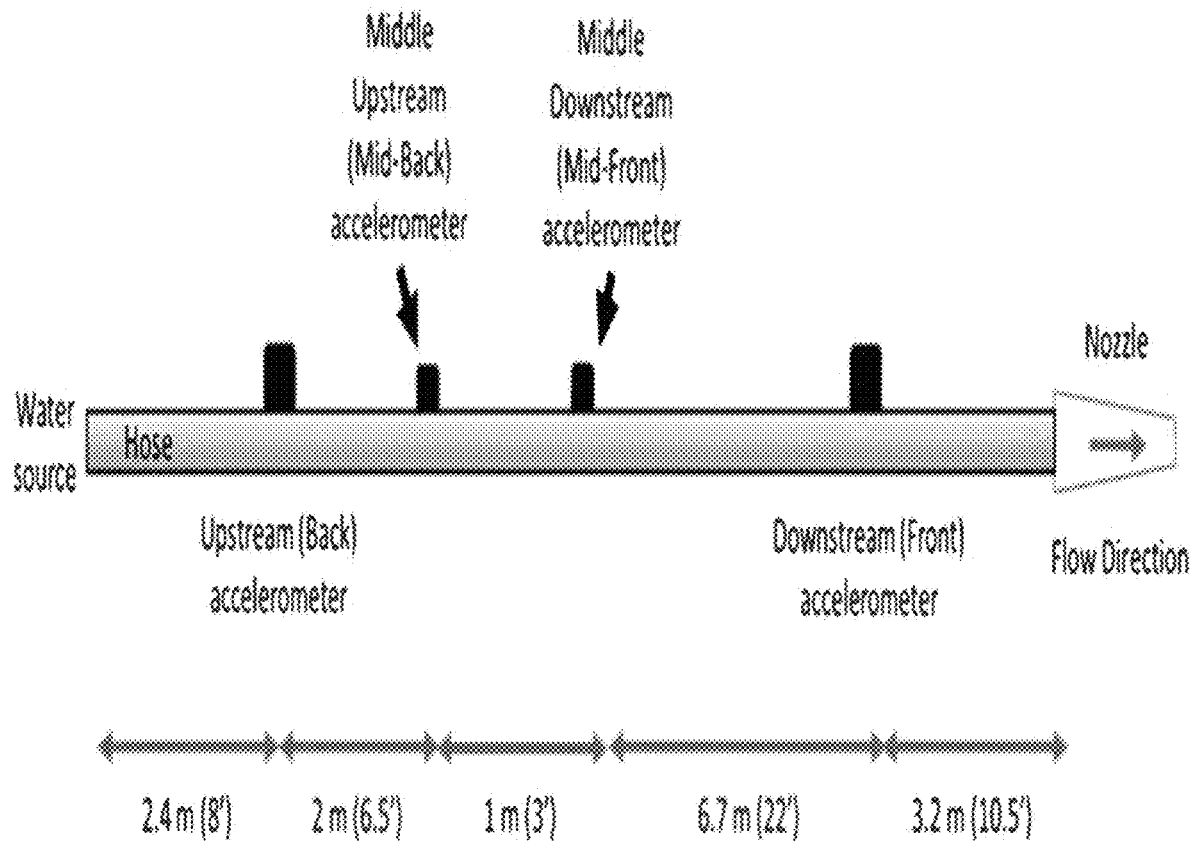
FIG. 45 shows: the four accelerometer locations along the 15 m (50 ft) fire hose.
Figure 46:
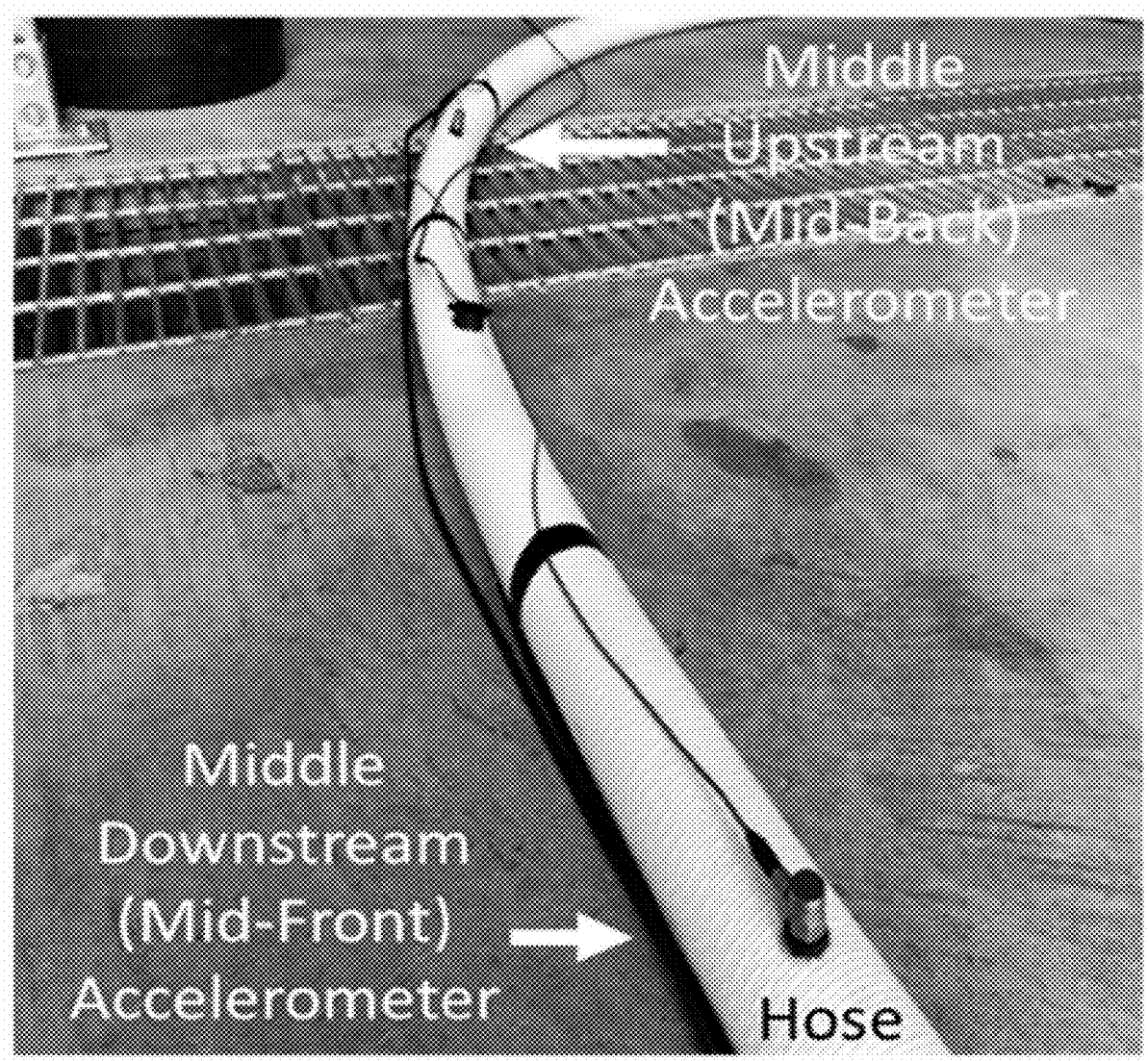
FIG. 46 shows: the two accelerometers approximately 1 m (3 ft) apart were attached to the hose resting on the concrete floor.

The experimental set up for this study included four piezoelectric accelerometers. The piezoelectric accelerometers at either end of the hose (PCB model 288D01) measured acceleration and stand about 2 cm high. They were mounted on bases epoxied to the outer surface of the hose (FIG. 44). The downstream accelerometer (labeled 'Front') was located approximately 3 m (10 ft) from the nozzle and the hose rested in grass (FIG. 45). The upstream accelerometer (labeled 'Back') was located approximately 2.4 m (8 ft) from the hose attachment to the water source and the hose was positioned flat on the concrete floor. Both accelerometers communicated over the wired network to the data acquisition system.

The two middle accelerometers (PCB model 352C33) measured acceleration and were also about 2 cm high. The two middle accelerometers (labeled 'Mid-Front' and 'Mid-Back') were located on a section of hose that was flat on the concrete floor (FIG. 36). The voltages from the accelerometers were collected by software. The accelerometers were wired to the data acquisition system and power was supplied from the data acquisition system.

Figure 47:
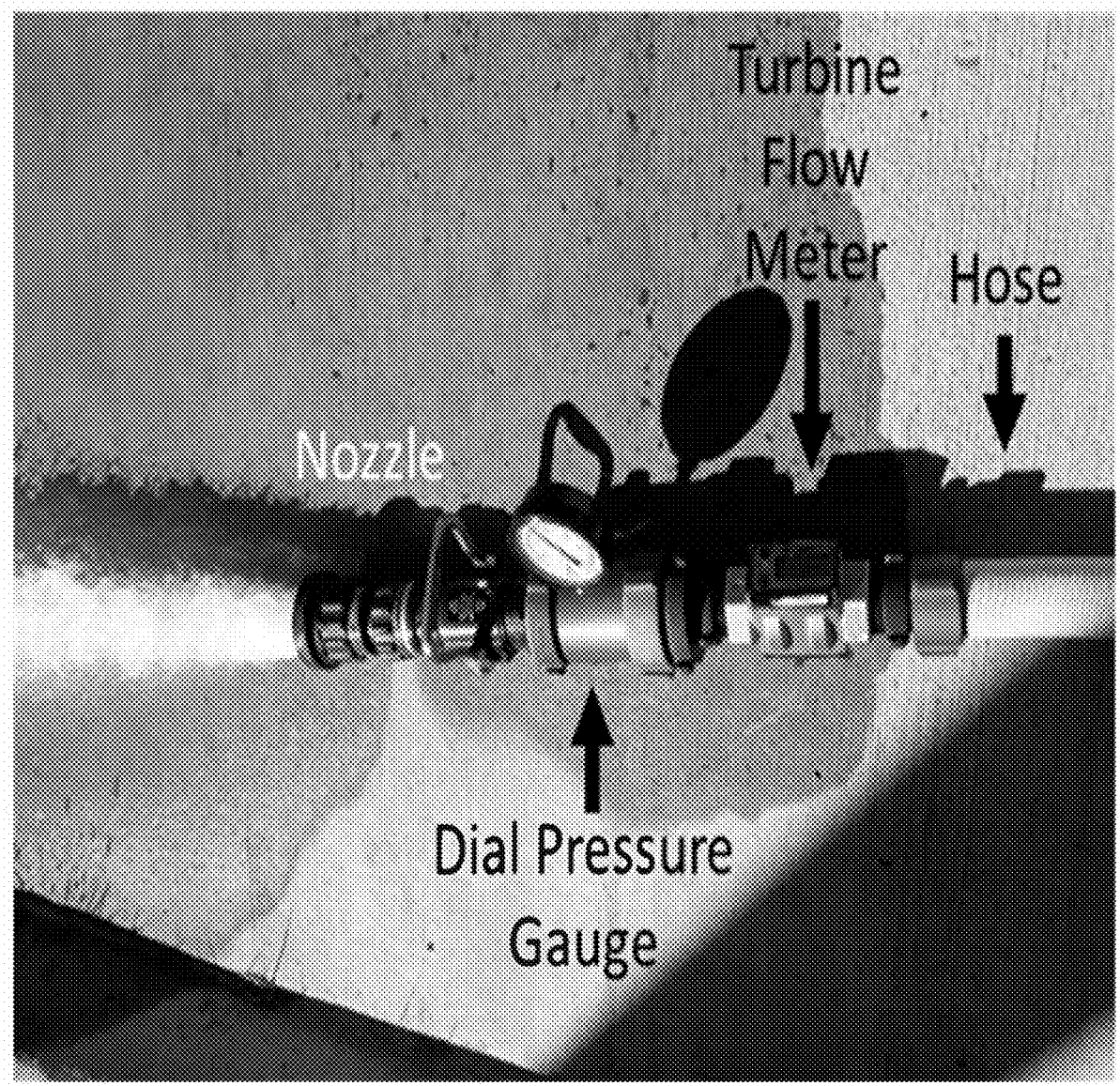
FIG. 47 shows: nozzle, dial pressure gauge, and turbine flow meter at the downstream (Front) end of the fire hose.

The same nominal 4.5 cm (1.75 in) inner diameter, 15 m (50 ft), fire attack hose, the same in-line turbine style commercial flow meter, in the same configuration from Test 1 and Test 2 was used for Test 3 (FIG. 47). The highest flow rate consistently achieved during Test 3 was approximately 606 LPM (160 GPM). The flow rate was then lowered in 19 LPM (5 GPM) increments until 0 LPM.

Figure 48:
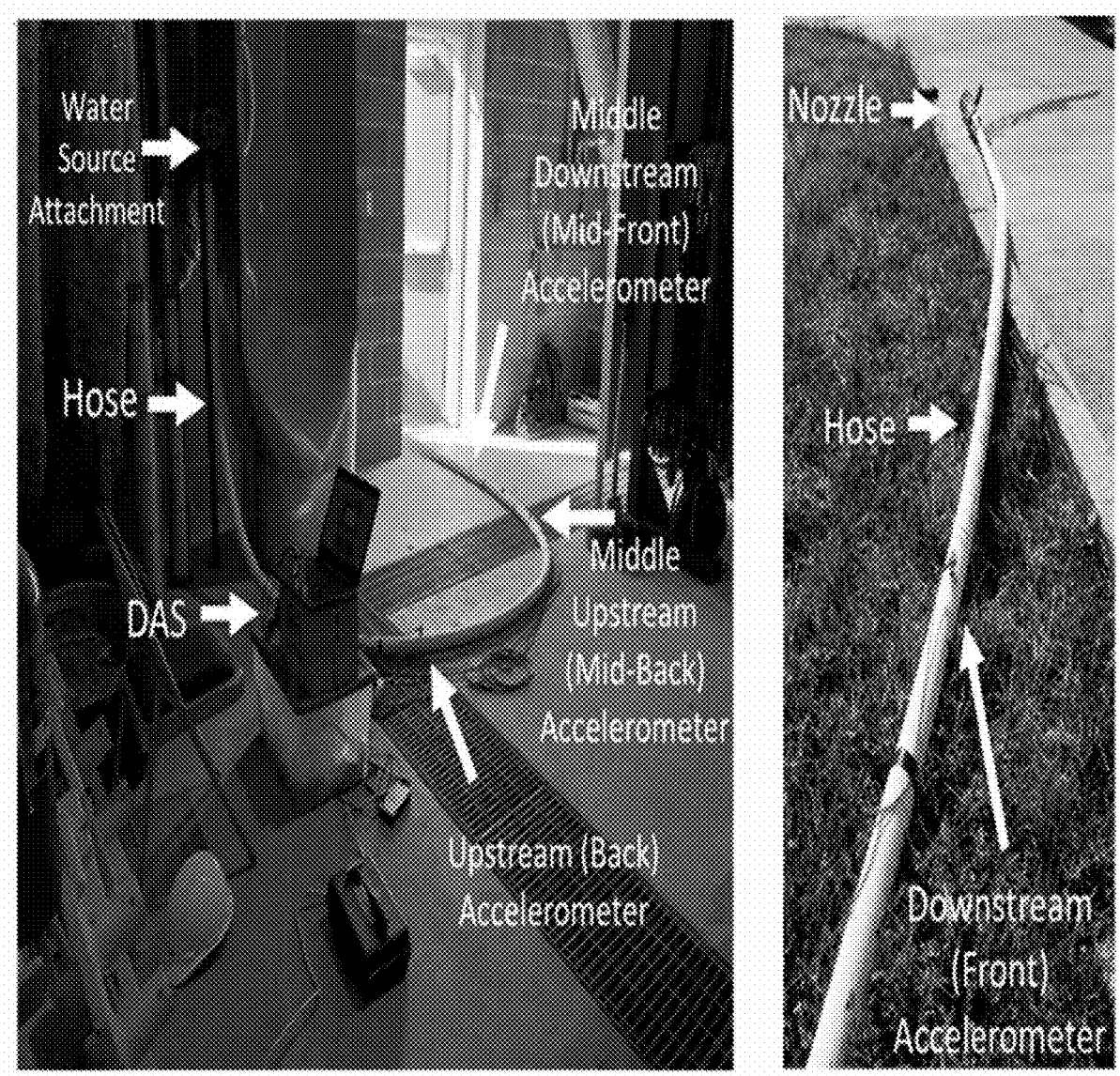
FIG. 48 shows: the fire hose attached to the building water source and three accelerometers on the floor (left), and the downstream (Front) accelerometer in the grass and the nozzle (right)

The lead wires from the accelerometer were attached to the DAS connected to a laptop via a USB port. The same data collection software from Test 1 and Test 2 was used to collect and organize the data for Test 3 (FIG. 48).

The hose was pressurized with the nozzle closed and the dial gauge measured approximately 0.6 MPa (90 psi). Initial baseline data was collected with no flow to confirm all four accelerometers were working correctly and to determine the baseline noise vibrations. The baseline data collected indicated that the non-flow, noise, vibrations were in the range of approximately ±0.1 m/s^2.

The nozzle was opened, and the target flow rate was set using the nozzle bale to regulate the water flow. The reference flow rate was measured by the turbine flow meter at the nozzle. The data collection program was started and vibration data from all four accelerometers was collected for 50 consecutive 3-second-long increments at a sampling frequency of 5 kHz.

Figure 49:
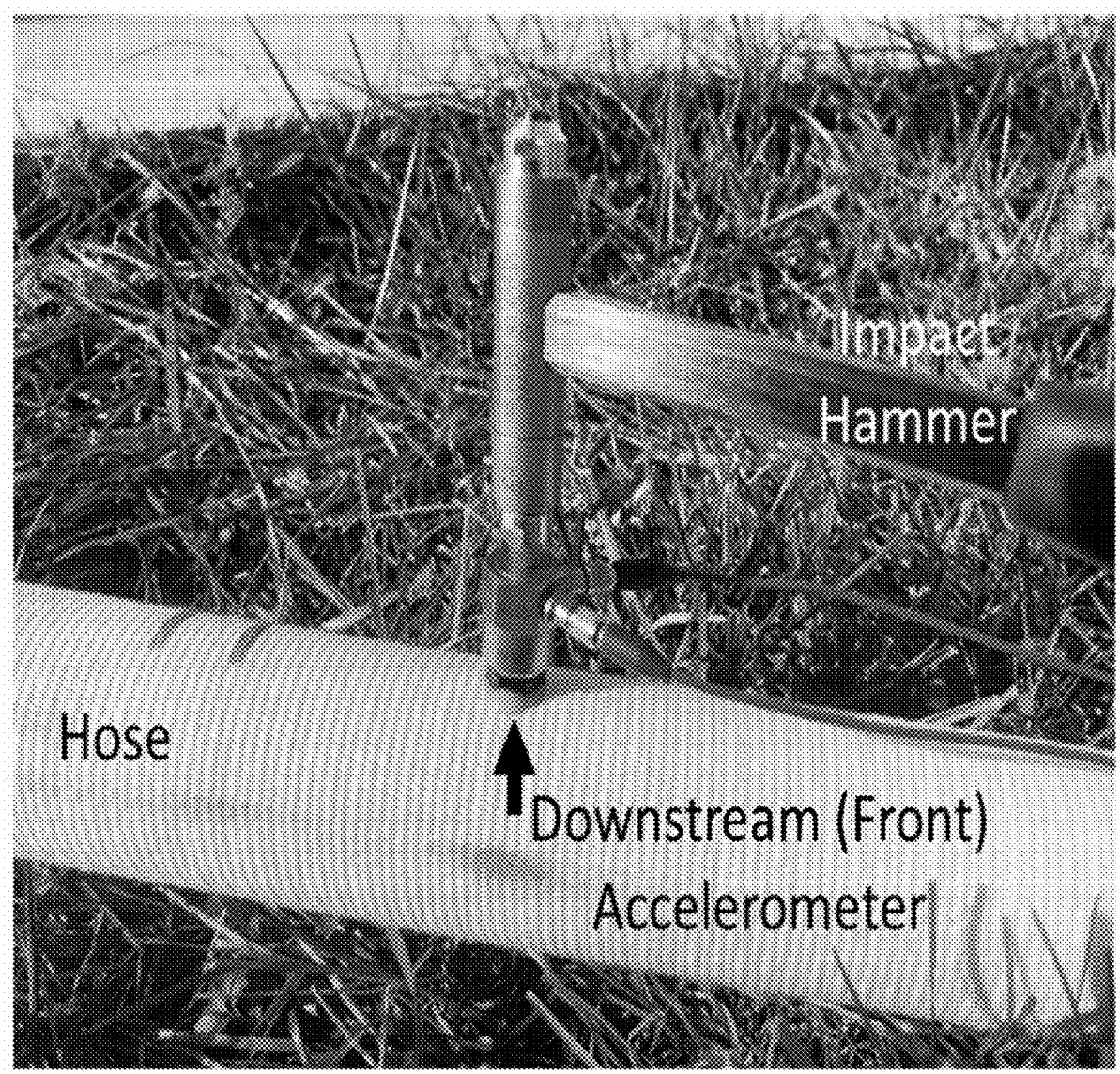
FIG. 49 shows: impact testing on the downstream (Front) accelerometer using the rubber-tipped impact hammer.
Figure 50:
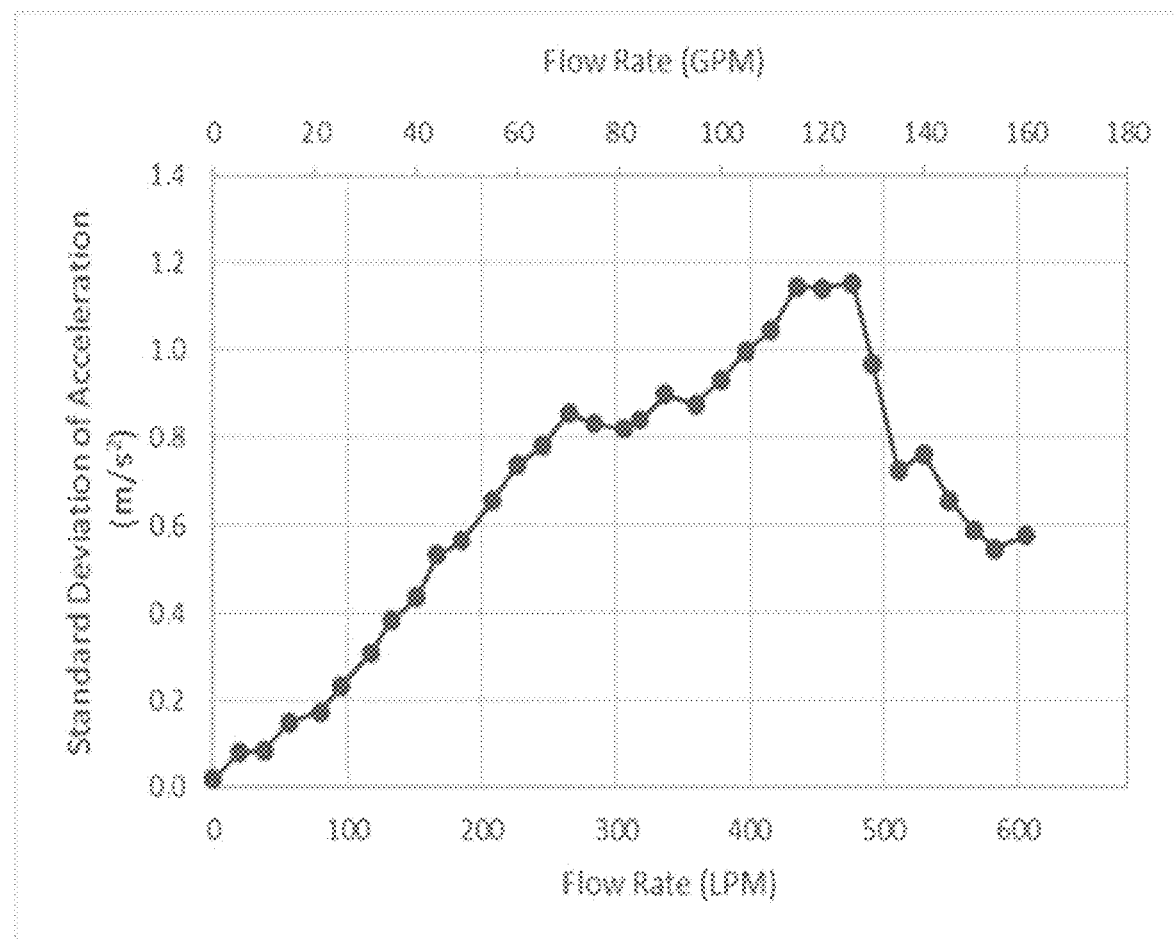
FIG. 50 shows: the standard deviation of acceleration versus flow rate for the accelerometer in the upstream (Back) location.
Figure 51:
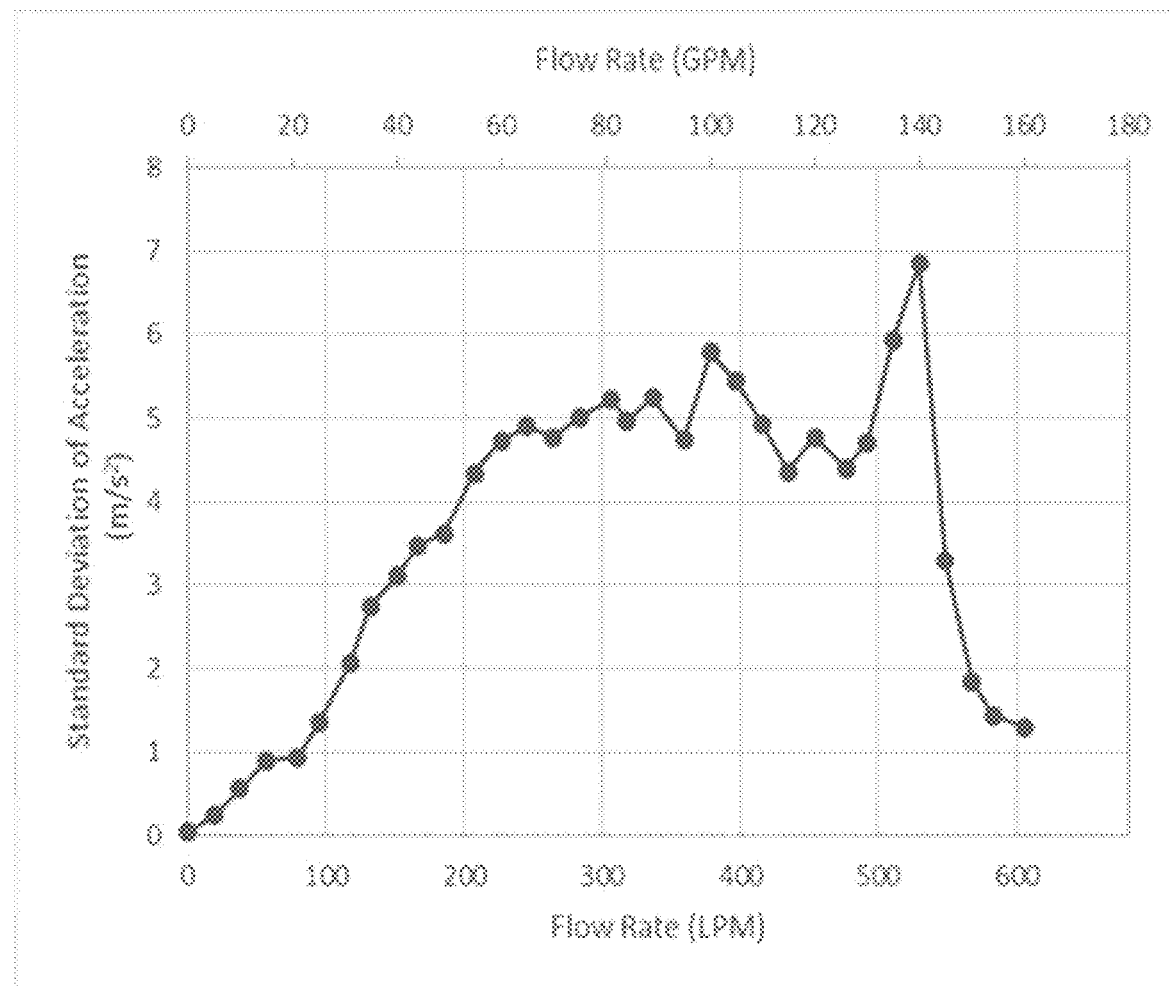
FIG. 51 shows: the standard deviation of acceleration versus flow rate for the accelerometer in the downstream (Front) location, closest to the nozzle.
Figure 52:
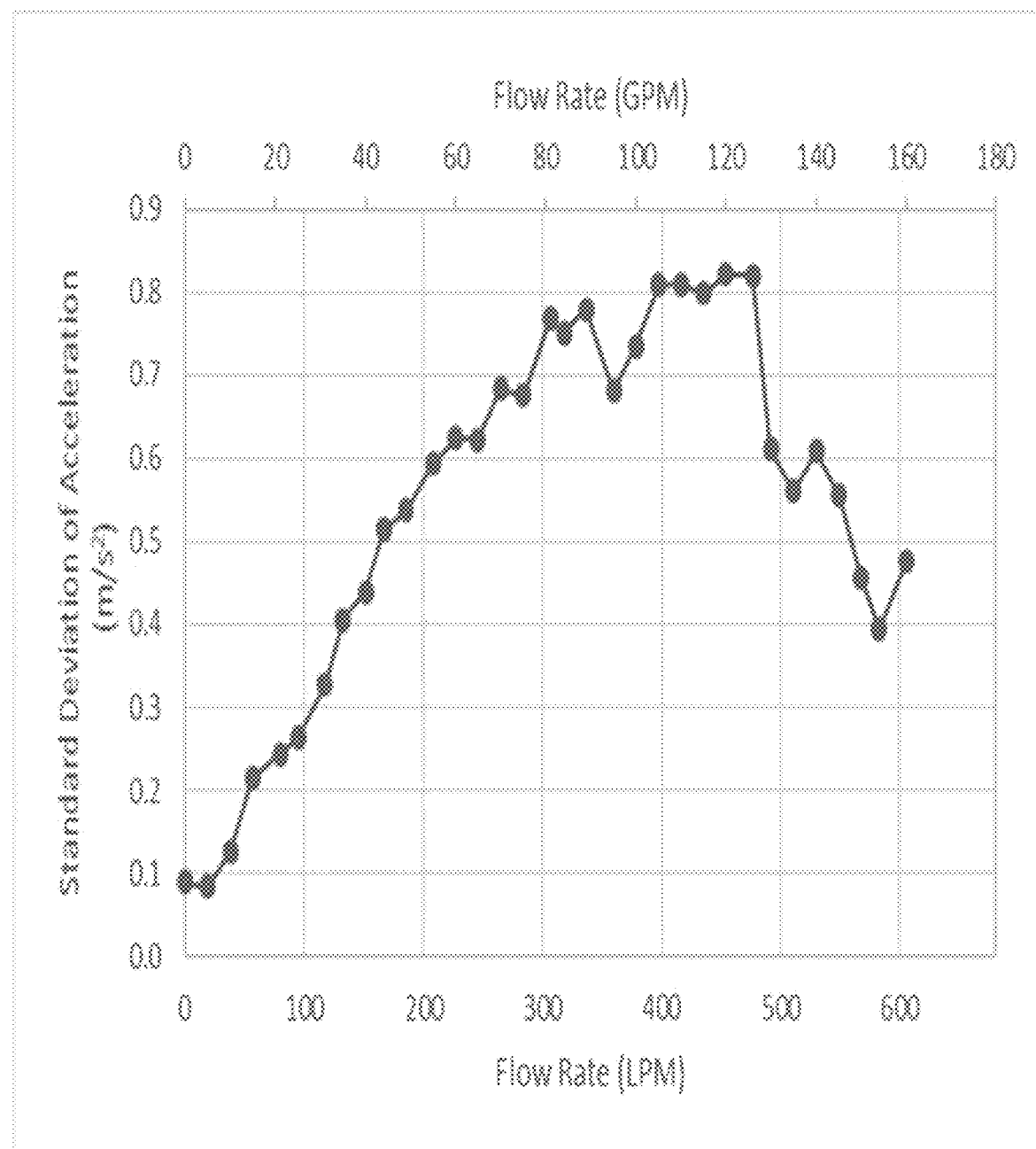
FIG. 52 shows: the standard deviation of acceleration versus flow rate for the accelerometer in the middle upstream (Mid-Back) location.
Figure 53:
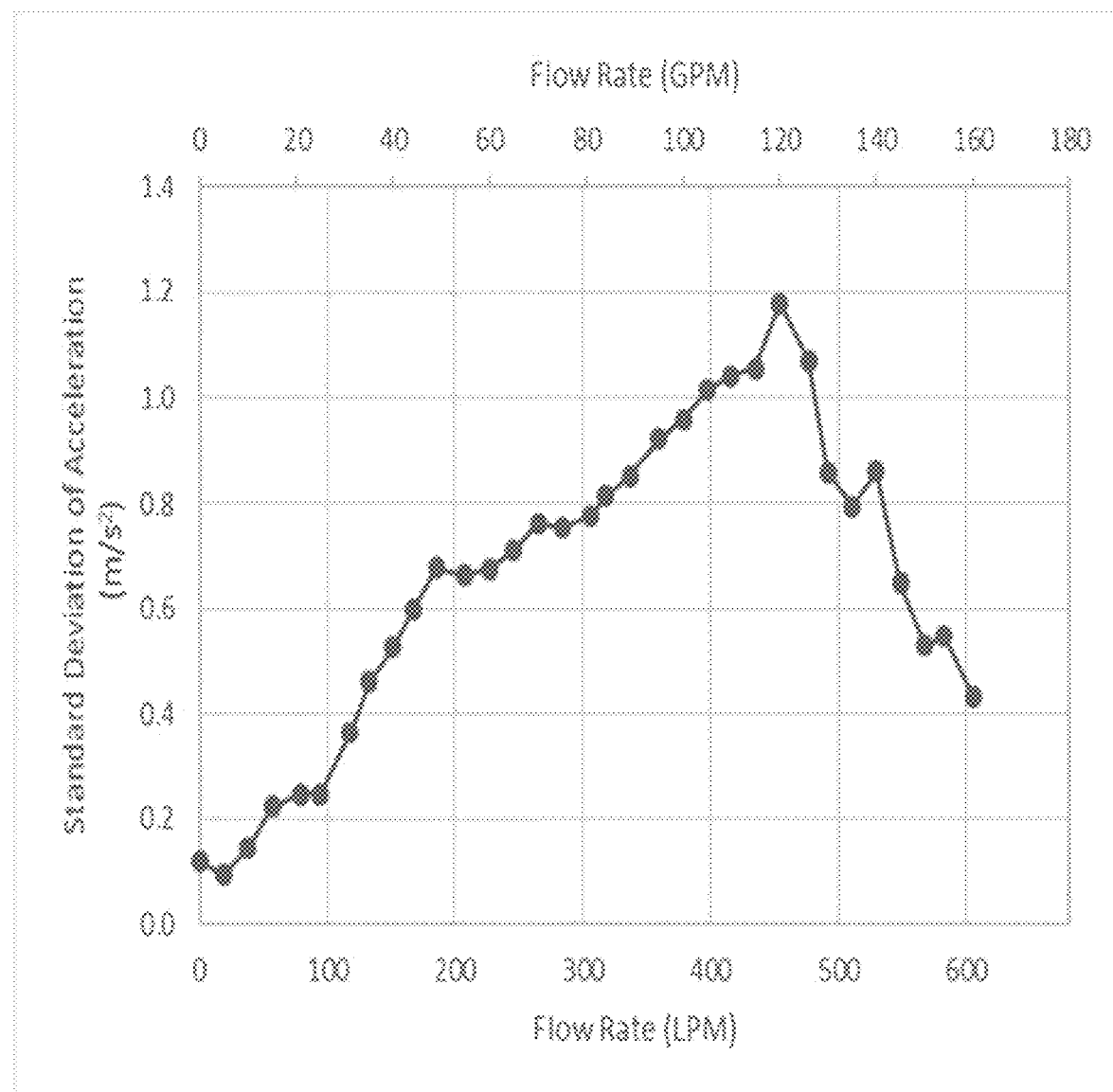
FIG. 53 shows: the standard deviation of acceleration versus flow rate for the accelerometer in the middle downstream (Mid-Front) location.

Impact testing was done using a rubber-tipped impact hammer (FIG. 49) on both upstream (Back) and downstream (Front) accelerometers during the following approximate flow rates to determine dominant frequencies: 606 LPM (160 GPM), 454 LPM (120 GPM), 303 LPM (80 GPM), 151 LPM (40 GPM), and 0 LPM. The impact profiles of thirty impacts were collected. The impact testing resulted in accelerations between approximately −400 m/s^2 to 150 m/s^2 (and a force less than 30 N).

Results and Discussion—Wired Accelerometers Test 3

Results and Discussion—Wired Accelerometers Test 3—Standard Deviation of Acceleration The standard deviation of acceleration was calculated from the raw acceleration data and plotted versus flow rate at each of the four accelerometer locations along the hose (FIGS. 50-53). The trend at all four accelerometer locations was similar to that of Test 1 and Test 2, where the standard deviation of acceleration generally increased until peaking and then decreased. Data among the 50 consecutive runs was similar and therefore only one 3-second-long test interval was used.

Figure 54:
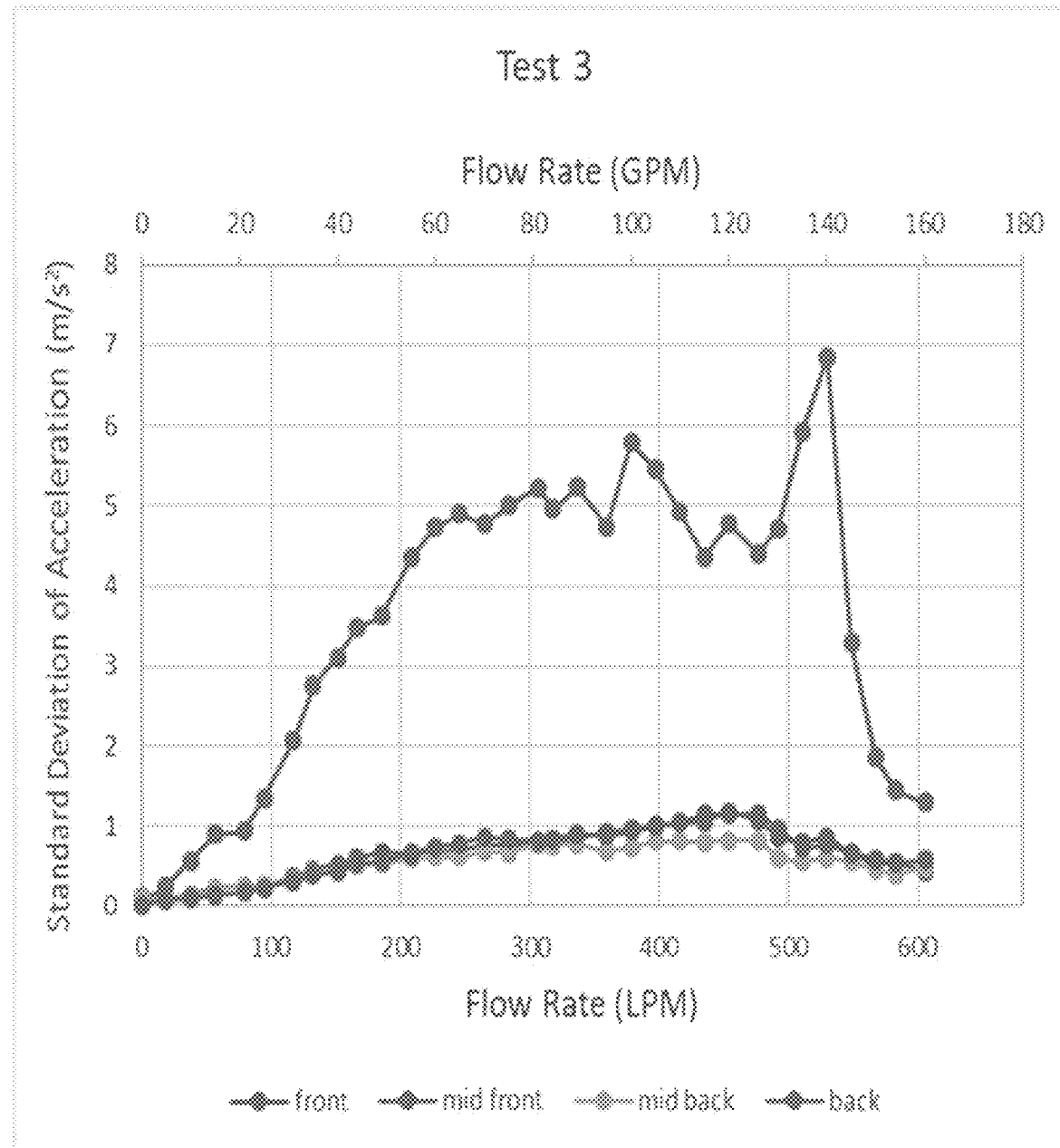
FIG. 54 shows: typical results of the standard deviation of acceleration versus flow rate for the four accelerometers in Test 3.

When the standard deviation values for all four accelerometer locations were plotted together (FIG. 54), the standard deviation values at the front downstream location were clearly larger than the values from the other three locations. Nonetheless, all trends for the four locations had a similar increasing relationship for lower flow rates and then peak before following a decreasing trend.

The structural dynamic differences between the rigid pipes and the flexible hose could be causing the decreasing trend at higher flow rates, The bell-shaped curve determined at each accelerometer location excludes the standard deviation of acceleration as a primary metric for determining flow rate over the entire flow rate range because of the lack of monotonicity; at a single level of standard deviation of acceleration, there could be two corresponding flow rates.

Results and Discussion—Wired Accelerometers Test 3—Dominant Frequency

Figure 55:
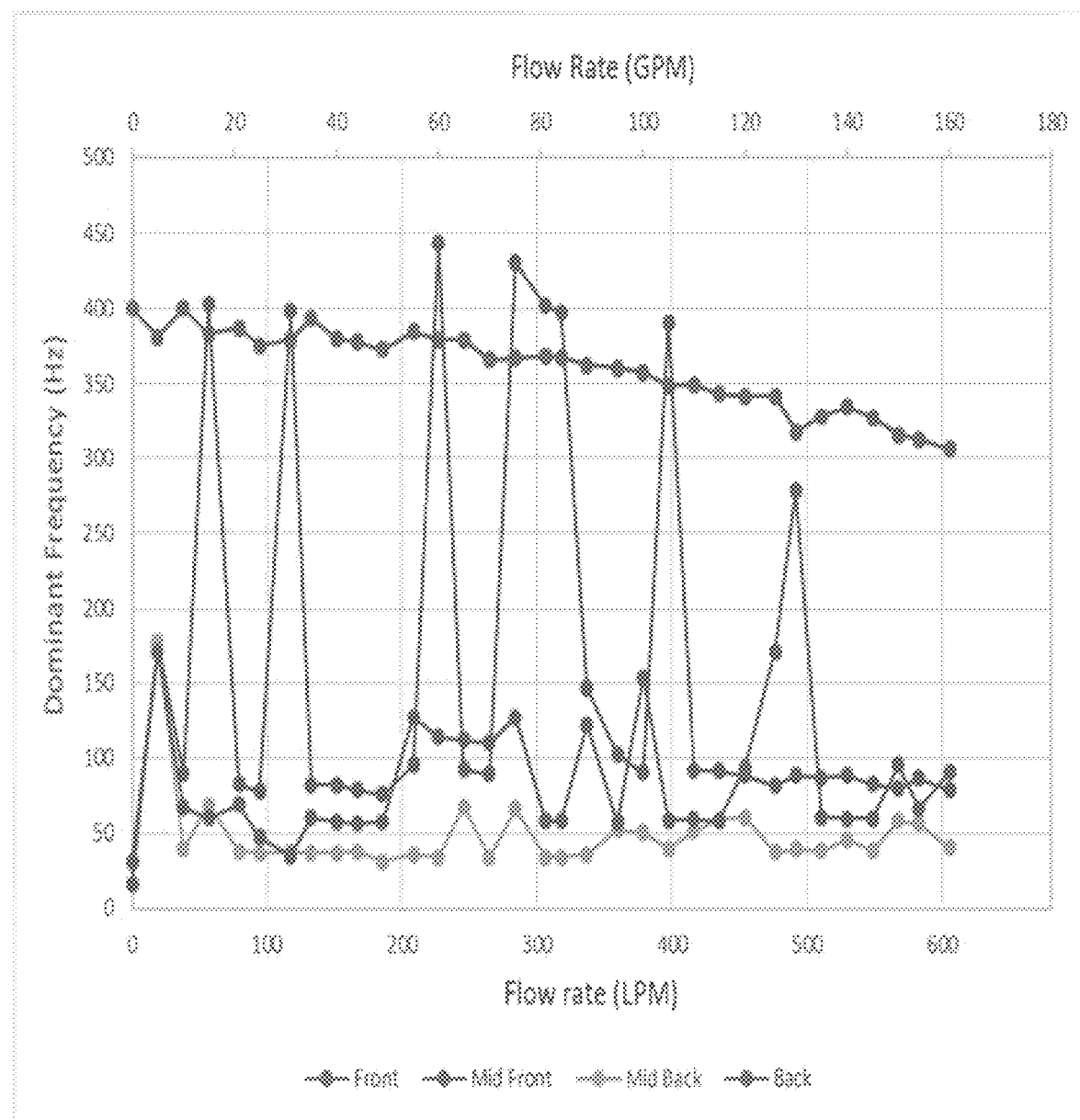
FIG. 55 shows: dominant frequency versus flow rate for all four accelerometers for Test 3.

The time-domain, acceleration data was converted to frequency-domain using a Fast Fourier Transform (FFT). A dominant frequency at each flow rate was observed (FIG. 41). A decreasing trend was observed for the front accelerometer, however not for the back, mid-back, and mid-front accelerometer locations (FIG. 55). When water is flowing through a rigid pipe, the dominant frequency typically does decrease with increasing flow rate. Thus, a similar trend was expected for flexible hose.

The difference between the front accelerometer and the other locations for the dominant frequency results (FIG. 55) and the standard deviation of acceleration results (FIG. 54) may be due to the surface supporting the hose impacting the vibration dynamics. The front accelerometer was located on hose that was in grass, whereas the other accelerometers were located on hose supported by concrete. Additional research is needed to understand the source of these location-related differences.

Figure 56:
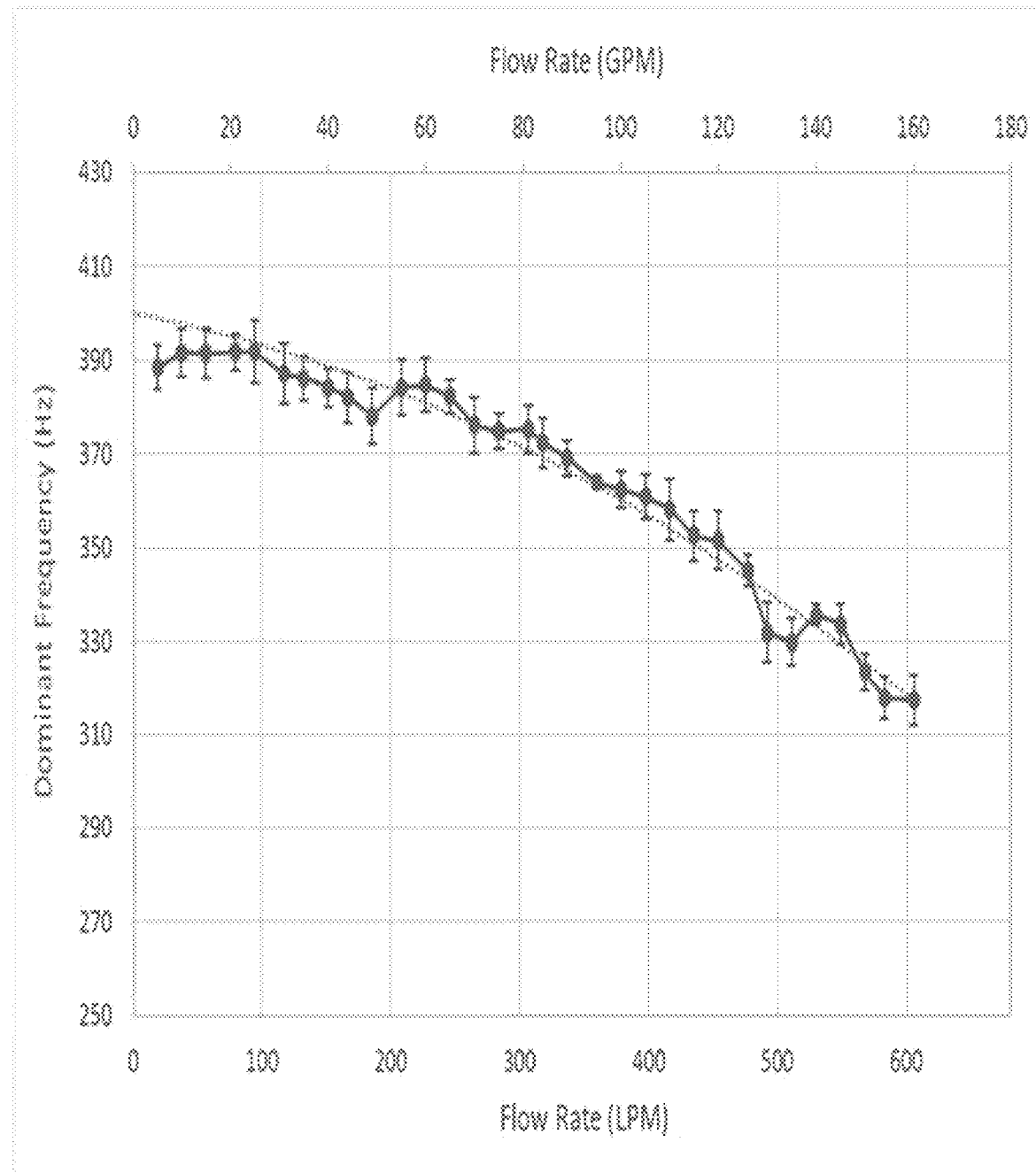
FIG. 56 shows: the mean and standard deviation for the dominant frequency versus flow rate for the Front accelerometer for all 50 data collection increments for Test 3.

Based on FIG. 55, further analysis was focused only on the front, downstream, accelerometer, closest to the nozzle. The mean of all 50 data collection increments for Test 3 are shown in FIG. 56 with standard deviation bars. The dominant frequency decreased consistently with increasing flow rate. A dominant frequency value is not shown for 0 LPM because the signal noise instead of the hose flow dominated the signal. Based on the impact tests however, the dominant frequency at the no-flow condition was approximately 395 Hz (FIG. 57).

The impact tests were originally performed to understand the flexible hose dynamics as well as the dominant frequency of the hose system so that the standard deviation of acceleration analysis would not be influenced by the dominant frequency. After further analysis, the dominant frequency relationship with flow rate became the preferred metric, and the flow testing data was used to determine the dominant frequency. To confirm the analysis, we compared the results from two different testing approaches: impact testing and flow-rate testing.

Figure 57:
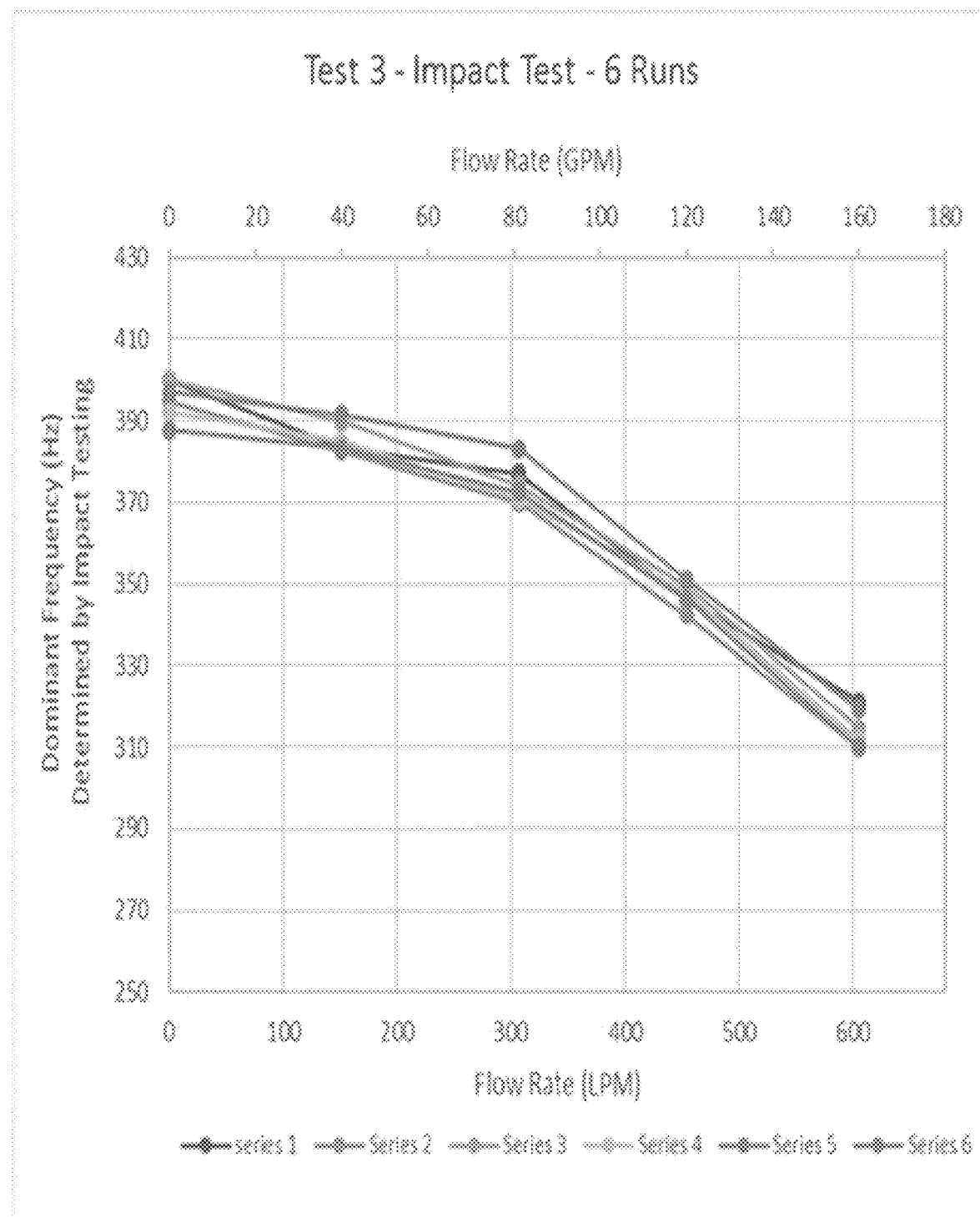
FIG. 57 shows: dominant frequency versus flow rate for the Front accelerometer for Test 3 as determined by impact testing.
Figure 58:
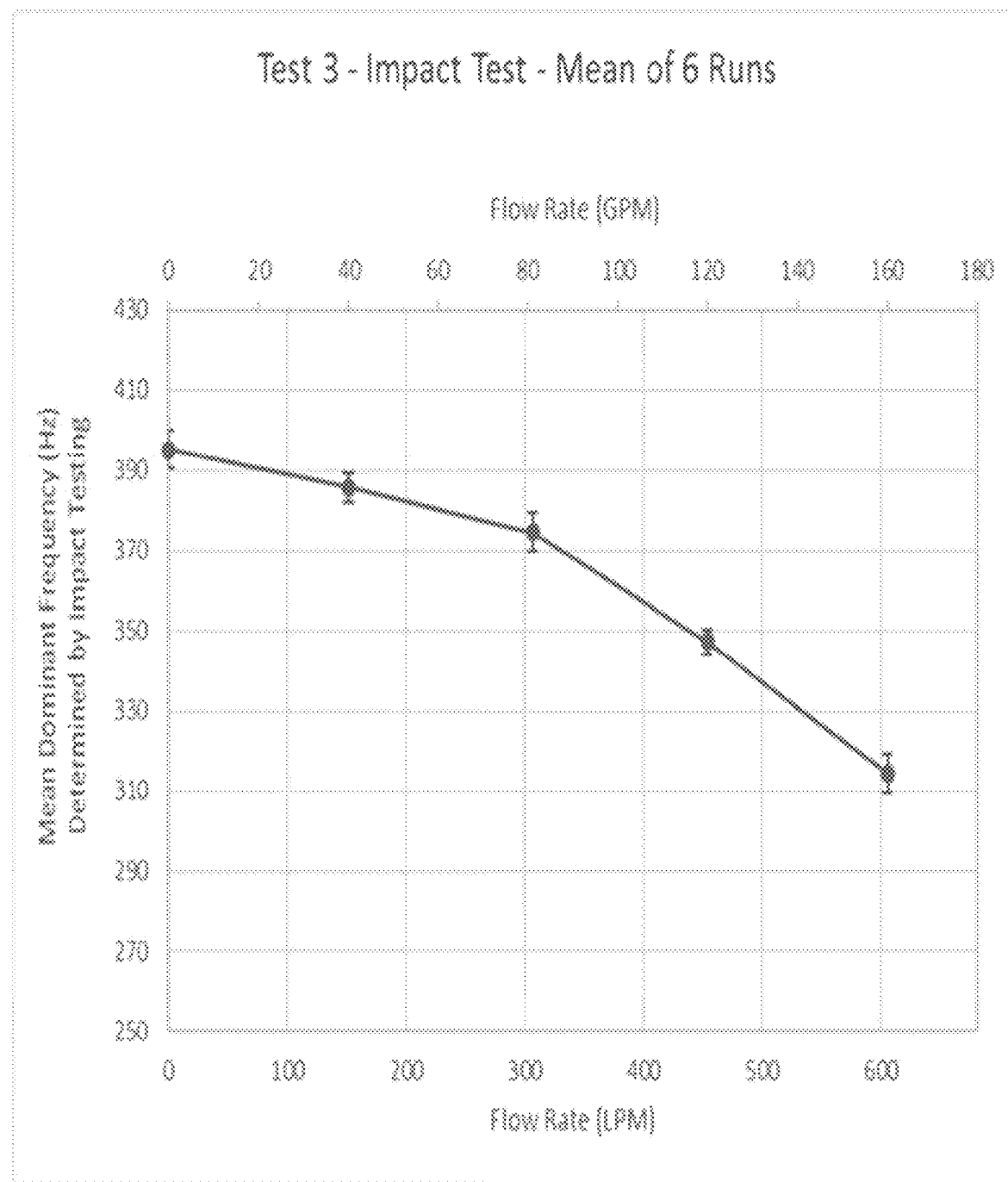
FIG. 58 shows: mean dominant frequency versus flow rate for the Front accelerometer for Test 3 as determined by impact testing.

The dominant-frequency results as calculated from the impact testing at 5 flow rates were very similar to the results from the flow tests (FIGS. 57-58). The mean dominant frequency from the impact testing also decreased with increasing flow rate (FIG. 58). Six runs of the 30 collected were used to represent the entire data set (FIG. 57).

The comparison of the dominant frequency from both the impact testing (FIG. 58) and the flow tests (FIG. 56) showed very similar results. This comparison confirmed the determination of the dominant frequency using only the flow tests.

Based on the front accelerometer results for the dominant frequency, determined both by the water flow testing and by impact testing, the dominant frequency metric was chosen as the main metric for application with the wireless accelerometer network for real-time flow rate. One dominant frequency corresponds to a single flow rate.

Uncertainty

There are several possible sources of uncertainty, which must be considered. The commercial flowmeter specifications report a ±1% accuracy over the flow range for the meter. This is consistent with the range of drift in the flow rates from the reference flow meter, mentioned earlier in this report, of approximately ±3.8 LPM (1.0 GPM) at the higher reference flow rates and less drift of approximately ±1.9 LPM (0.5 GPM) at lower reference flow rates. There is also a likely contribution of uncertainty in our measurements attributed to the fluctuation in the water flow from the water source; the water utility pipes of the building providing the pressured water supply to the fire hose. The uncertainty contribution from the water supply is likely to be a much larger contribution than the uncertainty from the accelerometers. The measurement uncertainty from the accelerometers, at the 95% confidence level with coverage factor of 2, was estimated at less than ±1.0% for the frequency range.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The process descriptions, elements or blocks in flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The conjunction or is used to link objects of a list or alternatives and is not disjunctive; rather the elements can be used separately or can be combined together under appropriate circumstances. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The modifier about used in connection with a quantity is inclusive of the stated value and has the meaning dictated by the context (e.g., it includes the degree of error associated with measurement of the particular quantity).

What is claimed is:

1. A wireless fire hose flow rate apparatus for measuring flow rate in a fire hose, the wireless fire hose flow rate apparatus comprising:
   the fire hose comprising:
      a hose that receives a fluid from a fluid source and fluidically communicates the fluid from the fluid source to a nozzle, such that the hose is non-rigid compared with the nozzle and is separate from the nozzle; and
      the nozzle in fluid communcation with the hose and that receives the fluid from the hose and communicates the fluid from the fire hose, such that the hose is non-rigid, and the nozzle is rigid;
   a wireless sensor network comprising:
      a flow sensor that:
         is disposed along the wall of the hose on the exterior of the hose to not obstruct flow of water in the fire hose by an absence of contact with water in the hose and is spaced apart from the terminus of the hose,
         is spaced apart from the nozzle,
         is spaced apart from a flow meter when the flow meter is present and interposed between the hose and the nozzle,
         detects vibrations of the hose generated by water flowing through the fire hose,
         produces a sensor signal from which the flow rate of water in the fire hose is determined, and
         communicates the sensor signal; and
      a wireless node in electrical communication with the flow sensor and that receives the sensor signal from the flow sensor and wirelessly communicates the sensor signal;
   a base station in radiocommunication with the wireless node and that wirelessly receives the sensor signal from the wireless node and communicates the sensor signal; and
   a flow rate analyzer in electrical communication with the base station and that receives the sensor signal from the base station and determines the flow rate of the water in the fire hose from the sensor signal, wherein the flow rate analyzer determines the flow rate of the water in the fire hose from the sensor signal by converting the sensor signal from the time domain to the frequency domain to form a frequency transform spectrum; determining the dominant frequency in the frequency transform spectrum; and matching the dominant frequency to a unique nominal flow rate.

2. The wireless fire hose flow rate apparatus of claim 1, wherein the flow sensor is an accelerometer.

3. The wireless fire hose flow rate apparatus of claim 1, wherein the flow sensor is disposed proximate to the nozzle of the fire hose.

4. The wireless fire hose flow rate apparatus of claim 1, wherein nominal flow rate is determined before or after the flow rate analyzer receives the sensor signal.

5. The wireless fire hose flow rate apparatus of claim 1, further comprising a flow display in communication with the flow rate analyzer and that displays information about the flow rate of the water in the fire hose as determined by the flow rate analyzer.

6. The wireless fire hose flow rate apparatus of claim 1, further comprising a second flow sensor disposed on the fire hose as part of the wireless sensor network, wherein the second flow sensor is connected to a second wireless node that is in communication with the base station to wirelessly communicate a second sensor signal from the second flow sensor to the base station so that the flow rate is determined from the sensor signal from the flow sensor and the second sensor signal from the second flow sensor.

7. The wireless fire hose flow rate apparatus of claim 1, wherein the fire hose further comprises a flow meter interposed between the hose and the nozzle.

8. The wireless fire hose flow rate apparatus of claim 1, wherein the fire hose further comprises a bale interposed between the hose and the nozzle.

9. The wireless fire hose flow rate apparatus of claim 1, wherein the fire hose further comprises a flow meter disposed on the nozzle.

10. A wireless flow rate apparatus for measuring flow rate in a fluid-conductive conduit, the wireless flow rate apparatus comprising:
the fluid-conductive conduit comprising:
a non-rigid wall that communicates vibrations caused by fluid flowing through the fluid-conductive conduit and that receives a fluid from a fluid source and fluidically communicates the fluid from the fluid source to a nozzle, such that the fluid-conductive conduit is non-rigid compared with the nozzle and is separate from the nozzle;
the nozzle in fluid communcation with the fluid-conductive conduit and that receives the fluid from the fluid-conductive conduit and communicates the fluid from the fluid-conductive conduit, such that the fluid-conductive conduit is non-rigid, and the nozzle is rigid;
a flow meter interposed between the fluid-conductive conduit and the nozzle; a bale interposed between the fluid-conductive conduit and the nozzle; and
a flow meter disposed on the nozzle;
a wireless sensor network comprising:
a flow sensor that:
is disposed along the wall of the fluid-conductive conduit on the exterior of the fluid-conductive conduit that detects vibrations of the fluid-conductive conduit generated by fluid flowing through the fluid-conductive conduit, wherein the flow sensor does not obstruct water in the fluid-conductive conduit due to an absence of contact between the flow sensor with water in the fluid-conductive conduit, and the flow sensor is spaced apart from a terminus of the fluid-conductive conduit,
is spaced apart from the nozzle when the nozzle is present,
is spaced apart from a flow meter when the flow meter is present and interposed between the fluid-conductive conduit and the nozzle,
produces a sensor signal from which the flow rate of the fluid in the fluid-conductive conduit is determined, and
communicates the sensor signal; and
a wireless node in electrical communication with the flow sensor and that receives the sensor signal from the flow sensor and wirelessly communicates the sensor signal;
a base station in radiocommunication with the wireless node and that wirelessly receives the sensor signal from the wireless node and communicates the sensor signal; and
a flow rate analyzer in electrical communication with the base station and that receives the sensor signal from the base station and determines the flow rate of the fluid in the fluid-conductive conduit from the sensor signal,
wherein the flow rate analyzer determines the flow rate of the water in the fluid-conductive conduit from the sensor signal by converting the sensor signal from the time domain to the frequency domain to form a frequency transform spectrum; determining the dominant frequency in the frequency transform spectrum; and matching the dominant frequency to a unique nominal flow rate.

11. The wireless flow rate apparatus of claim 10, wherein the fluid-conductive conduit is a flexible non-metallic hose.

12. A process for measuring flow rate in a fire hose, the process comprising:
flowing water through a fire hose, the fire hose comprising:
a hose that receives a fluid from a fluid source and fluidically communicates the fluid from the fluid source to a nozzle, such that the hose is non-rigid compared with the nozzle and is separate from the nozzle; and
the nozzle in fluid communcation with the hose and that receives the fluid from the hose and communicates the fluid from the fire hose, such that the hose is non-rigid, and the nozzle is rigid;
detecting, by a flow sensor, vibrations of the fire hose generated by water flowing through the fire hose, such that the flow sensor:
is disposed along a wall of the hose on the exterior of the hose to not obstruct flow of water in the fire hose by an absence of contact with water in the hose and is spaced apart from the terminus of the hose,
is spaced apart from the nozzle,
is spaced apart from a flow meter when the flow meter is present and interposed between the hose and the nozzle, and
detects vibrations of the hose generated by water flowing through the fire hose;
producing, by the flow sensor, a sensor signal based on the vibrations of the fire hose detected by the flow sensor;

communicating the sensor signal from the flow sensor;
receiving, by a wireless node in electrical communication with the flow sensor, the sensor signal from the flow sensor;
wirelessly communicating the sensor signal from the wireless node;
wirelessly receiving, by a base station in radiocommunication with the wireless node, the sensor signal from the wireless node;
communicating the sensor signal by the base station;
receiving, by a flow rate analyzer in electrical communication with the base station, the sensor signal from the base station;
determining, by the flow rate analyzer, the flow rate of the water in the fire hose from the sensor signal; and
applying, by the flow rate analyzer, converting the sensor signal from the time domain to the frequency domain to form a frequency transform spectrum: determining the dominant frequency in the frequency transform spectrum; and matching the dominant frequency to a unique nominal flow rate.

13. The process of claim 12, wherein the relationship of the nominal flow rate to the dominant frequency of the sensor signal is determined before or after the flow rate analyzer outputs an estimate of the nominal flow rate.

14. The process of claim 12, further comprising displaying, by a flow display in communication with the flow rate analyzer, information about the flow rate of the water in the fire hose as determined by the flow rate analyzer.

15. The process of claim 12, further comprising making a nominal flow rate curve comprising data pairs of dominant frequency and nominal flow rate.

16. The process of claim 15, wherein making the nominal flow rate curve comprises:
    acquiring time domain vibration data over a set of discrete nominal flow rates of water flowing through the fire hose; and
    converting, for the discrete nominal flow rates of water flowing through the fire hose, the corresponding time domain vibration data to the frequency domain and determining the dominant frequency at each discrete nominal flow rate to form a set of pairs of dominant frequency and nominal flow rate for the nominal flow rate curve.

17. The process of claim 12, wherein the flow sensor is an accelerometer.

18. The process of claim 12, wherein the flow sensor is disposed on the exterior of the hose to not obstruct flow of water in the fire hose.

19. The process of claim 12, wherein the fire hose further comprises a flow meter interposed between the hose and the nozzle.

20. The process of claim 12, wherein the fire hose further comprises a bale interposed between the hose and the nozzle.

21. The process of claim 12, wherein the fire hose further comprises a flow meter disposed on the nozzle.

* * * * *